United States Patent
Bang et al.

(10) Patent No.: US 11,252,149 B1
(45) Date of Patent: Feb. 15, 2022

(54) RESOURCE MANAGEMENT TECHNIQUES FOR DIALOG-DRIVEN APPLICATIONS

(71) Applicant: Amazon Technologies, Inc., Seattle, WA (US)

(72) Inventors: Jin Hoon Bang, Seattle, WA (US); Kartik Rustagi, Sammamish, WA (US); John Baker, Bellevue, WA (US); Swapandeep Singh, Sammamish, WA (US); Rama Krishna Sandeep Pokkunuri, Redmond, WA (US); Omkar Prakash Kurode, Redmond, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 17/039,920

(22) Filed: Sep. 30, 2020

(51) Int. Cl.
  *G06F 7/04* (2006.01)
  *H04L 29/06* (2006.01)
  *G06F 9/54* (2006.01)
  *H04L 29/08* (2006.01)
  *H04L 12/26* (2006.01)

(52) U.S. Cl.
  CPC ......... *H04L 63/0853* (2013.01); *G06F 9/543* (2013.01); *H04L 43/16* (2013.01); *H04L 67/141* (2013.01); *H04L 67/146* (2013.01)

(58) Field of Classification Search
  CPC . H04L 47/215; H04L 63/0853; H04L 67/141; H04L 67/146; H04L 43/16; G06F 9/543
  See application file for complete search history.

(56) References Cited

U.S. PATENT DOCUMENTS

| | | | |
|---|---|---|---|
| 6,246,981 B1 | 6/2001 | Papineni et al. | |
| 6,510,411 B1 | 1/2003 | Norton et al. | |
| 7,197,460 B1 | 3/2007 | Gupta et al. | |
| 9,703,602 B1 * | 7/2017 | Kusters | G06F 9/4881 |
| 10,331,791 B2 | 6/2019 | Anbazhagan et al. | |
| 10,891,152 B2 | 1/2021 | Anbazhagan et al. | |
| 2007/0143099 A1 | 6/2007 | Balchandran et al. | |
| 2010/0298012 A1 | 11/2010 | Damarla | |

(Continued)

FOREIGN PATENT DOCUMENTS

| | | |
|---|---|---|
| EP | 2933070 | 10/2018 |
| WO | 9723088 | 6/1997 |

OTHER PUBLICATIONS

U.S. Appl. No. 17/219,640, filed Mar. 31, 2021, Pokkunuri, et al., Amazon Technologies, Inc., pp. 1-79, drawing pp. 1-20.

(Continued)

*Primary Examiner* — Cheikh T Ndiaye
(74) *Attorney, Agent, or Firm* — Robert C. Kowert; Kowert, Hood, Munyon, Rankin & Goetzel, P.C.

(57) ABSTRACT

A resource of a dialog-driven management service is allocated for a first set of requests based on determining that a population of capacity indicators in a throttling data structure exceeds a threshold. One or more capacity indicator deduction iterations associated with the resource are conducted during a time interval for which the resource remains allocated for the first set of requests. In a given iteration, a number of capacity indicators is deducted from the throttling data structure based on a resource throttling setting. A second set of requests is rejected based on the population of the throttling data structure.

20 Claims, 24 Drawing Sheets

(56) References Cited

U.S. PATENT DOCUMENTS

| | | | | |
|---|---|---|---|---|
| 2015/0036503 | A1* | 2/2015 | Kaplan | H04L 47/215 370/235.1 |
| 2015/0263941 | A1 | 9/2015 | Jung | |
| 2016/0042748 | A1 | 2/2016 | Jain et al. | |
| 2016/0142323 | A1* | 5/2016 | Lehmann | H04L 41/5025 709/226 |
| 2016/0225370 | A1 | 8/2016 | Kannan et al. | |
| 2017/0125008 | A1 | 5/2017 | Maisonnier et al. | |
| 2017/0230779 | A1* | 8/2017 | Wang | H04W 28/0205 |
| 2017/0286916 | A1 | 10/2017 | Skiba et al. | |
| 2021/0191650 | A1* | 6/2021 | Vansteenkiste | G06F 3/067 |

OTHER PUBLICATIONS

U.S. Appl. No. 17/219,630, filed Mar. 31, 2021, Pushkin, et al., Amazon Technologies, Inc., pp. 1-79, drawing pp. 1-20.
Svetlana Stoyanchev et al. "Rapid Prototyping of Form-driven Dialogue Systems Using an Open-Source Framework", Proceedings of the Sigdial 2016 Conference, pp. 216-219.
Claus Brabrand "PowerForms: Declarative client-side form field validation" Brics Report Series, Jan. 1, 2000, pp. 205-214.
Robert Jamison, "Announcing a New Tool for Building Interactive Adventure Games on Alexa", Amazon Mobile App Distribution Blog, Retrieved from URL: https://developer.amazon.com/public/community/post/TxEQV5K754YS77/Announcing-a-New-Tool-for-Building-Interactive-Adventure-Games-on-Alexa on Oct. 30, 2016, pp. 1-11.
"Getting Started with the Alexa Skills Kit", Amazon Apps & Games Developer Portal, Retrieved from URL: https://developer.amazon.com/pulbic/solutions/slexas/alexa-skills-kit/getting-started-guide on Oct. 30, 2016, pp. 1-7.
Seth Rosenberg, "How to Build Bots for Messenger", Facebook for Developers, Retrieved from URL: https://developers.facebook.com/blog/post/2016/04/12/bots-for-messenger on Oct. 30, 2016, pp. 1-5.
Ali El-Kahky, et al., "Entending Domain Coverage of Language Understanding Systems via Intent Transfer Between Domains Using Knowledge Graphs and Search Query Click Logs", 2014 IEEE International Conference on Acoustic, Speech and Signal Processing (ICASSP), pp. 4087-4091.
Elad Natanson, "Messaging Platforms, Bots and The Future of Mobile", Retrieved from URL: http://www.forbes.com/sites/eladnatanson/2016/04/08/messaging-platforms-bot-and-the-future-of-mobile/#2d1ab79884af on Oct. 30, 2016. pp. 1-7.
"Messenger Platform", Facebook for Developers, Retrieved from URL: https://developers.facebook.com/doc/messenger-platform on Oct. 30, 2016, pp. 1-3.
Collen Estrada, "Microsoft Bot Framework", Mar. 30, 2016, Retrieved from URL: https://blog.botframework.com/2016/03/30/BotFramework/ on Oct. 30, 2016, pp. 1-7.
"Microsoft Cognitive Services—APIs", Retrieved from URL: https://www.microsoft.com/cognitive-services/en-us/apis on Oct. 30, 2016, pp. 1-8.
Himanshu S. Bhatt, et al., "Cross-domain Text Classification with Multiple Domains and Disparate Label Sets", Proceedings of the 54th Annual Meeting of the Association for Computational Linguistics, Aug. 7-12, 2016, pp. 1641-1650.
Amit Fulay, "Say hello to Google Allo: a smarter messaging app", Retrieved from URL: https://blog.google/products/allo/google-allo-smater-messaging-app on Oct. 30, 2016, pp. 1-14.
"Training for the Alexa Skills Kit", Amazon Apps & Games Developer Portal, Retrieved from URL: https://developer.amazon.com/public/solutions/alexa/alexa-skills-kits/content/alexa-skilss-developer-training on Oct. 30, 2016, pp. 1-4.
Wikipedia, "Vorbis", Retrieved from URL: https://en.wikipedia.org/wiki/Vorbis on Sep. 26, 2016, pp. 1-10.
U.S. Appl. No. 17/030,204, filed Sep. 23, 2020, Saab Mansour.
U.S. Appl. No. 17/039,889, filed Sep. 30, 2020, Swapandeep Singh et al.
U.S. Appl. No. 17/039,900, filed Sep. 30, 2020, Swapandeep Singh et al.

* cited by examiner

Scenario A: No attempt by client to interrupt presentation of server-generated output
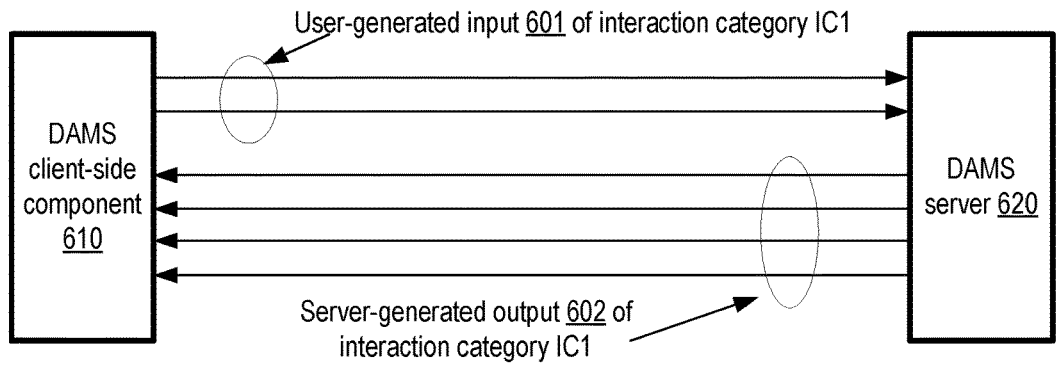
Scenario B: IC1 set to INTERRUPTIBLE, client interrupts during presentation of server-generated output
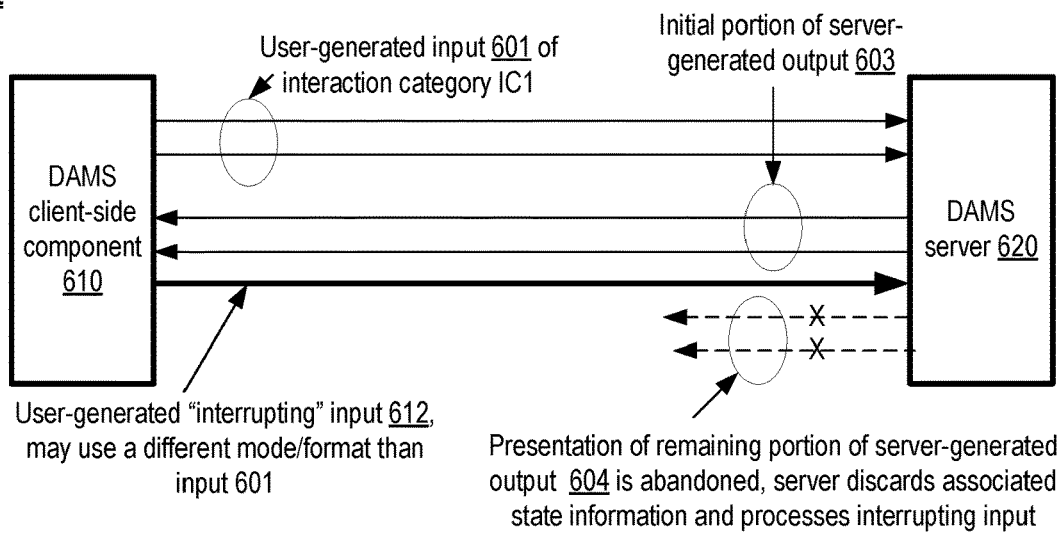
Scenario C: IC1 set to UNINTERRUPTIBLE, client interrupts during presentation of server-generated output
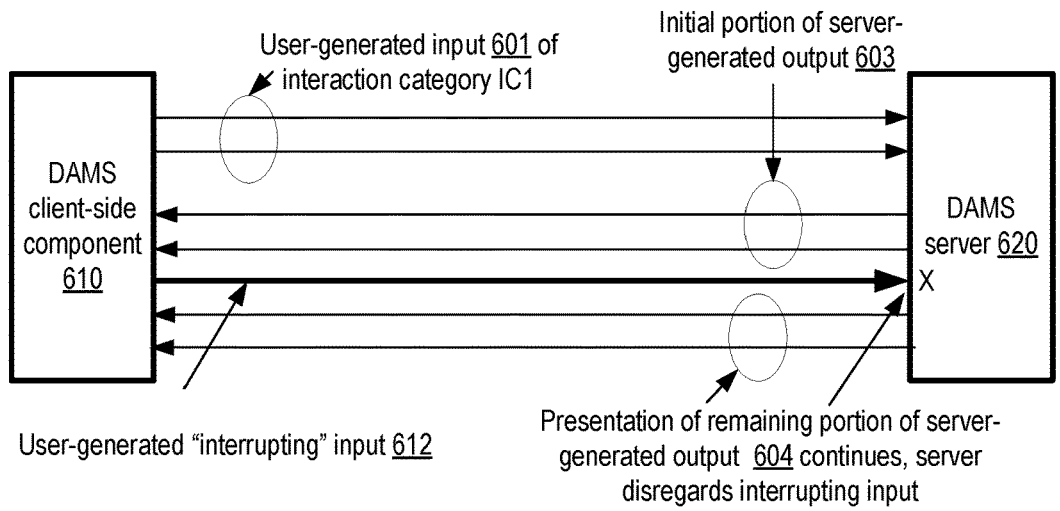
FIG. 6

Example throttling scenario 1451:
A client makes 5 connection requests per second;
One token is deducted every 1 second for an ongoing connection from a bucket set up for the client;
One token is added to the bucket when a connection is closed;
The processing of each request lasts 2 seconds;
The client is allowed a maximum of 8 concurrent connections

| | T1 (start) | T1 (end) | T2 (start) | T2 (end) | T3 (start) | T3 (end) | T4 (start) | T4 (end) |
|---|---|---|---|---|---|---|---|---|
| New incoming requests (at start of second) | 5 | - | 5 | - | 5 | - | 5 | - |
| Tokens in bucket | 8 | - | 3 | - | 5 | - | 3 | 5 |
| Tokens consumed | 5 | - | 3 | - | 5 | - | 3 | - |
| Tokens left | 3 | - | 0 | - | 0 | - | 0 | - |
| Outcome | All 5 requests are allowed | | 3 requests are allowed, 2 are throttled | | All 5 requests are allowed | | 3 request are allowed, 2 are throttled | |
| Total open connections with server | 5 | 5 | 8 | 3 | 8 | 5 | 8 | 3 |

← Table 1401

FIG. 14

Example throttling scenario 1551:
A client starts with 5 requests per second, and reduces rate by 1 per second;
One token is deducted every 1 second for an ongoing connection from a bucket set up for the client;
One token is added to the bucket when a connection is closed;
Each request lasts 2 seconds;
The client is allowed a maximum of 7 concurrent connections

| | T1 (start) | T1 (end) | T2 (start) | T2 (end) | T3 (start) | T3 (end) | T4 (start) | T4 (end) |
|---|---|---|---|---|---|---|---|---|
| New incoming requests (at start of second) | 5 | - | 4 | - | 3 | - | 2 | - |
| Tokens in bucket | 7 | - | 2 | - | 5 | - | 4 | 5 |
| Tokens consumed | 5 | - | 2 | - | 3 | - | 2 | - |
| Tokens left | 2 | - | 0 | - | 2 | - | 2 | - |
| Outcome | All 5 requests are allowed | | 2 requests are allowed, 2 are throttled | | All 3 requests are allowed | | Both requests are allowed | |
| Total open connections with server | 5 | 5 | 7 | 2 | 5 | 3 | 5 | 2 |

Table 1501

*FIG. 15*

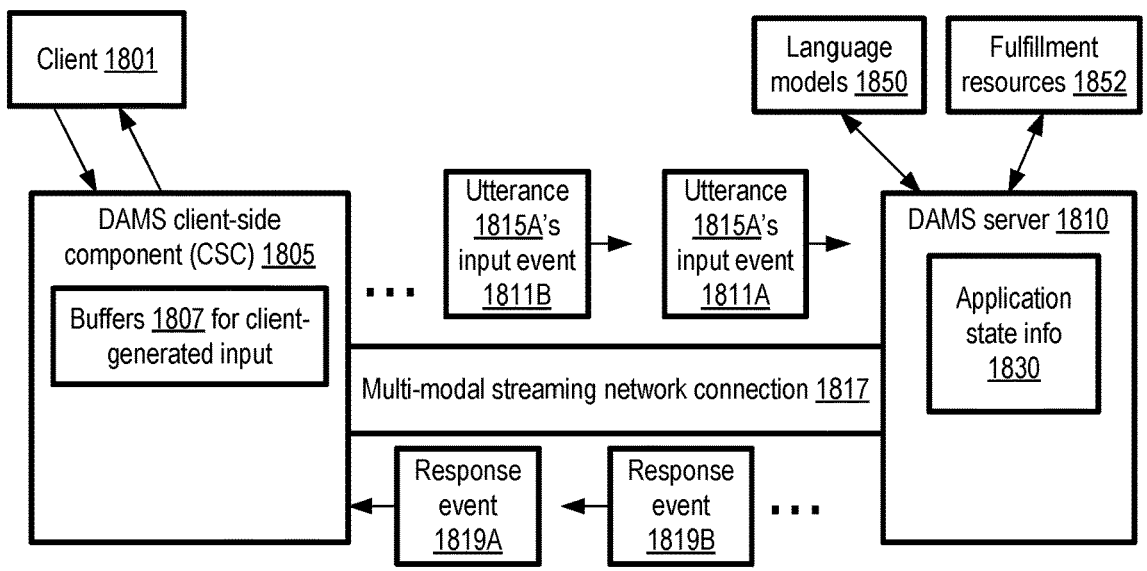
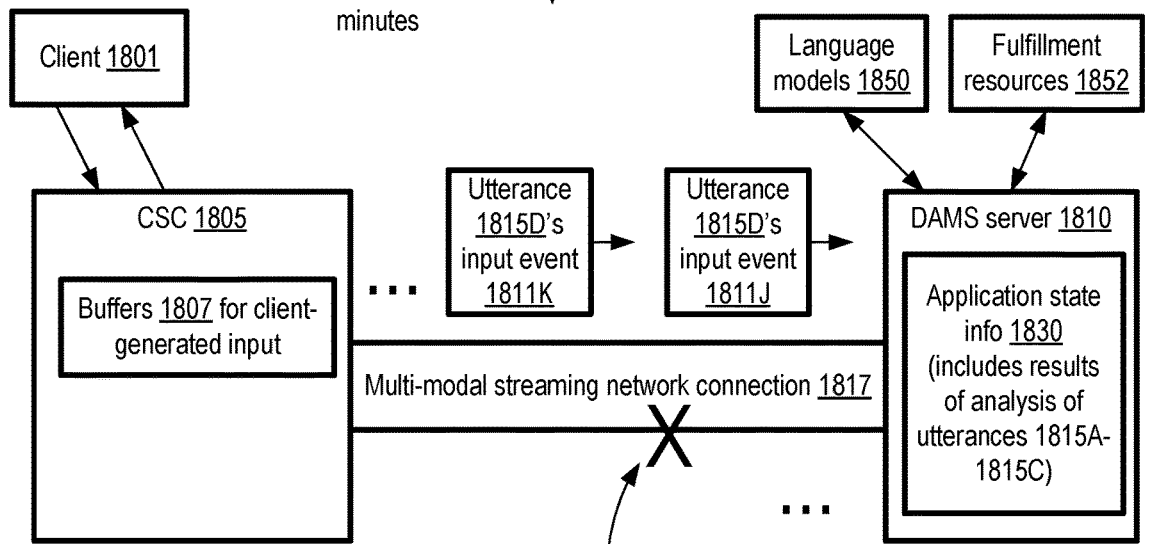
FIG. 18

RESOURCE MANAGEMENT TECHNIQUES FOR DIALOG-DRIVEN APPLICATIONS

BACKGROUND

In recent years, the number of small-footprint sensor-containing devices such as smart phones, wearable devices, personal assistant devices and various other "Internet of Things" (IoT) devices which can be used for accessing a variety of distributed or remote applications have been increasing dramatically. Many of these devices comprise sensors capable of detecting voiced commands; in some cases, sensors for detecting signals of other modalities such as dual tine multi frequency (DTMF) signals, text and the like may also be incorporated in these devices. The small-footprint devices are often designed to communicate with server farms at data centers which can be used to perform application tasks based on the input provided via the devices.

In principle, the proliferation of devices that can collect voice signals (as well as signals of other modalities) increases the number of channels that can be used by vendors to provide various services and applications, thereby potentially increasing revenues for their businesses. Many customers may find it much more appealing or intuitive to, for example, order a meal using voiced commands than to order the meal after filling out a form on a computer screen. Customers may typically prefer to use conversational or "natural" language to express their commands or intentions, in a manner similar to the way they would interact with other individuals, rather than being restricted to using specific "canned" phrases in a certain sequence. Applications which are designed to interact conversationally with customers may be referred to as dialog-driven applications.

The interpretation of the signals received via the sensor-containing devices is a complex problem, especially in scenarios in which customers are allowed to express themselves informally or conversationally. To interpret arbitrary voice commands, for example, sophisticated automated speech recognition (ASR) algorithms and/or natural language processing (NLP) algorithms may need to be employed. In many cases, in order to fulfill a particular task being requested by a customer, it may not be sufficient to interpret just one set of voiced words; instead, a back-and-forth interaction may be needed to determine various aspects of the customer requirements. Different customers may have different preferences and behaviors regarding their interactions with a given dialog-driven application. In some cases, for example, a given customer may wish to use multiple modes of communication (e.g., voice and text) for different parts of a single interaction. Managing interactions between a dialog-driven application and diverse clients remains a non-trivial technical challenge.

BRIEF DESCRIPTION OF DRAWINGS

FIG. 6 illustrates example interruptibility settings which may be selected for respective interaction categories of a dialog-driven application, according to at least some embodiments.

FIG. 14 and FIG. 15 illustrate respective examples of changes in token populations of buckets used for connection throttling, and corresponding connection acceptance/rejection decisions made at a dialog-driven application management service, according to at least some embodiments.

FIG. 18 illustrates an example occurrence of a connectivity disruption during one of several user utterances transmitted via a long-running connection to a dialog-driven application, according to at least some embodiments.

Figure 1:
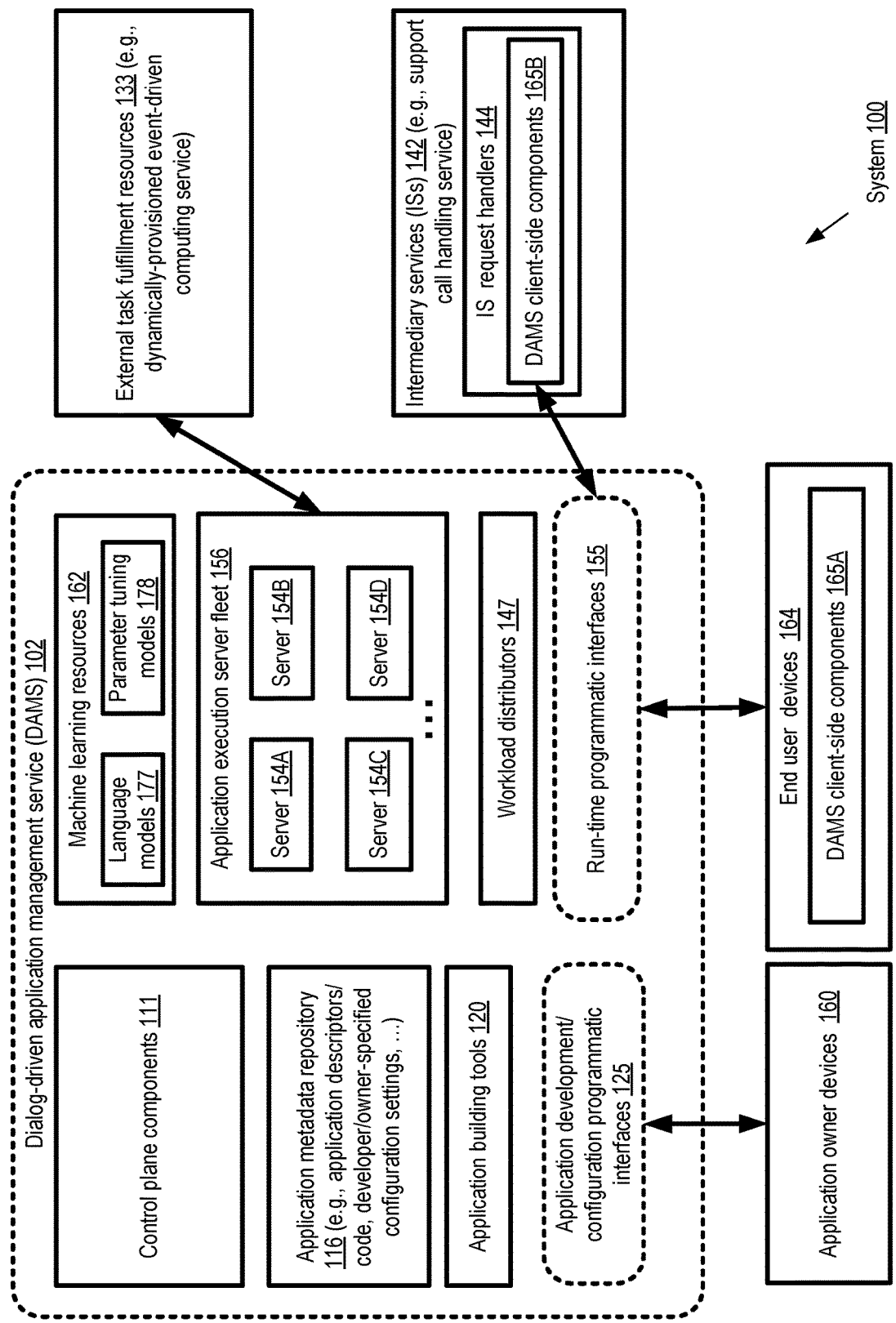
FIG. 1 illustrates an example system environment in which a dialog-driven application management service which supports fine-grained configuration of multi-modal conversational interactions with clients may be implemented, according to at least some embodiments.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to. When used in the claims, the term "or" is used as an inclusive or and not as an exclusive or. For example, the phrase "at least one of x, y, or z" means any one of x, y, and z, as well as any combination thereof.

DETAILED DESCRIPTION

The present disclosure relates to methods and apparatus for customizable configuration of various aspects of dialog-driven applications, including interruptibility of interactions between clients and an application management service using multi-modal streaming network connections, timing parameters associated with user inputs, distributed throttling of network connections based on connection durations, and the creation and use of customizable checkpoints of application state information to enable smooth recoveries from certain types of failures. As used herein, the term "dialog-driven application" refers to an application in which, in order to complete a particular task or function, respective values of one or more parameters may be obtained from analysis of input provided by an end user of the application via one or more modes/formats of conversational interactions, such as audio (voice), text, dual tone multi-frequency (DTMF) signals, video, or combinations of such modes/formats. According to at least some embodiments, a network-accessible service referred to as a dialog-based application management service (DAMS) may be set up at a provider network or cloud computing environment to implement such techniques on behalf of application owners and application end users. In some embodiments a DAMS may be used at least in part to host or implement "bot" or "chatbot" functionality, for example for handling customer support operations of an organization, and may thus be referred to as a "bot" or "chat bot" service or framework. A DAMS may also be referred to as a dialog flow handling service in some embodiments.

At a high level, a DAMS may provide at least two types of functionality related to dialog-driven applications in various embodiments. For application developers and administrators, for example, the DAMS may provide tools and mechanisms for developing, dynamically configuring and deploying dialog-driven applications. To simplify the presentation, the term "application owners" may be used herein to refer to individuals or organizations involved in the design, development, configuration and deployment of dialog-driven applications which are to be used by end users. To support potentially large numbers of end users of the dialog-driven applications, the DAMS may execute the logic of the applications using a fleet of servers which communicate with client-side components (e.g., apps, browser plug-ins, or other programs) running on end user devices such as phones, laptops, tablets, Internet-of-Things (IoT) devices and the like. A given dialog-driven application may often comprise one or more sequences of bidirectional interactions between end users and the servers of the DAMS. A given interaction may in turn comprise (a) one or more end user "utterances" (logically-grouped related user input provided via some combination of audio, text, DTMF, or the like, for which a coherent response can be generated after the logically-grouped related user input is analyzed/processed), and (b) corresponding responses transmitted to the end user from the DAMS servers based on analysis of the utterances, the logic of the dialog-driven application, and/or results of actions initiated by the DAMS servers based on the analysis. Note that the user input for dialog-driven applications may be informal and conversational in nature in various embodiments, without imposing strict grammatical or linguistic requirements on the content of user input. Using various easy-to-use programmatic interfaces implemented at a DAMS, such as a graphical user interface of a web-based console, an application developer may be able to specify the logic of a dialog-driven application without providing the source code to be used for managing the flow of multi-step interactions of end users with the application. At run-time, after the interactions with the developer regarding the multi-step dialog have been completed and an executable version of the program has been generated and deployed, automated speech recognition (ASR) algorithms, natural language processing (NLP) algorithms, text processing algorithms and/or other types of user input analysis algorithms (at least some of which may employ machine learning) may be used to capture and interpret the dialog with individual end users. Application developers may not need to specify details regarding the particular algorithms to be used, or even be aware of the algorithms that are used in at least some embodiments.

The DAMS may be designed to enable dialog-driven applications for any desired problem domains (e.g., financial applications, customer support, applications for ordering food, travel-related applications, entertainment-related applications and like) and a variety of end user device types (e.g., voice-directed personal assistants, smart phones, wearable devices, and the like) to be developed and deployed easily, without requiring application owners to worry about end user device capabilities or the provisioning and management of specific resources to be used for the applications. In some cases, the DAMS may enable the integration of existing applications (which may be executed using a variety of different resources) with a dialog-based front-end capability with a minimum of programming effort. The application owners may use the interfaces of the DAMS to indicate high-level steps of the dialogs needed to identify parameter values associated with various tasks to be performed using the application, and the programs, services or resources to be invoked to perform or fulfill the tasks after the parameter values for the tasks have been identified using the dialogs in various embodiments. A given dialog-driven application may indicate one or more "intents" associated with a particular problem domain. Each of the intents may correspond to a particular task to be initiated on behalf of an end user of the application (such as, for example, ordering a pizza or some other part of a meal), and each intent may be identified and executed based on analysis of a collection of end user inputs or utterances. Any desired combinations of a number of different types of resources may be used to fulfill the application tasks or intents in various embodiments, including resources of other network-accessible services. In general, much of the complexity typically associated with dialog-driven applications (including providing the logic for the dialog steps, or for the logic for dialog capture and interpretation) may be eliminated, leaving application owners free to concentrate on the business logic of their applications. By quickly adding dialog-driven front-ends to existing or new applications, the number of end user engagement channels available for the applications may be substantially expanded in many cases, and the increased ease of use resulting from natural language interactions may expand the size of the applications' customer base.

According to some embodiments, an application owner may specify, e.g., either at the time of creation of an application or later in the application lifecycle, various interaction configuration details at one or more levels of granularity. Corresponding to various actions to be taken at an application based on user input, in various embodiments contents of respective sets of user utterances may have to be analyzed before all the parameter values needed for the execution of the corresponding actions are determined and the actions can be initiated. As such, the interactions of a given application may be grouped into a plurality of categories in some embodiments, with each category including the reception and analysis of one or more end user utterances. In at least one embodiment, multi-modal bidirectional streaming network connections may be set up between respective DAMS client-side components and DAMS servers, and each such connection may be used for several (or all) interactions with a corresponding end user that eventually lead to the execution of some set of actions on behalf of the end user.

Configuration settings may be defined and applied at the interaction category granularity in some embodiments, so that different parts of the interaction sequence between end users and the applications can be handled in a customized manner. In some embodiments, an application owner may specify, if desired, a respective interruptibility setting for one or more categories of interactions. For example, by choosing an "interruptible" setting for a given category of interactions, the application owner may indicate that if an end user provides new input during a time interval in which output generated in response to a previous end user utterance of the given interaction category is being presented, processing of the new input should immediately be initiated by the DAMS server and the ongoing presentation of the output should to be terminated. In contrast, for some important output generated by DAMS servers, such as the presentation of terms and conditions required by regulations or organizational policies, the corresponding interaction category may be designated as "uninterruptible", in which case such new end user input in the middle of the ongoing output presentation may be ignored.

In various embodiments, application owners may also specify, for different interaction categories and/or specific utterances, a variety of timing parameters to be used for example to determine how long a DAMS server is to wait for an end user to begin providing input, how long the DAMS server is to wait during a period of end user silence to determine whether a given user utterance is to be considered completed, and so on. Such timing parameters may be used, in effect, to determine the specific content which is to be considered as part of a given utterance, e.g., by defining the start and end boundaries of the utterance, by prompting the end user to begin communicating if the end user fails to provide input for some time, and so on. In at least some embodiments, application owners may specify custom resource throttling parameters to be used for their applications, e.g., so that for example some subset of end users does not end up consuming the majority of resources at the DAMS servers. In at least one embodiment, application owners may specify parameters indicating how often a DAMS server is to create checkpoints of application state with respect to a given end user's interactions over a long-duration collection, and what data should be included within such checkpoints. Such checkpoints may, for example, be used to enable quick resumptions of the dialogs with end users in the event of certain types of errors/failures which can disrupt connectivity between an end user's client-side component and the DAMS, without requiring the end users to re-provide a large portion of the information they have already provided to the application. Note that in at least some embodiments, administrative components of a DAMS may select values of one or more of the parameters described above, e.g., in the event that an application owner does not specify them.

As one skilled in the art will appreciate in light of this disclosure, certain embodiments may be capable of achieving various advantages, including some or all of the following: (a) enabling the customization of various aspects of end user interactions with a wide variety of dialog-driven applications with a minimum of effort on the part of application owners, (b) reducing the overall amount of network, computing, and/or storage resources which have to be used for supporting large numbers of end users of dialog-driven applications, e.g., by using long-lasting bidirectional streaming connections and using resource management techniques which take the longevity of the connections into account, (c) improving the user experience of end users of dialog-driven applications, so that for example they can shortcut certain interactions by starting to provide relevant input instead of having to wait for the completion of presentation of application output, and so that the impact of certain types of network errors on the user experience is minimized, and/or (d) improving the reliability and robustness of dialog-driven applications by using checkpointing algorithms to save customized subsets of application state information.

According to some embodiments, a system may comprise one or more computing devices. The computing devices may include instructions that upon execution on or across one or more processors of the computing devices cause the computing devices to obtain, at a DAMS, a representation of a first application. The representation may indicate (a) one or more categories of interactions between users and the first application, and (b) one or more actions to be initiated in response to analysis of respective sets of user-generated input of individual interactions of the one or more categories. A given interaction category may include one or more utterances associated with a customer's intent, and one or more corresponding responses from the DAMS servers in various embodiments. The respective sets of user-generated input may be obtained at one or more servers of the DAMS from one or more client-side components of the DAMS. The term "client-side component", as used herein, may refer in at least some embodiments to one or more software and/or hardware elements that are employed, e.g., at end user devices or at intermediary devices to (a) cause representations of user-generated input to be transmitted to DAMS servers and (b) cause output, generated at the DAMS servers based on analysis of the user-generated input, to be presented to the users. A client-side component may, for example, comprise a portion of a phone app, a web browser plugin, a standalone program, a program or thread running on an automated personal assistant device, and so on in different implementations.

A determination may be made in at least some embodiments at the DAMS, e.g., based on one or more messages received via a programmatic interface, that a first category of dialog interactions of the application is to be implemented in an interruptible mode, and a second category of the dialog interactions is to be implemented in an uninterruptible mode. A multi-modal connection may be established between a first server of the one or more DAMS servers and a particular client-side component of the DMS in various embodiments. The DAMS server may be configured to utilize the multi-modal connection to listen concurrently for user-generated input provided in a plurality of formats/modes, e.g., even during a time interval in which the server transmits data to the first client-side component. The plurality of formats may include at least a voice/audio format, and one or more non-audio formats such as a text format, or a DTMF format in some embodiments. In some implementations, an HTTP (HyperText Transfer Protocol) 2.0 connection may be used, or a variant of the HTTP 2.0 protocol may be employed for the connection. In at least some embodiments, a different protocol which enables the DAMS server to subscribe to multiple channels of user input, and listen concurrently for input in any of the channels, may be used.

In response to receiving, by the DAMS server via the multi-modal connection, a particular set of user-generated input in a particular format of the plurality of formats (a) after presentation, to a user, of a first set of server-generated output for a dialog interaction of the first category has been initiated and (b) before the presentation of the first set of server-generated output has been completed, the DAMS server may take the following actions in at least one embodiment in accordance with the interruptible setting. The DAMS server may cause presentation of the first set of server-generated output to be terminated, discard at least a portion of application state information associated with the first set of server-generated output, and initiate an analysis of the particular set of user-generated input.

In contrast, a different approach may be used for uninterruptible interactions in various embodiments. In response to receiving, by the DAMS server via the multi-modal connection, another set of user-generated input in a particular format of the plurality of formats (a) after presentation, to a user, of a second set of server-generated output for a dialog interaction of the second category has been initiated and (b) before the presentation of the second set of server-generated output has been completed, the DAMS server may simply continue the presentation of the second set of user-generated output in some embodiments, without discarding any application state information. In some implementations, a representation of the other set of user-generated input may be stored in a buffer at the DAMS server and analyzed later; in other implementations, the other set of user-generated input may simply be discarded.

A number of different timing parameters associated with the analysis of user-generated input may be specified by application owners in different embodiments. In at least one embodiment, an indication of a maximum initial silence duration (MISD) from users for interactions of at least one category may be obtained at the DAMS via one or more programmatic interfaces. In response to detecting that user-generated input was not provided during a time interval with a duration no shorter than the MISD, in such embodiments, server-generated output requesting user-generated input may be presented to a user. In some embodiments, an indication of a maximum client input duration (MCID) for interactions of at least one category may be obtained at the DAMS via one or more programmatic interfaces. In response to detecting that user-generated input was provided during a time interval with a duration no shorter than the MCID, a DAMS server may discard at least a portion of user-generated input which was provided after the MCID in such an embodiment. In another embodiment, an indication of a maximum final silence duration (MFSD) for interactions of at least a first category may be obtained at the DAMS via one or more programmatic interfaces. In response to detecting that, after one or more portions of user input of a particular category of interactions have been received at a DAMS server, user-generated input was not provided during a time interval with a duration no shorter than the MFSD, the DAMS server may store an indication of a completion of an interaction of that category in at least one embodiment.

In some embodiments, instead of or in addition to obtaining one or more of the above timing parameters from an application owner, the DAMS may analyze patterns of end user behaviors collected over some period of time to determine (or change) at least some of the timing parameters. For example, a collection of end user input and associated measured timing information (such as initial and final silences for various categories of interactions, the total times for which users continued providing input for various categories of interactions, etc.) obtained over a period of T days or W weeks for a deployed dialog-driven application may be analyzed using one or more machine learning models, and values for the MISD, MFSD, and/or MCID may be assigned or tuned based on the analysis. In at least some embodiments, format-specific or communication-mode-specific timing parameters may be obtained or selected—e.g., different values for the MISD, MFSD and/or MCID may be specified or learned for audio, text, DTMF, video, etc. Operations of the DAMS (such as prompting users to provide input, discarding a portion of user input, etc.) may be scheduled based on the learned timing parameters and/or the format-specific or mode-specific parameters in such embodiments.

In various embodiments, the DAMS servers may employ machine learning and/or statistical models to analyze various portions of user-generated input as they become available, and actions of the dialog-driven applications may be initiated based on the output produced by the machine learning or statistical models. In some embodiments, such models may also provide relevance indicators for various portions of user-generated input, in effect indicating whether the user-generated input is relevant to the application or is extraneous/irrelevant. For example, an end user may also happen to be interacting with other entities (such as a family member or colleague, or an employee of a coffee shop or restaurant) at about the same time that the end user is interacting with the DAMS, and these other interactions may not be related to the application being implemented at the DAMS. In such scenarios, low relevance indicators or scores generated by machine learning models may be used by the DAMS servers to determine that no additional action is to be initiated in response to the corresponding portions of user-generated inputs, while high relevance indicators may cause the DAMS servers to initiate corresponding actions.

According to some embodiments, a DAMS may be one of a suite of network-accessible services of a provider network. The term "provider network" (sometimes simply called a "cloud") refers to a large pool of network-accessible computing resources (such as compute, storage, and networking resources, applications, and services), which may be virtualized or bare-metal. The cloud can provide convenient, on-demand network access to a shared pool of configurable computing resources that can be programmatically provisioned and released in response to customer commands. These resources can be dynamically provisioned and reconfigured to adjust to variable load. The resources of a provider network may in some cases be distributed across multiple data centers, which in turn may be distributed among numerous geographical regions (e.g., with each region corresponding to one or more cities, states or countries). For example, a cloud provider network can be formed as a number of regions, where a region is a geographical area in which the cloud provider clusters data centers. Each region can include two or more availability zones connected to one another via a private high speed network, for example a fiber communication connection. An availability zone refers to an isolated failure domain including one or more data center facilities with separate power, separate networking, and separate cooling from those in another availability zone. Preferably, availability zones within a region are positioned far enough away from one other that the same natural disaster should not take more than one availability zone offline at the same time. Customers can connect to availability zones of the cloud provider network via a publicly accessible network (e.g., the Internet or a cellular communication network). A provider network may include numerous network-accessible services, such as a virtualized computing service (VCS), one or more storage services, database services and the like, as well as an analytics service (which may also be referred to as a machine learning service). A VCS may also be referred to as an elastic compute service, virtual machines service, computing cloud service, compute engine, and/or cloud compute in various implementations.

Example System Environment

FIG. 1 illustrates an example system environment in which a dialog-driven application management service which supports fine-grained configuration of multi-modal conversational interactions with clients may be implemented, according to at least some embodiments. As shown, system 100 comprises artifacts and resources of dialog-driven application management service (DAMS) 102, including application building tools 120, an application metadata repository 116, an application execution server fleet 156 with an associated collection of workload distributors 147, machine learning resources 162, and control plane components 111.

DAMS 102 may implement a variety of programmatic interfaces in the depicted embodiment, including for example one or more web-based consoles, graphical user interfaces, command-line tools, and/or a collection of application programming interfaces (APIs). The programmatic interfaces may be broadly classified into application development and configuration programmatic interfaces 125 and run-time programmatic interfaces 155. The application development and configuration programmatic interfaces 125 may be used by application owners and developers to create and provide preferred configuration settings for various dialog-driven applications which are to be executed using the application execution server fleet 156, machine learning resources 162, and/or external task fulfillment resources 133 in various embodiments. Application owners may interact with the DAMS 102 via the interfaces 125 from a variety of application owner devices 160 in different embodiments, such as desktop computers, laptops, mobile devices and the like. Information about the dialog-driven applications, such as logical descriptors of the applications, program code (e.g., in source code or executable form), configuration settings for various stages or interaction categories of the applications, may be stored in an application metadata repository 116 in at least some embodiments.

Control-plane components 111 of the DAMSDAMS 102 may be responsible for administration of other resources and artifacts of the DAMS in the depicted embodiment. The tasks performed by the control-plane components 111 may include, for example, provisioning individual servers 154 (e.g., servers 154A-154D) of the application execution server fleet 156, monitoring the health states of the resources, establishing and maintaining connectivity between the application execution server fleet 156 and machine learning resources 162, establishing and maintaining connectivity between the application execution server fleet 156 and external task fulfillment resources 133, selecting algorithms which can be used by workload distributors 147 to map end user requests for dialog-driven applications to individual servers 154, and so on.

End users (also referred to as clients) of dialog-driven applications may interact with the applications via run-time programmatic interfaces 155 in the depicted embodiment. For example, the end users may provide input in the form of audio signals, text, DTMF signals, video and the like to various sensors at end user devices 164. A variety of end user devices 164 may be used to interact with dialog-driven applications in different embodiments, such as phones, tablet computing devices, wearable computing devices such as smart watches, game-playing devices or consoles, automated personal assistant devices, augmented reality devices, virtual reality devices, IoT devices, laptops, other mobile devices, desktops, compute instances of virtualized computing services, and so on. The end user input may be processed initially (e.g., subdivided into smaller units called events or blocks, each comprising a few hundred bytes of data) at DAMS client-side components 165A at the end user devices, and then representations of the end user-generated input may be transmitted to the DAMS from the client-side components 165A in the depicted embodiment via run-time programmatic interfaces 155. In some implementations, a client-side component 165A may comprise one or more processes or threads of execution.

Depending on the type of action the end user wishes to perform using the dialog-driven application, several interactions with the DAMS may be required, e.g., over one or more connections established between a client-side component 165A and one or more servers 154 in at least some embodiments. A given interaction may, for example, comprise transmission of a set of user-generated input to the server, analysis of the user-generated initiated by the server (and performed, for example, using language models 177), and a response provided to the end user from the server. In at least some embodiments, one or more resources external to the DAMS 102 may be used by servers 154 to initiate tasks of a dialog-driven application after a set of parameters for the tasks have been obtained from the user-generated input. Such tasks may include, for example, retrieval of requested bank or credit card information from a source such as a financial organization's database, ordering of an item from a catalog, and so on. External task fulfillment resources 133 utilized by the servers 154 may include, for example, a dynamically-provisioned event driven computing service of a provider network or cloud computing environment, other computing or storage services of a cloud computing environment, resources located at data centers of the application owners, and so on. The workload distributors 147, comprising one or more computing devices, may be responsible for selecting the particular server 154 with which a given client-side component 165A is to be connected, e.g., upon receiving a connection establishment request from the client-side component in various embodiments.

In at least one embodiment, dialog-driven applications may be utilized by one or more intermediary services (ISs) 142 on behalf of some types of end users. For example, an IS 142 may comprise a support call handling service, implemented at a provider network, which handles customer support requests for one or more applications. When an end user of such an application submits an audio or text-based request for technical support, an IS request handler 144 may establish a connection between a DAMS client-side component 165B and the DAMS using run-time programmatic interfaces 155 in the depicted embodiment. At least some of the interactions of the end user may then be handled with the help of dialog-driven applications deployed at the application execution server fleet 156 in such embodiments. In some cases, if for example the problem for which support was requested cannot be fully resolved by the dialog-driven application, the responsibility for the resolution of the problem may be transferred from the DAMS to human support staff.

In various embodiments, representations or descriptors of dialog-driven applications involving one or more categories of interactions with end users, and actions to be initiated based on analysis of end user-generated inputs, may be obtained at the DAMS. Such representations may, for example, be generated as a result of the use of one or more easy-to-use application building tools 120 by application owners. The application building tools 120, may, for example, include a multi-step dialog setup coordinator responsible for enabling application developers to specify the steps of the interactions needed to determine parameter values for fulfilling various application intents, as well as a fulfillment integration coordinator responsible for inserting the appropriate hooks for invoking resources for implementing the intents into the dialog-driven application. When creating an application using such tools 120, an application owner may indicate the external task fulfilment resources to be used (if any) for the application, such as a particular function to be invoked using a dynamically-provisioned event driven computing service, and this information may be stored as part of the application descriptor or representation. Several types of configuration settings for individual categories of the interactions (or for groups of categories) may also be obtained at the DAMS 102, e.g., via one or more programmatic interfaces 125 and/or via the tools 120 in at least some embodiments. For example, an application owner may indicate that a first category of interactions of an application is to be implemented in an interruptible mode, while a second category is to be implemented in an uninterruptible mode. In some cases, various timing parameters may be specified to enable DAMS servers to determine when a particular set of user-generated input is to be considered complete, when to prompt the end user for initial input of an interaction category, and so on.

In at least some embodiments, a multi-modal network connection supporting bidirectional streaming of data may be established between a particular server 154 (selected by a workload distributor 147) and a particular client-side component 165 to enable the processing of an end user's input. The multi-model connection may have the advantage that the server 154 may be able to listen concurrently for user-generated input provided in a plurality of formats or modes, e.g., even during a time interval in which the first server transmits data to the client-side component. The plurality of formats may include, for example, (a) a voice or audio format, (b) a text format, and/or (c) a DTMF (dual-tone multi-frequency) format.

After a conversation is initiated with an end user via the network connection, the server may then interact with the end user in accordance with the configuration settings which were selected earlier for various interaction categories of the conversation. For example, based on the interruption-handling settings indicated by the application owner, the server may decide how to respond to a situation in which the end user provides new input of a particular category of interaction in the middle of a presentation of the server's output response to a previous set of user input. If the application owner had indicated that the particular category of interactions is to be configured as an interruptible category, the server may abandon the ongoing presentation of its output, discard application state information pertaining to the output which was abandoned, and initiate processing of the new user-generated input. In contrast, if the application owner had indicated that the interaction was to be implemented in an uninterruptible mode, the server may continue the ongoing presentation of output and in effect take no further immediate action in response to the new input. Timing parameters specified by the application owner may be used by the server to determine when to consider an end user utterance complete, and so on.

In at least some embodiments, machine learning resources 162 may be utilized not just to analyze and interpret user-generated input, but also to automatically tune some or all of the configuration settings chosen for dialog-driven applications. For example, in some embodiments, one or more machine learning-based parameter tuning models 178 may analyze user-generated input and server-generated responses of a particular dialog-driven application, collected (after obtaining the permissions of the end users via an opt-in interface) over some period of time. Such analysis may reveal, for example, statistical distributions of such interaction attributes as the number of times end users tend to interrupt server presentation of output, the durations of initial silences of user utterances, how often end users tend to switch between communication formats such as audio versus text versus DTMF for different interaction categories, and so on. Using such data and the parameter tuning models 178, one or more of the configuration settings (e.g., interruptibility settings, timing parameters, etc.) of a data-driven application may be modified in some embodiments.

Example Multi-Step Dialogs

Figure 2:
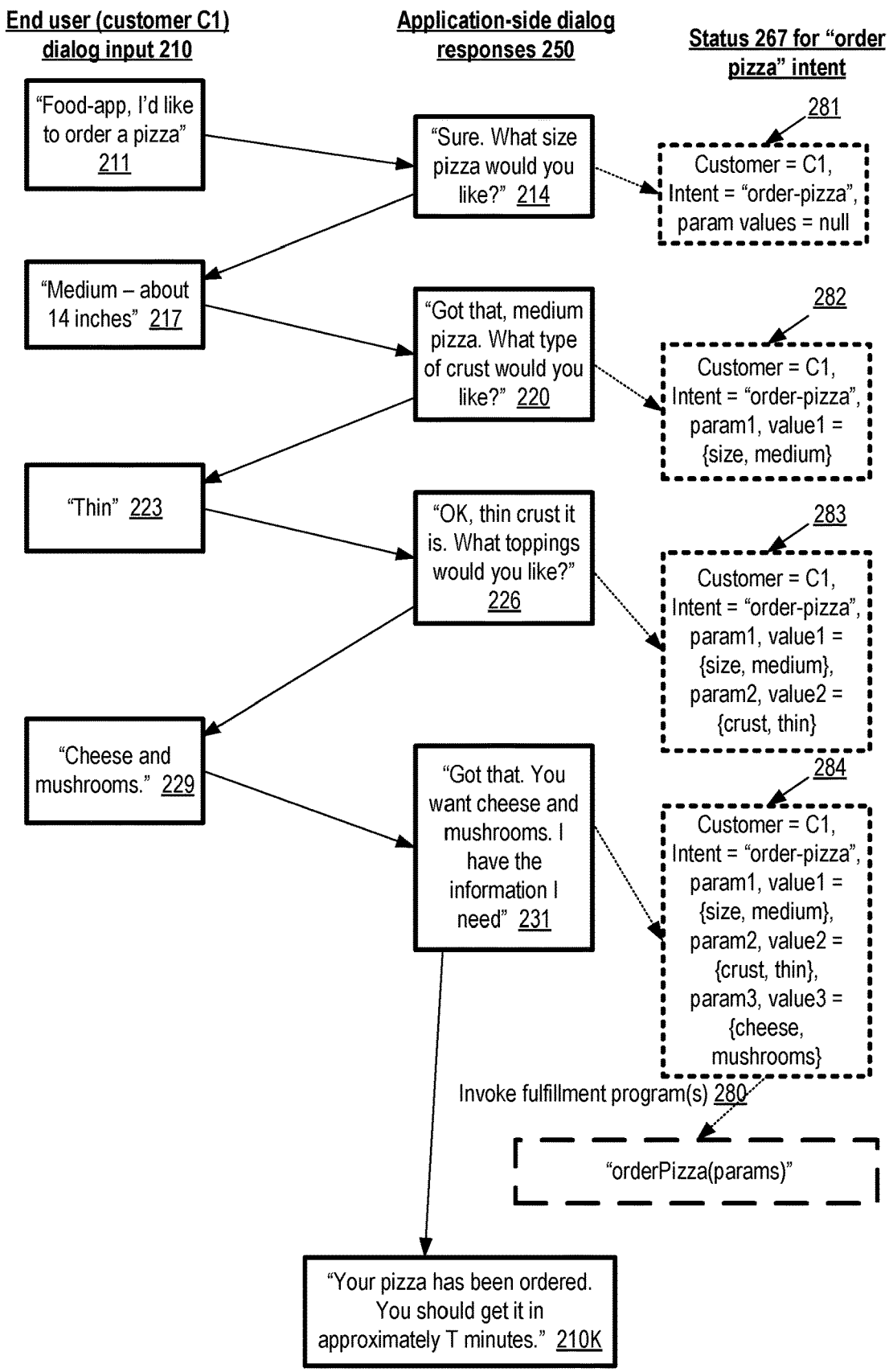
FIG. 2 illustrates example steps of a multi-step dialog for ordering a meal using conversational language, according to at least some embodiments.

FIG. 2 illustrates example steps of a multi-step dialog for ordering a meal using conversational language, according to at least some embodiments. In the depicted embodiment, a customer C1 verbally interacts with an application which has been developed and deployed using a DAMS similar in functionality to DAMS 102 of FIG. 1. Examples of the customer's verbal statements are shown in the left part of FIG. 2, labeled "End user (customer C1) dialog input 210". Examples of the application's responses corresponding to the end user input are shown under the label "Application-side dialog responses 250". As the interactions proceed, the application in effect fills out a data structure with intent parameter values, shown in the rightmost part of FIG. 2 under the label "Intent status 267 for "order pizza" intent".

The customer initiates a conversation or dialog with the application with the utterance "Food-app, I'd like to order a pizza" 211 in the depicted example. The introductory term "Food-app" may be considered a "wake word" or a "wake phrase"—a signal to distinguish the interaction with the meal-ordering application from other conversations that may be detected by the audio sensor(s) or microphone(s) being used for the application. ASR/NLP resources may be used by the DAMS server selected for the application to identify the words spoken by the customer, and to ascertain that a pizza is to be ordered. A conversational response "Sure. What size pizza would you like?" 214 may be generated as part of the application's dialog-flow and provided to the customer via a speaker component of the end user device being used. In addition, the DAMS server implementing the application may instantiate an intent called "order-pizza", store an indication of the identity of the customer (C1), and an indication that no parameter values have yet been determined for the intent (as indicated by "param values=null") in intent status 281. The owner of the application associated with the "order-pizza" intent may have indicated, via the programmatic interfaces of the DAMS, that among the parameters associated with the intent, the first one whose value should be ascertained is "size"; as a result, the phrase "what size pizza would you like" may be included in the response 214.

Customer C1 may respond with the statement "Medium—about 14 inches" 217 in the depicted example. Note that the "about 14 inches" portion of the statement 217 may be atypical and may not be part of the dialog expected by the application (e.g., if the application is designed with three pizza size indicators "large", "medium" and "small" expected to be used in the dialog). However, the NLP algorithms used by the application may be able to determine, based on analyzing the statement 217, that (a) a "medium" pizza is desired by the customer, and (b) the customer believes that the medium pizza is about 14 inches in diameter. Assuming that the diameter of the medium pizza is in fact supposed to be approximately 14 inches, the size parameter of the intent may be filled with the value "medium", as indicated in status 282. It is noted that in various embodiments, the dialog-driven application may be designed to respond appropriately to ambiguous or incorrect statements made by the end user. For example, consider a scenario in which the expected set of choices "large", "medium" and "small" for pizza sizes correspond to diameters 18 inches, 14 inches and 10 inches respectively. If the customer responds to the question about desired pizza size by saying "Medium—about 20 inches", "Medium—about 10 inches", or even "Medium—about 16 inches", the application may respond with a clarifying follow-up response roughly equivalent to the following in some embodiments—"I'm sorry, I didn't quite understand. Our medium pizzas are approximately 14 inches in diameter, our large pizzas are about 18 inches, and our small pizzas are about 10 inches. Which size would you prefer?" The management of at least some ambiguous/incorrect end user statements may also be handled without requiring the application owner to provide source code in some embodiments—for example, the word strings corresponding to the clarifying follow-up response may be provided by the owner, and the conditions under which the clarifying follow-up response is to be generated may be indicated by the owner via the programmatic interfaces of the DAMS.

The application owner may have indicated, at build time, that after a value for the pizza size has been determined, the next two parameters for which values are to be obtained from the end user are crust type and toppings. Accordingly, the application may generate the response 220, comprising "Got that, medium pizza. What type of crust would you like?" The customer may respond with a single-word answer "Thin" 223, which would enable the crust parameter value to be set as indicated in intent status 283. After the crust choice has been determined, the application may request the customer to specify toppings, e.g., using the conversational response 226: "OK, thin crust it is. What toppings would you like?" The customer may respond with a list of toppings 229, enabling the toppings parameter values to be set, as indicated in status 283.

After values for all the required parameters have been ascertained, the application may indicate that no more input is needed, e.g., by causing a statement "Got that. You want cheese and mushrooms. I have the information I need" 231 to be generated based on status 284. (The example assumes that payment information is not required—for example, a credit card that customer C1 has registered with the application may be used by default.) A fulfillment program ("orderPizza(params)") may be invoked by the dialog-driven application to initiate the task corresponding to the intent whose parameters have ben populated, as indicated by arrow 280. After the fulfillment program is successfully invoked, in some embodiments a final statement confirming the task initiation (similar to statement 210K of FIG. 2) may be generated for the customer.

As indicated by the responses (e.g., the use of the words "Sure", "OK", "Got it", "thin crust it is", etc.) generated by the application in the depicted example, in some embodiments the tone of the dialog may be fairly informal. In some implementations, multiple personas may be available for the application responses, each corresponding for example to a combination of a different tone regarding formality of the language, the gender of the voice used, the approximate age of the individual whose voice is being simulated as the application's voice, etc. The persona (or set of personas from which one is selected at run-time) may be indicated by the application owner via the application management service's programmatic interfaces at build time in various embodiments. Furthermore, in at least some embodiments, an indication of the degree to which confirmations of the customer's statements are to be provided may also be indicated by the application owner programmatically. In the depicted example, each time the application responds to a parameter value specification by the customer, a confirmation of the value is provided. Depending on the preferences of the application owner, such confirmations may not be provided for each parameter value identified; instead, for example, a pair of parameter values may be confirmed at a time, or all the parameter values may be confirmed just prior to invoking the fulfillment program.

According to at least some embodiments, a single multi-modal network connection established between a client-side DAMS component and a selected DAMS server may be used for all the steps of a dialog of the type shown in FIG. 2. Application owners may specify various parameters for one or all of the interaction categories of the dialog—e.g., how long the DAMS server being used for the application should wait after the request for "type of crust" before repeating the request, how long a period of silence should be before an utterance of the customer (such as "cheese and mushrooms" in response to the toppings question) is to be considered complete, whether any of responses of the application are to be considered interruptible or not, and so on.

Figure 3:
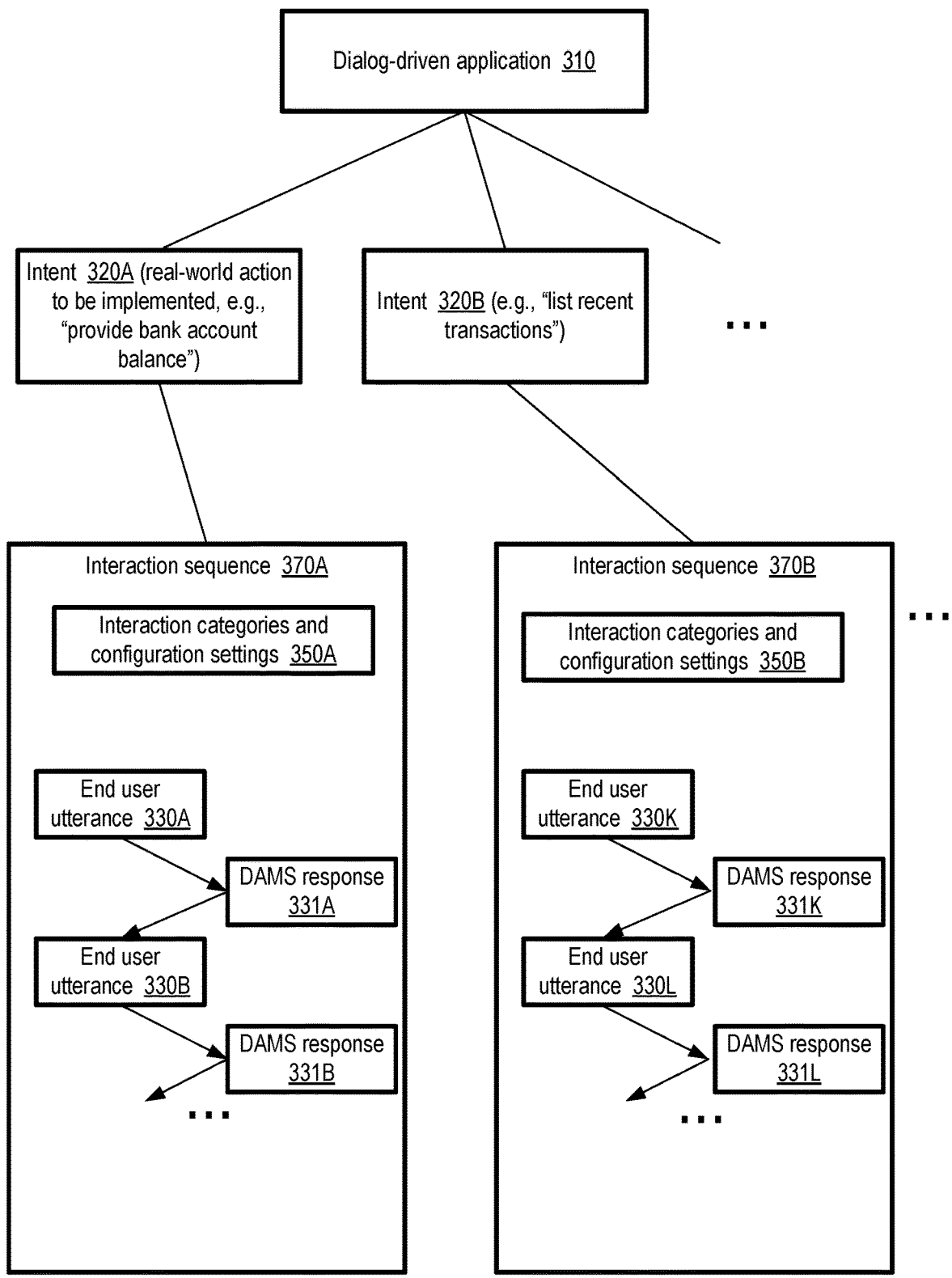
FIG. 3 illustrates an example of a dialog-driven application with customized configuration of interactions associated with respective intents, according to at least some embodiments.

FIG. 2 illustrated a multi-step dialog which may be used for a particular intent of a given dialog-driven application. Generally speaking, a given dialog-driven application may be used to fulfil a variety of related intents; each intent in turn may require the analysis of user-generated input for one or more categories of interactions, and configuration settings including interruption-handling and timing parameters may be chosen for some interaction categories independently of those chosen for other categories. FIG. 3 illustrates an example of a dialog-driven application with customized configuration of interactions associated with respective intents, according to at least some embodiments. In the embodiment depicted in FIG. 3, dialog-driven application 310 is designed to execute a plurality of intents such as intent 320A and intent 320B. Intent 320A may correspond to a first real-world task or action to be implemented on behalf of an end user of the application 310, such as the equivalent of "provide bank account balance", while intent 320B may correspond to a different real-world task or action to be implemented on behalf of an end user, such as the equivalent of "list recent transactions".

In order to fulfill the intent 310A, an interaction sequence 370A may be used to obtain the parameters needed, while a different interaction sequence 370B may be used to obtain the parameters needed to fulfill intent 310B. Each interaction sequence may comprise some number of end user utterances 330, each typically followed by a DAMS response 331. For example, interaction sequence 330A may include end user utterance 330A, followed by DAMS response 331A, end user utterance 330B and DAMS response 331B in that order, while interaction sequence 330B may include end user utterance 330K, followed by DAMS response 331K, end user utterance 330L and DAMS response 331L in that order. Note that the term "utterance" is used herein to refer to a logically connected set of user generated input expected by a dialog-driven application based on the application's logic at a particular phase or stage of an interaction sequence, and is not limited to input provided in audio or verbal format alone—e.g., a given utterance may include audio, text, DTMF and/or other forms of input in at least some embodiments.

In the embodiment depicted in FIG. 3, the interactions of an interaction sequence 370 may be classified into one or more categories, with individual ones of the categories comprising one or more end user utterances and one or more DASM responses. Metadata indicating the interaction categories and associated configuration settings 350 (e.g., 350A or 350B), such as interruptibility settings, timing parameters, etc., may be stored in an application metadata repository similar to repository 116 of FIG. 1 in the depicted embodiment. As it receives and processes the user-generated input for a given intent of a given dialog-driven application, a DAMS server may use such metadata to identify the current interaction category and applicable configuration settings in various embodiments, and take actions (such as ignoring or processing user input which represents an interruption during the presentation of a DAMS response) accordingly.

Example Use of Multi-Modal Connections

Figure 4:
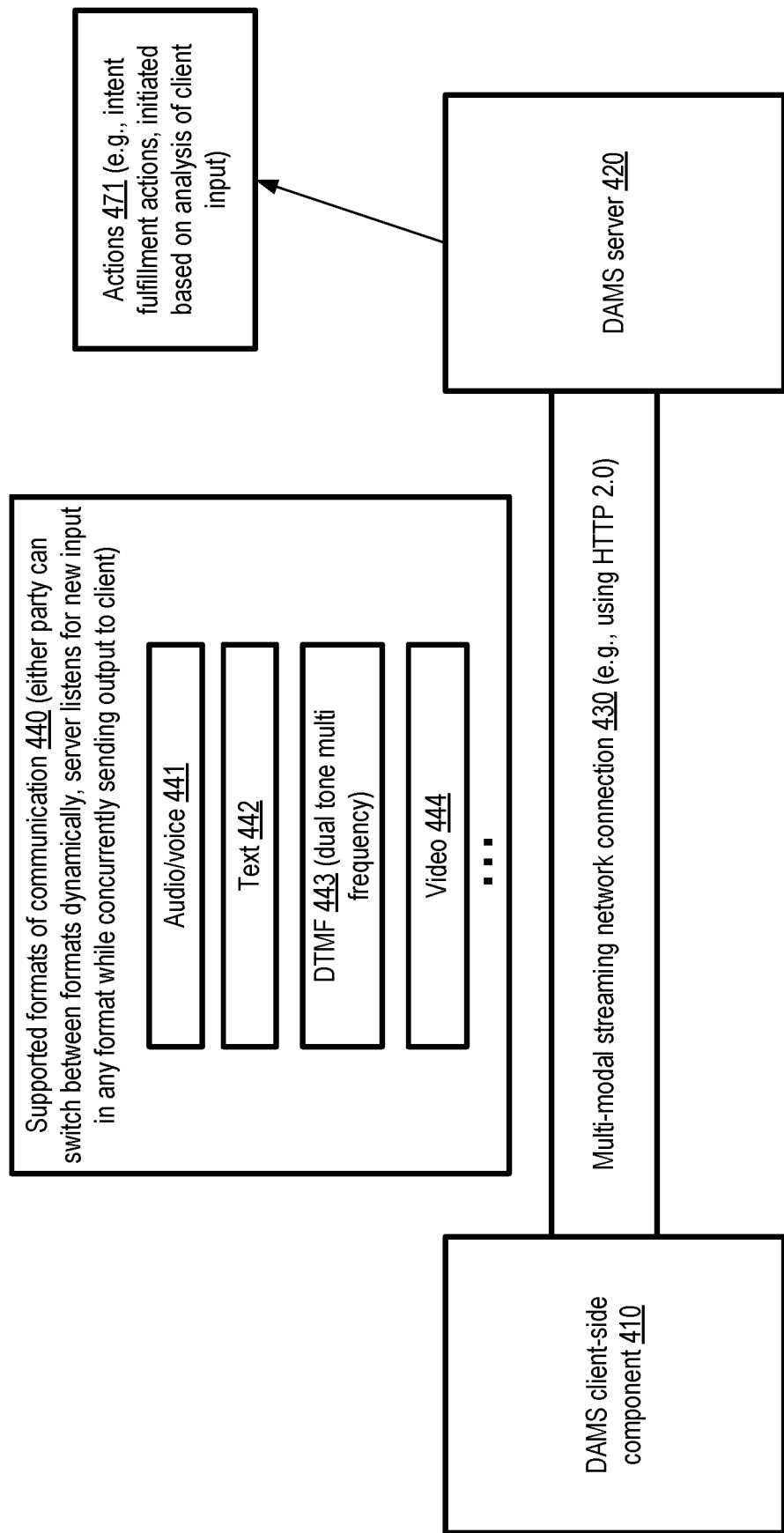
FIG. 4 illustrates an example configuration in which a multi-modal streaming network connection may be established between a server and a client-side component of a dialog-driven application management service, according to at least some embodiments.

FIG. 4 illustrates an example configuration in which a multi-modal streaming network connection may be established between a server and a client-side component of a dialog-driven application management service, according to at least some embodiments. An entire conversation associated with at least one intent of a dialog-driven application may be conducted with an end user using such a connection, thus reducing connection establishment related overhead substantially compared to scenarios in which multiple connections may be used for respective portions of the application.

In the embodiment depicted in FIG. 3, a DAMS server 420 has been selected from a fleet of DAMS servers to process the input generated by a client of a dialog-driven application. A single multi-modal streaming network connection 430 is established between the DAMS server 420 and a DAMS client-side component 410 configured to transmit the client's input messages/requests to the DAMS. In some implementations, HTTP 2.0 (or some variant thereof) may be used as the application layer protocol for the communication. In other implementations, other protocols may be used. The connection 430 may also be referred to as a bidirectional streaming communication channel or bidirectional streaming communication pathway. A plurality of formats or communication modes may be used for conveying representations of the client's input to the DAMS server 420 via connection 430, and in some cases for conveying responses from the DAMS server 420 to the client in the depicted embodiment. For example, supported formats of communication 440 may include at least audio/voice 441, text 442, DRMF 443, and video 444 in the depicted embodiment. The client-side component 410 and/or the server 420 may switch or transition dynamically between the different formats in some embodiments, e.g., in the middle of a given data transfer or utterance or between successive utterances. Furthermore, in at least one embodiment, the DAMS server 420 may be configured to listen for new input from the client-side component in any of the formats while at the same time sending output to the client-side component. In some implementations, a publisher/subscriber model associated with the reactive streams programming model may be used, with the DAMS server in the role of the subscriber and the client-side component in the role of a publisher.

As and when new user generated input is received at the DAMS server 420 in the depicted embodiment, the server may initiate processing of the received input (except in some cases in which the presentation of the server's output is being interrupted and the applicable interruptibility settings indicate that the new input should be ignored/discarded), e.g., using machine learning models and/or logic indicated by the application owner. The results of the analysis may lead to the initiation of one or more actions 471 in some cases, e.g., after a set of parameters of the action have been collected by the server 420. In at least one embodiment, as discussed in the context of FIG. 5, the user-generated input may be subdivided into smaller units called input events, and the analysis may be initiated for at least some events as soon as the event is received at the DAMS server. In some embodiments, multi-modal streaming connections may not be used; instead, for example, separate connections may be set up for each mode or format of user-generated input.

Example Subdivision of User-Generated Input into Events

Figure 5:
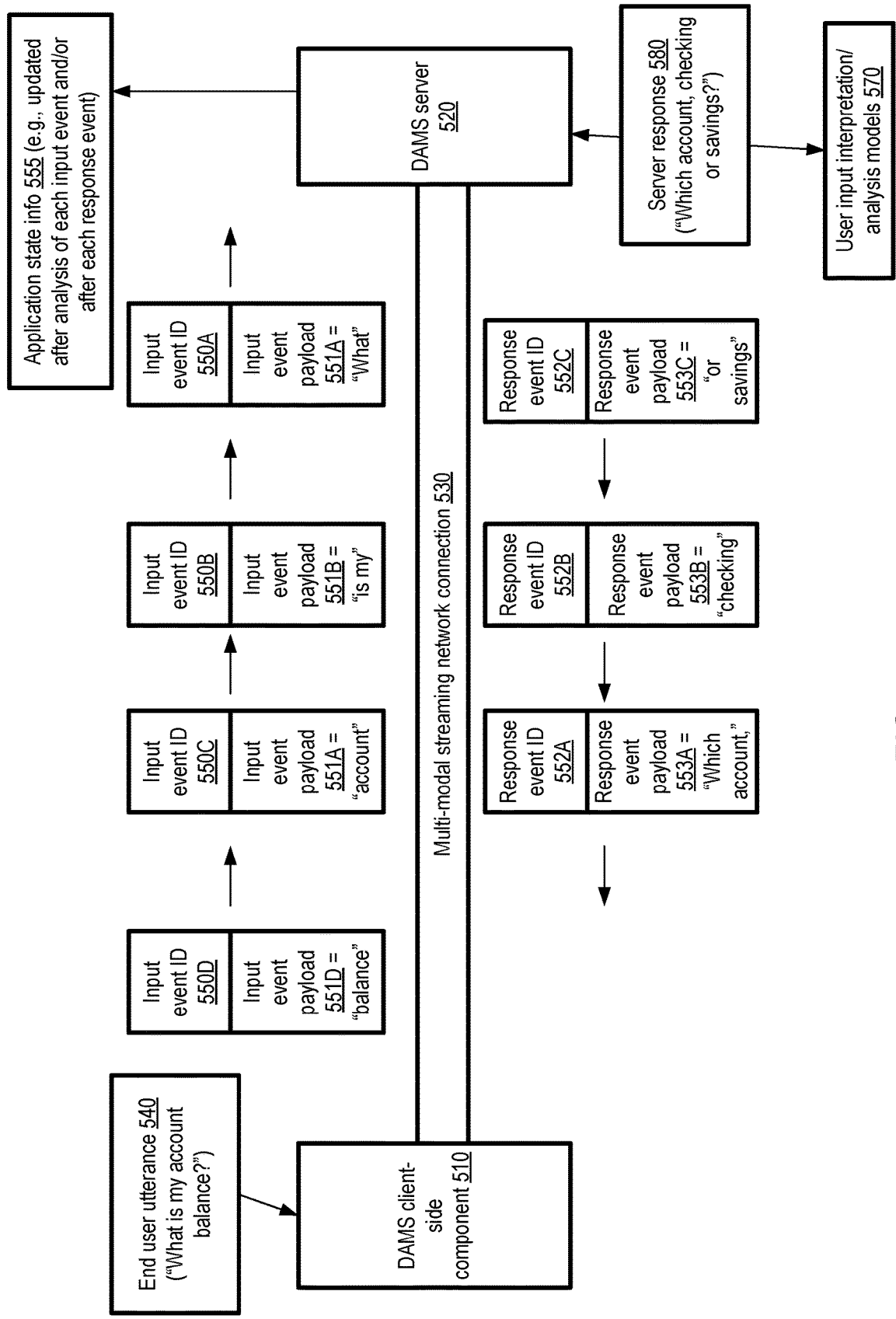
FIG. 5 illustrates an example subdivision of an end user utterance into a plurality of events, according to at least some embodiments.

FIG. 5 illustrates an example subdivision of an end user utterance into a plurality of events, according to at least some embodiments. In the depicted embodiment, a multi-modal connection 530 which enables bidirectional streaming of data in multiple formats is established between a DAMS client-side component 510 and a DAMS server 520. An end user utterance 540, comprising the words "What is my account balance?" in audio format, is captured at the client-side component 510.

A digital representation of the utterance 540 may be generated at the client-side component 510, and transferred to the DAMS server 520 via the connection 530 as a sequence of smaller units called input events in the depicted embodiment. Each input event may be assigned a respective unique event identifier 550 (e.g., by the client-side component), and may comprise a payload 551 indicating a portion of the content of the utterance 540 (e.g., a few hundred bytes). The sizes of the input event payloads may vary in different embodiments, and may be a tunable parameter in at least some embodiments. In the depicted example, input event payload 551A with associated event ID 550A may represent the digital representation of the word "What", input event payload 551B with associated event ID 550B may represent the digital representation of the combination of words "is my", input event payload 551C with associated event ID 550C may represent the digital representation of the word "account", while input event payload 551D with associated event ID 550D may represent the digital representation of the word "balance". End user utterances 540 may be split up into events in this way in various embodiments for a number of reasons, e.g., so that the processing of the utterance by the DAMS can be initiated as soon as possible (instead of waiting for the entire utterance to be received in one unit), so that the DAMS can attempt to interpret the utterance as a whole even if some parts of the utterance happen to be lost or are received out of order, and so on.

As the input events are received at the DAMS server 520 via the multi-modal streaming network connection 530, the DAMS server 520 may transmit the events (e.g., one at a time, or in groups) to one or more user input interpretation/analysis models 570 in the depicted embodiment. The models may in turn provide a server response 580 (such as the sequence of words "Which account, checking or savings?") to the DAMS server, e.g., after analysis of at least some of the input events has been completed. A digital version of the server response may also be broken up into smaller units called response events in the depicted embodiment, each comprising a respective response event identifier 552 and a response event payload 553. As with input event payloads, the sizes of the response event payloads may vary in different embodiments, and may be a tunable parameter in at least some embodiments. In the depicted example, response event payload 553A with associated event ID 552A may represent the digital representation of the words "Which account", response event payload 553B with associated event ID 552B may represent the digital representation of the word "checking", while response event payload 553C with associated event ID 552C may represent the digital representation of the words "or savings".

In at least some embodiments, the DAMS server 520 may update application state information 555 (e.g., of a banking-related dialog-driven application in the depicted example) as input events are received and analyzed, and as response events are transmitted. In some implementations, the state information 555 may be updated after every input event and/or after every response event. In other implementations, the state information 555 may not necessarily be updated after each event; instead, it may be updated after a small number of input or response events, depending on the logic of the application. At a given point in time, the state information 555 may, for example, indicate the extent of the progress achieved thus far within an expected sequence of interactions associated with an intent, the parameters (if any) of the intent whose values have been determined thus far, the confidence with which the user input has been interpreted thus far, and so on.

Example Interruption-Handling Settings

FIG. 6 illustrates example interruptibility settings which may be selected for respective interaction categories of a dialog-driven application, according to at least some embodiments. Interruptibility settings may also be referred to as interruption-handling settings. In many cases, an end user may provide some set of input for a dialog-driven application, and then wait for the entire response generated by the DAMS before providing the next set of input. However, there may be scenarios in which an end user does not wish to wait for the entire response to be presented before providing the nest set of user-generated input. This may be the case for a variety of reasons, e.g., because the end user has decided to change something in their previous input, because the end user is able to provide the next set of input without having to process the entire response, and so on. In some embodiments in which multi-modal bidirectional streaming connections of the kind discussed above are set up between DAMS servers and client-side components, the DAMS server may be able to detect such client interruptions and take corresponding actions. In some cases, the "interrupting" user-generated input (the input provided by the end user without waiting for completion of the output being sent from the DAMS) may even be in a different mode or format that the end user's previous input—e.g., a user may interrupt using text or DTMF although the previous set of input was provided in audio format. Because the DAMS server may be configured to concurrently listen for input in any of the supported formats, it may be able to detect when an interruption of any type is attempted by the client. In at least some embodiments, the DAMS may be designed to respond to some types of interruptions by terminating the ongoing presentation of DAMS server-generated output and beginning the analysis of the new interrupting input.

For some types of DAMS-provided output, however, the completion of the presentation of a portion of the output may be required by the logic of the dialog-driven application and/or by applicable regulations/policies. For example, when dealing with some types of financial transactions, a set of terms and conditions may have to be presented to the end user, even if the end user is not necessarily interested in the details of the terms and conditions. In another example, for some types of dialog-driven medicine or health-related applications, a complete presentation of a portion of the output generated by the application (e.g., indicating a dosage of a medicine) may be mandatory or at least preferable. As such, depending on the kind of information being provided or presented from the DAMS server to the end user, some interruptions during the middle of the presentation of the information may have to be ignored.

In order to enable dialog-driven applications to respond flexibly to interruptions, by either accepting new user input (and abandoning the ongoing presentation of the current server output), or by continuing the presentation, in various embodiments a DAMS may enable application owners to specify respective interruptibility settings for different groups or categories of interactions.

In FIG. 6, a baseline scenario, scenario A, depicts a situation in which an end user does not attempt to interrupt a response from a DAMS server. A set of user-generated input 601 of an interaction category IC1 is transmitted from a DAMS client-side component 610 to a DAMS server 620. The input is analyzed, e.g., using machine learning or other techniques as discussed earlier, and a set of server-generated output 602 of the interaction category IC1 is prepared and presented to the end user via the DAMS client-side component. The end user does not generate any new input until all of the server's response has been presented.

In scenario B of FIG. 6, interaction category IC1 has been designated as "interruptible", e.g., based on one or more programmatic requests from the application owner and/or based on preferences indicated programmatically by the application owner during the creation of the application. As in scenario A, a set of user-generated input of category IC1 is sent to the DAMS server 620 from a client-side component 610. The DAMS server commences the transmission and presentation of the same type of response as was presented in scenario A. However, after an initial portion 603 of the server-generated output has been provided, the end user provides new "interrupting" input 612 (using the same format or mode of communication as was used for the input 601, or a different format/mode). Because of the interruptible setting for IC1, the presentation of the remaining portion of server-generated output 604 may be abandoned/terminated in the depicted embodiment. In addition, in at least some embodiments, a portion of application state information associated with the server-generated output may be discarded (e.g., by setting a flag indicating that the state information is invalid, or by actually deleting the state information). The processing of the interrupting user-generated input 612 may be initiated by the DAMS server in scenario B. In effect, the new user-generated input may cause the DAMS server to undo some of the work it had initiated in response to earlier-receive user-generated input in the depicted embodiment.

In scenario C of FIG. 6, interaction category IC1 has been configured as uninterruptible by the application owner, indicating to the DAMS that if an end user attempts to interrupt the presentation of ongoing server-generated output, the presentation of that output should be completed. User-generated output 601 is sent to the DAMS server 620 as in scenarios A and B, and the presentation of the server-generated output 603 begin. The end user causes interrupting input 612 to be detected at the DAMS server. However, because of the uninterruptible setting for IC1, the presentation of the remaining portion of server-generated output 604 is continued in the depicted embodiment. In some embodiments, the interrupting input 612 may be discarded by the DAMS; in other embodiments, it may be saved and processed later.

Example Timing Parameters

Figure 7:
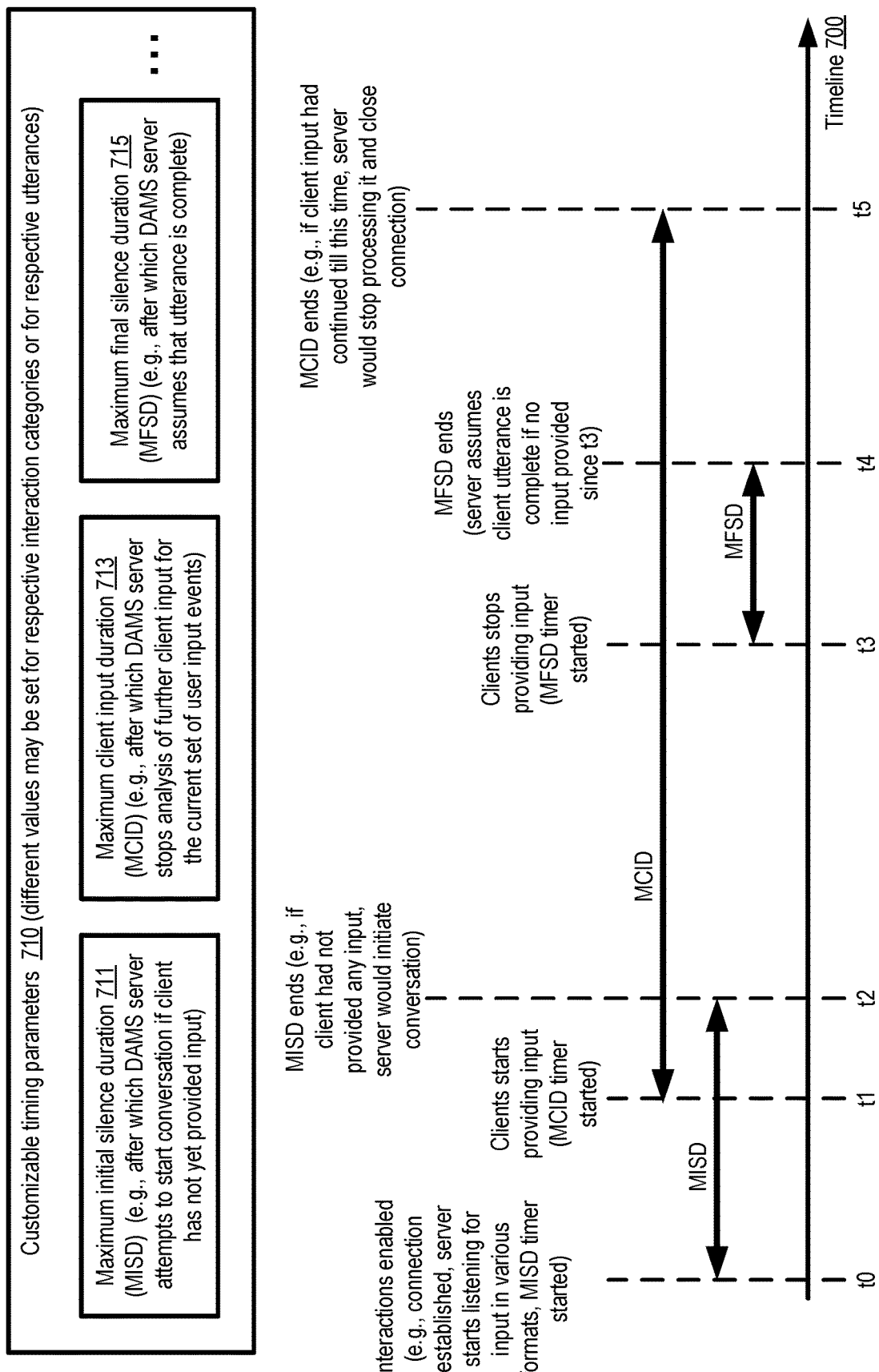
FIG. 7 illustrates example timing parameters which may be customized for respective interaction categories of a dialog-driven application, according to at least some embodiments.

FIG. 7 illustrates example timing parameters which may be customized for respective interaction categories of a dialog-driven application, according to at least some embodiments. Timeline 700 shows a sequence of events associated with the transmission of a set of user-generated input, as part of a particular category of interactions of a dialog-driven application, from a client-side component to a DAMS server. Respective values of one or more customizable timing parameters 710 may be set by an application owner via programmatic interfaces of the DAMS for various interaction categories in the depicted embodiment, or for specific utterances of a particular interaction category expected from a client. A maximum initial silence duration (MISD) parameter 711 may indicate how long a DAMS server should wait for an initial input event after a connection with a client-side component is established, before sending a server-generated prompt (server-generated output requesting user-generated input) to the user to begin the dialog. A maximum client input duration (MCID) parameter 713 may indicate the maximum acceptable time period, after a client starts providing input, for which the DAMS should accept the provided input before considering the utterance complete and stopping analysis of further input. In effect, the MCID may be used to discard a portion of user-generated input which is received after the MCID ends. A maximum final silence duration (MFSD) parameter 715 may indicate the maximum length of a silent period (a period in which the client does not provide any additional input after already having provided some input) after which the DAMS should assume that the client's utterance has been completed (and therefore store an indication of the completion of the utterance). Settings of only one of the MCID and the MFSD parameters may have to be used by a DAMS server to determine when a given client utterance should be considered complete in some embodiments, and to initiate presentation of a response to the utterance. For example, either a period of silence no shorter than the MFSD may be assumed to signal the end of the utterance, or the input provided by the client may simply be truncated based on the MCID and the amount of input provided prior to the truncation may be designated as the utterance.

Customization of parameters such as MISD, and MFSD may be beneficial, for example, because different phases or interactions of a sophisticated dialog-driven application may involve different types of behaviors on the part of the end users. For some queries presented by the DAMS, users may need more time to look up, decide, recall and/or provide intent parameters than for others, for example. Furthermore, end users may often interact with the DAMS from environments in which there are additional conversations unrelated to the dialog-driven application being conducted (and hence potentially detected by the client-side components of the DAMS and conveyed to the DAMS server).

At time t0 along timeline 700, interactions of one or more categories between the client or end user and the DAMS server may be enabled in the depicted embodiment. For example, a connection may be established between the client-side component of the DAMS and a particular server of the DAMS, and the server may start listening for input in various formats/modes. A timer associated with a MISD parameter setting may be started at the DAMS server in the depicted embodiment. If the end user does not provide any input (i.e., remains silent, and does not enter any text or any DTMF signals) between t0 and t2, when the MISD ends, the DAMS server may itself attempt to initiate a conversational interaction with the client, e.g., by presenting a message such as "How can I help you?"

In the example scenario shown in FIG. 7, the client starts providing input at some time t1 before t2, so the expiration of the MISD may be ignored by the DAMS server in the depicted embodiment. An MCID timer is started at the DAMS server at t1. The client stops providing input at time t3 (e.g., the client does not provide any new input between t3 and some threshold time after t3), and an MFSD timer is started by the DAMS server. At time t4, the MFSD ends, and the DAMS server assumes that the client utterance is complete because no additional input has been provided by the client in the period between t3 and t4. If the client had instead continued to provide input between t1 and t5 (when the MCID ends) or provided additional input between t3 and t4 and continued providing input until t5, the DAMS server may stop processing any input received after t5 and consider the utterance complete at t5 in the depicted embodiment.

In at least one embodiment, format-specific or communication mode-specific values may be chosen for one or more timing parameters of the kind illustrated in FIG. 7. For example, respective distinct MISD, MCID or MFSD values could be selected for voice, text, DTMF, video or other formats of end user input for one or more interaction categories in such an embodiment. Depending on the specific format being used by the end user for a particular interaction and the corresponding format-specific timing parameter values, corresponding operations (such as prompting the end user to start the dialog, or discarding some portions of end user input) may be scheduled and performed at the DAMS at different points in time.

Example Programmatic Interactions for Interruptibility and Timing Parameters

Figure 8:
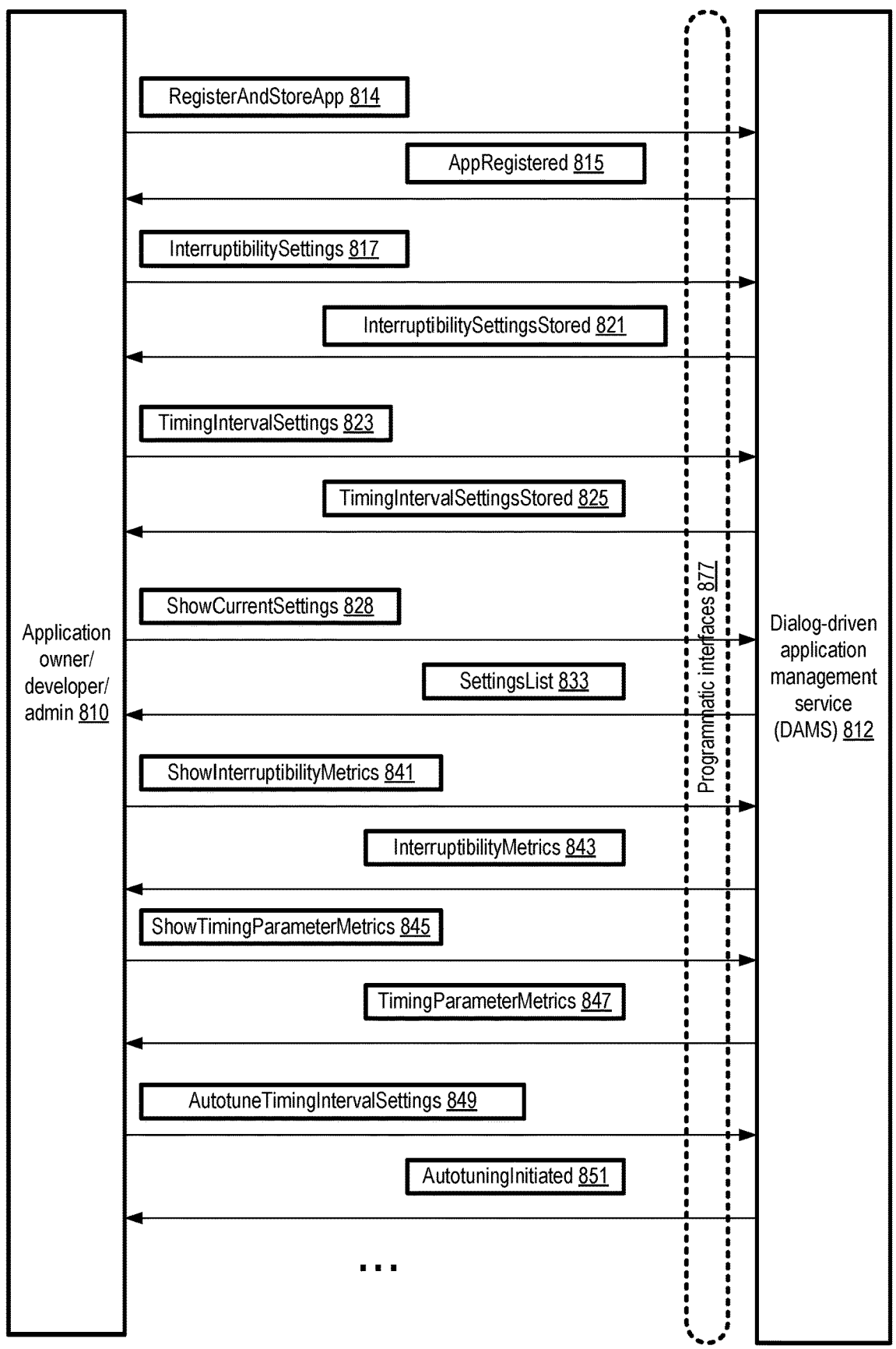
FIG. 8 illustrates example programmatic interactions associated with interruptibility and timing parameters of dialog-driven applications, according to at least some embodiments.

FIG. 8 illustrates example programmatic interactions associated with interruptibility and timing parameters of dialog-driven applications, according to at least some embodiments. A DAMS 812, similar in features and functionality to DAMS 102 of FIG. 1, may implement a set of programmatic interfaces 877 to be used by application owners (e.g., developers or administrators of dialog-driven applications) to submit requests, provide configuration settings and the like, and to receive corresponding responses from the DAMS 812. The programmatic interfaces 877 may, for example, include one or more web-based consoles, command-line tool, APIs, graphical user interfaces and the like.

An application owner 810 may cause a descriptor or representation of a particular dialog-driven application to be registered and stored at the DAMS 812 using a RegisterAndStoreApp request 814 in the depicted embodiment. In at least some embodiments, one or more tools supported by the DAMS 812 (similar to application building tools 120 of FIG. 1) may be used by the application owner to prepare the application, e.g., without providing source code, and an application descriptor (along with associated automatically generated code) created using such a tool may eventually be registered at the DAMS using the RegisterAndStoreApp request. The representation of the application may, for example, include indications of one or more categories of interactions expected between a client and the application to fulfil one or more intents, actions to be initiated in response to analysis of user-generated input provided in the interactions, and so on. After storing the application representation (including code and initial configuration settings), an AppRegistered message 815 may be sent by the DAMS to the application owner in at least some embodiments.

An application owner 810 may submit one or more InterruptibilitySettings messages 817 to the DAMS in some embodiments, specifying whether particular categories of interactions of a given application are to be implemented in interruptible mode or in uninterruptible mode. In response, the settings may be saved by the DAMS and an InterruptibilitySettingsStored message 821 may be sent to the application owner in at least one embodiment. In some embodiments, the DAMS 812 may designate interactions as interruptible by default, so that an interaction is only configured as uninterruptible if the application owner explicitly requests the uninterruptible setting for it. In other embodiments, the DAMS 812 may use uninterruptible as the default setting, and only configure an interaction or category of interactions as interruptible in response to an explicit request. In one embodiment, the particular setting to be used as the default (interruptible or uninterruptible) by the DAMS may itself be indicated by an application owner.

One or more timing interval settings of the kind shown in FIG. 7, to be used for a given category of interactions (or for an application as a whole), may be indicated by an application owner via a TimingIntervalSettings message 823 in the depicted embodiment. The DAMS may store the requested settings, and send a TimingIntervalSettingsStored message 825 to the client. Respective default settings may be used by the DAMS for parameters (e.g., for MISD, MCID and MFSD) for which an application owner does not specify a value for a given category of interactions in some embodiments.

An application owner may submit a ShowCurentSettings request 828 in at least some embodiments to view interruptibility and/or timing parameter settings in use for an application. The requested settings may be indicated via one or more SettingsList response messages 833.

In some embodiments, an application owner may wish to view one or more metrics associated with interruptibility and/or timing parameters, such as the number of times end users attempted to interrupt presentation of server-generated output, the number of times end users continued to provide input beyond the maximum client input duration, and so on. A ShowInterruptibilityMetrics request 841 may be submitted by the application owner to view interruptibility-related metrics of a given application, and the corresponding metrics may be provided via one or more InterruptibilityMetrics messages 843. Similarly, a ShowTimingParameterMetrics request 845 may be submitted by the application owner to view timing parameter related metrics, and the corresponding metrics may be provided via one or more TimingParameterMetrics messages 847.

In at least some embodiments, the DAMS may use machine learning models (e.g., similar to the parameter tuning models 178 shown in FIG. 1), if desired, to automatically optimize the settings for various parameters including timing parameters of the kind discussed in the context of FIG. 7. An AutotuneTimingIntervalSettings request 849 may be submitted to trigger such automated tuning for a specified application in the embodiment depicted in FIG. 8. In response, the DAMS may send an AutoTuningInitiated message 851, start the analysis of records of various interactions with the application (stored after receiving permissions from the end users involved) and tune one or more of the parameters based on the analysis. For example, if the records indicate that many end users appear to be taking longer to complete a particular utterance associated with a particular intent than the maximum client input duration parameter (MCID) for that utterance, the MCID parameter value may be increased in one embodiment.

Methods for Managing Interruptibility and Timing Parameters

Figure 9:
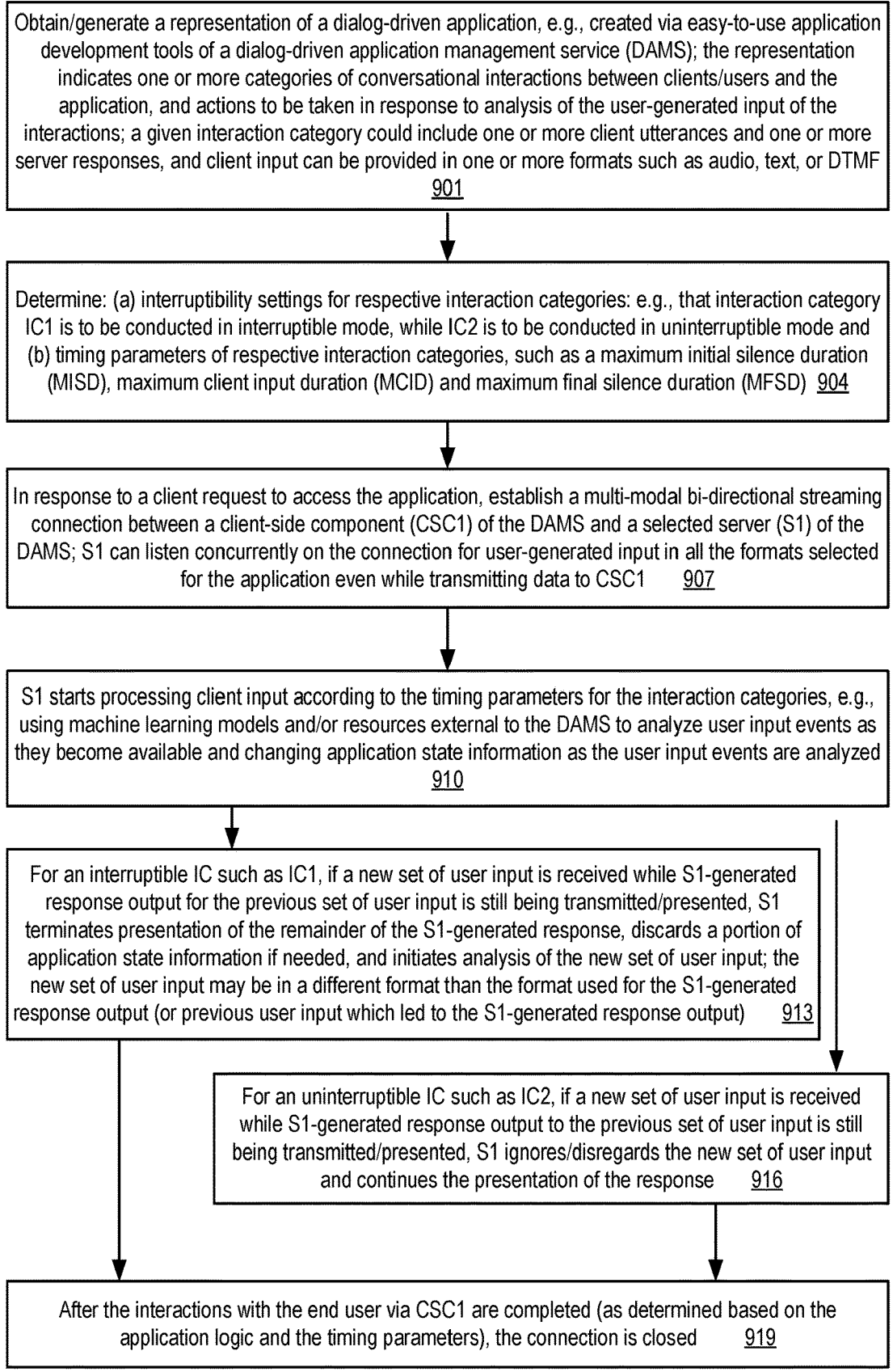
FIG. 9 is a flow diagram illustrating aspects of operations which may be performed to enable configuration of interruptibility and timing parameters of a dialog-driven application, according to at least some embodiments.

FIG. 9 is a flow diagram illustrating aspects of operations which may be performed to enable configuration of interruptibility and timing parameters of a dialog-driven application, according to at least some embodiments. As shown in element 901, a representation of a dialog-driven application, e.g., created via easy-to-use application development tools of a dialog-driven application management service (DAMS) similar in functionality to DAMS 102 of FIG. 1 may be obtained or generated. The representation may indicate one or more categories of conversational interactions between clients/users and the application, and actions to be taken in response to analysis of the user-generated input of the interactions. A given interaction category may include one or more client utterances (logically related user input elements for which a server response can be generated based on the application's logic) and one or more corresponding server responses. Client input may be provided in one or more formats such as audio, text, or DTMF in various embodiments.

The DAMS may determine, e.g., based on input received via programmatic interfaces, (a) interruptibility settings for respective interaction categories: e.g., that an interaction category IC1 is to be conducted in interruptible mode, while another interaction category IC2 is to be conducted in uninterruptible mode and/or (b) timing parameters of respective interaction categories, such as a maximum initial silence duration (MISD), maximum client input duration (MCID) and maximum final silence duration (MFSD) in the depicted embodiment (element 904).

In response to a client request to access the application, a multi-modal bi-directional streaming connection may be established between a client-side component (CSC1) of the DAMS and a selected server (S1) of the DAMS (element 907). S1 may listen concurrently on the connection for user-generated input in all the formats selected for the application, e.g., even while transmitting data to CSC1 in at least some embodiments.

S1 may start processing client input according to the timing parameters for the interaction categories of the application (element 910). For example, as indicated in the context of FIG. 7, S1 may start respective timers corresponding to an initial period during which the client provides no input after the connection is set up, the time for which the client continues to provide input once the client begins providing input, and/or the time for which the client does not provide input after having provided some input, and take actions based on the expirations of such timers. The user input may be subdivided into smaller units called user input events as discussed in the context of FIG. 5 before it is transmitted to S1. S1 may utilize machine learning models and/or resources external to the DAMS to analyze user input events as they become available, and change application state information as the user input events are analyzed.

For an interruptible interaction category such as IC1, if a new set of user input is received while presentation/transmission of S1-generated response output to the previous set of user input is still underway or in progress, S1 may terminate presentation of the remainder of the S1-generated response, discard a portion of application state information pertaining to the S1-generated response if needed, and initiate analysis of the new set of user input in at least some embodiments (element 913). In contrast, for an uninterruptible interaction category such as IC2, if such a new set of user input is received while presentation/transmission of S1-generated response output to the previous set of user input is underway or in progress, S1 may disregard the new set of user input and continue the presentation of the S1-generated response in various embodiments (element 916). After the interactions with the end user via CSC1 are completed (as may be determined based on the logic of the application and on the timing parameters), the connection between CSC1 and S1 may be closed in at least some embodiments (element 919).

Example System Environment with Connection Duration-Based Resource Management

As discussed above, bidirectional streaming connections may be used for interactions between end users and a dialog-driven application management service in at least some embodiments. The time taken for processing and fulfilling a given end user request submitted via such a connection may vary, e.g., depending on the amount of time taken to process the contents of the associated end user input, the kinds of external resources utilized to fulfill the request, and so on. Furthermore, in some embodiments, a single connection may potentially be used for multiple interactions associated with one or more intents of the application. As a result, the time period for which a given connection remains in use may be quite long, e.g., on the order of several minutes in some cases. The resources (e.g., one or more execution threads, memory, etc.) allocated for a given connection at a given server may thus remain in use for the same end user for a while. Some dialog-driven applications and/or some clients of such applications may tend to use connections which remain established for longer times than other applications or clients. From a resource management and fairness perspective, it may therefore be beneficial to take the durations of other connections into account when making a decision as to whether a new connection should be established at a given server in response to a request from a DAMS client for a particular application. If such duration information or other metrics pertaining to the accumulated resource usage of different requests is not taken into account, it may sometimes be the case that requests which use long-running connections end up using a disproportionately large subset of the resources available at the DAMS. Note that at the time that a connection is established, it may not be straightforward to predict exactly how long it will remain in use in at least some embodiments.

Figure 10:
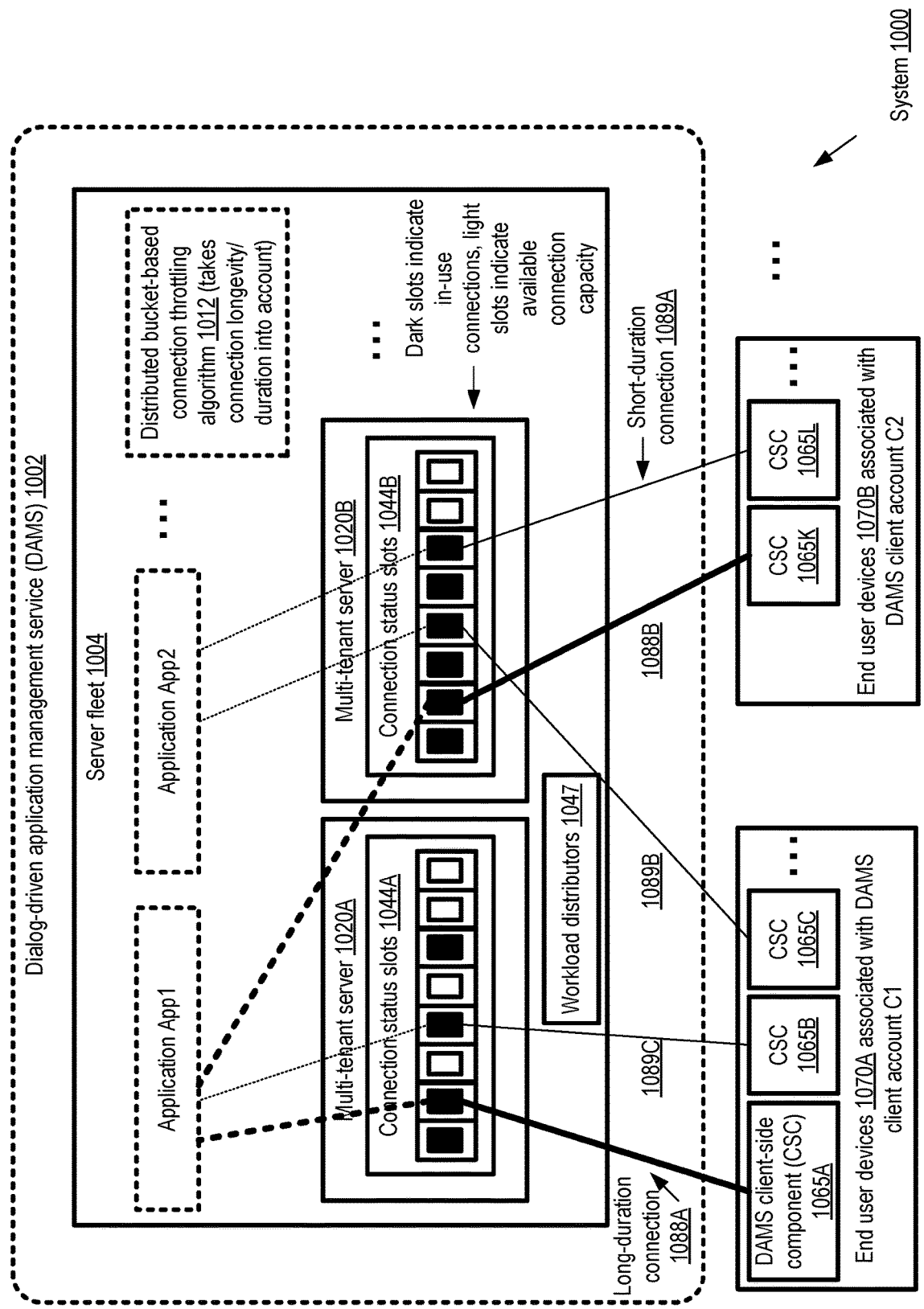
FIG. 10 illustrates an example system environment in which resource management techniques which take the duration of network connections being used for dialog-driven applications into account are utilized, according to at least some embodiments.

FIG. 10 illustrates an example system environment in which resource management techniques which take the duration of network connections being used for dialog-driven applications into account are utilized, according to at least some embodiments. In the depicted embodiment, system 1000 comprises resources and artifacts of a DAMS 1002, similar in features and functionality to DAMS 102 of FIG. 1. Note that to emphasize resource management aspects, several DAMS components shown in FIG. 1 (such as machine learning resources 162, application metadata repository 116, control plane components 111 and the like) are not re-shown in FIG. 10.

A plurality of dialog-driven applications including App1 and App2 may be implemented using server fleet 1004 of DAMS 1002. At least some of the servers of the sever fleet 1004 may be multi-tenant, in that they may each be used to process requests directed to multiple applications, and/or to process requests from multiple clients or end users of the DAMS. A given server, such as multi-tenant server 1020A or 1020B, may allocate a subset of its available resource capacity to handle the workload associated with a given connection established with a DAMS client-side component (CSC). Multi-modal bidirectional streaming connections of the kind discussed earlier (e.g., in the context of FIG. 4) may be employed in at least some embodiments. For any given connection and the associated end user requests, for example, one or more server threads or processes may be assigned, some amount of memory may be allocated, some number of back-end connections to other servers running machine learning models and the like may be set up, and so on. Depending for example on its hardware and software, a given multi-tenant server 1020A may have sufficient resources for handling no more than a particular number of connections from client side components in the depicted embodiment.

Some of the connections established on behalf of end users of applications such as App1 and App2 may be longer lasting than others. For the purposes of describing the resource management techniques in use in system 1000, assume that a connection is classified as a long duration connection if it remains open for more than a selected threshold of N seconds; connections which remain open for less than N seconds are classified as short duration connections. In FIG. 10, client-side components of the DAMS 1002 running at two groups of end user devices are shown: end user devices 1070A associated with a DAMS client account C1, and end user devices 1070B associated with a DAMS client account C2. End user devices 1070A are used to run client-side components (CSCs) 1065A, 1065B and 1065C, while end user devices 1070B are used to run CSCs 1065K and 1065L. Any of a variety of end user devices may be used to run the CSCs in different embodiments, such as automated personal assistant devices, smart phones, mobile devices, game devices, laptops, tablets, desktop computers, and/or compute instances of a provider network. The availability of resources for additional connections at servers 1020A and 1020B is shown using a respective collection of connection status slots 1044 (e.g., 1044A and 1044B), with a filled-in or dark slot indicating an in-use connection, and a light slot indicating available resources for establishing a new connection. Note that the slots shown in FIG. 10 represent the logical status of connections, not physical components. Longer duration connections (such as 1088A and 1088B) are indicated using bold lines linking CSCs and connection status slots at servers in FIG. 10, while shorter duration connections (such as 1089A, 1089B and 1089C) are indicated using lighter lines. The relationships between the connections and the applications for which they are used is indicated via dotted lines between connection status slots and the applications.

In the example scenario depicted in FIG. 10, a connection 1088A which ends up being classified as a long duration connection has been established (for one or more requests directed to App1) between CSC 1065A and multi-tenant server 1020A. Similarly, a connection 1088B which ends up having a long duration has been established (for one or more requests also directed to App1) between CSC 1065K and multi-tenant server 1020B. Connection 1089C, which happens to be classified as a short duration connection, is established for App1 between CSC 1065B and multi-tenant server 1020A. Connection 1089B which also happens to last for a shorter duration is established for App2 between CSC 1065C and multi-tenant server 1020B, and connection 1089A (also a short duration connection) is established for App2 between CSC 1065L and multi-tenant server 1020B.

The particular multi-tenant server 1020 initially chosen for a given connection request may be selected by one or more workload distributors 1047 of the DAMS in the depicted embodiment, e.g., based on load balancing algorithms which may not be aware of connection durations. However, the decision as to whether a given connection is established at the selected multi-tenant server 1020 may be made at the server itself in the depicted embodiment, using a distributed bucket-based connection throttling algorithm 1012 which takes connection longevity or duration into account. The term "throttling" as used herein refers to techniques to determine whether requests for a particular logical, virtual or physical resource (such as a network connection used for a dialog-driven application) are to be accepted or rejected.

According to at least some embodiments, a system at which distributed bucket-based connection throttling algorithm 1012 is employed may comprise one or more computing devices. The computing devices may include instructions that upon execution on or across the one or more computing devices cause the one or more computing devices to obtain, via one or more programmatic interfaces of a DAMS such as DAMS 1002, a resource management descriptor for one or more dialog-driven applications including a first dialog-driven application such as App1. The resource management descriptor may indicate (a) a first set of connection throttling parameters and (b) an applicability rule for the first set of connection throttling parameters. In accordance with the applicability rule, a mapping function may be applied to one or more attributes of a connection establishment request (e.g., an identifier of a client or user on whose behalf the connection is to be set up, an application identifier of the targeted application, a particular API for which the connection is requested, etc.) directed to the first dialog-driven application from a CSC to select a particular token bucket from a plurality of token buckets in at least some embodiments.

Based at least in part on determining that a population of tokens in the particular token bucket exceeds a threshold, a network connection may be established between the client-side component and a selected multi-tenant server 1020 of the DAMS. As such, the tokens may be considered indicators of available resource capacity. The selected server may be configured to initiate one or more actions of the first dialog-driven application based at least in part on analysis of contents of user-generated conversational input transmitted via the network connection.

In various embodiments, in accordance with the distributed bucket-based connection throttling algorithm, a plurality of token deduction iterations may be performed during a time interval in which the connection remains open, with respect to the particular token bucket selected based on the attributes of the connection establishment request. A particular token deduction iteration may comprise deducting a number of tokens from the particular token bucket. The number of tokens deducted may be determined based at least in part on the first set of connection throttling parameters in some embodiments. In one embodiment, a time interval between successive token deduction iterations may also be determined based at least in part on the first set of connection throttling parameters. In effect, a cumulative token deduction penalty which increases with the duration of the associated connection may be employed. If, at the time that a new connection establishment request which happens to be mapped to the particular bucket (e.g., because it is from the same client, because it is directed to the same application, etc.), the bucket population is below the minimum acceptable threshold, the new connection establishment request may be rejected in at least some embodiments.

The throttling algorithm may be described as being distributed because in at least some embodiments, while the decision as to whether to accept or reject a given connection establishment request may be made using local throttling data structures representing respective buckets at the targeted multi-tenant server, the servers of the fleet 1004 may exchange information (e.g., periodically, or based on a randomized information propagation schedule) about updates to such data structures. As a result of such exchanges of information, the throttling data structures at different servers may tend to converge with each other over time, such that the contents of the data structures used for connection acceptance/rejection at any given server are typically not very different from the contents of the corresponding data structures at other servers. One of the servers 1020 may accept a connection establishment request using the current contents of a particular bucket, for example, perform token deductions on that bucket while the accepted connection remains open, and transmit a representation of the updated bucket to another server; that other server may then reject another connection establishment request based on the updated version of the bucket it received.

The set of connection throttling parameters may also include other parameters, such as a rate at which a token bucket is to be refilled, the maximum number of tokens permitted in a bucket, whether token populations are to be allowed to fall below zero, the token population thresholds to be used to accept new connection requests, and so on. In some embodiments, the parameters may indicate that the number of tokens to be deducted during a given deduction iteration may change over time—e.g., if a connection lasts longer than N1 seconds, T1 tokens are to be deducted every second from the corresponding bucket until the connection duration reaches N2 seconds, but that T2 tokens (where T2>T1) are to be deducted after the connection has remained open for at least N2 seconds, and so on. In at least some embodiments, one or more of the throttling parameters may be specified via programmatic interfaces by owners of the dialog-driven applications.

In at least one embodiment, client-specific or user-specific metrics may be collected and used to determine the maximum number of tokens to be allowed in a bucket associated with a user's requests. For example, respective counts of application requests (e.g., APIs) of one or more types which were submitted by a user may be collected over some time period, and used to determine the maximum token count for a bucket used for that user. The buckets used for requests of different users may thus differ in their maximum permitted token populations in such embodiments. In at least one embodiment, after a decision is made to establish a connection, that connection may be allowed to remain open as long as the end user continues sending input to the DAMS server, even if the population of the bucket used to decide whether to establish the connection falls below the threshold population which was used to accept the connection.

According to some embodiments, a metric of the rate at which data is transferred over a connection may be captured for various time intervals, and one or more parameters of the throttling algorithm may be modified based on the data transfer rate. For example, the rate at which tokens are deducted may be increased for connections with data rates above a threshold. In one embodiment, a dynamic load shedding technique may be implemented at a DAMS. According to such a technique, after they are established in accordance with the bucket based algorithm, one or more in-use connections may be dropped or terminated.

Example Bucket-Based Resource Throttling

Figure 11:
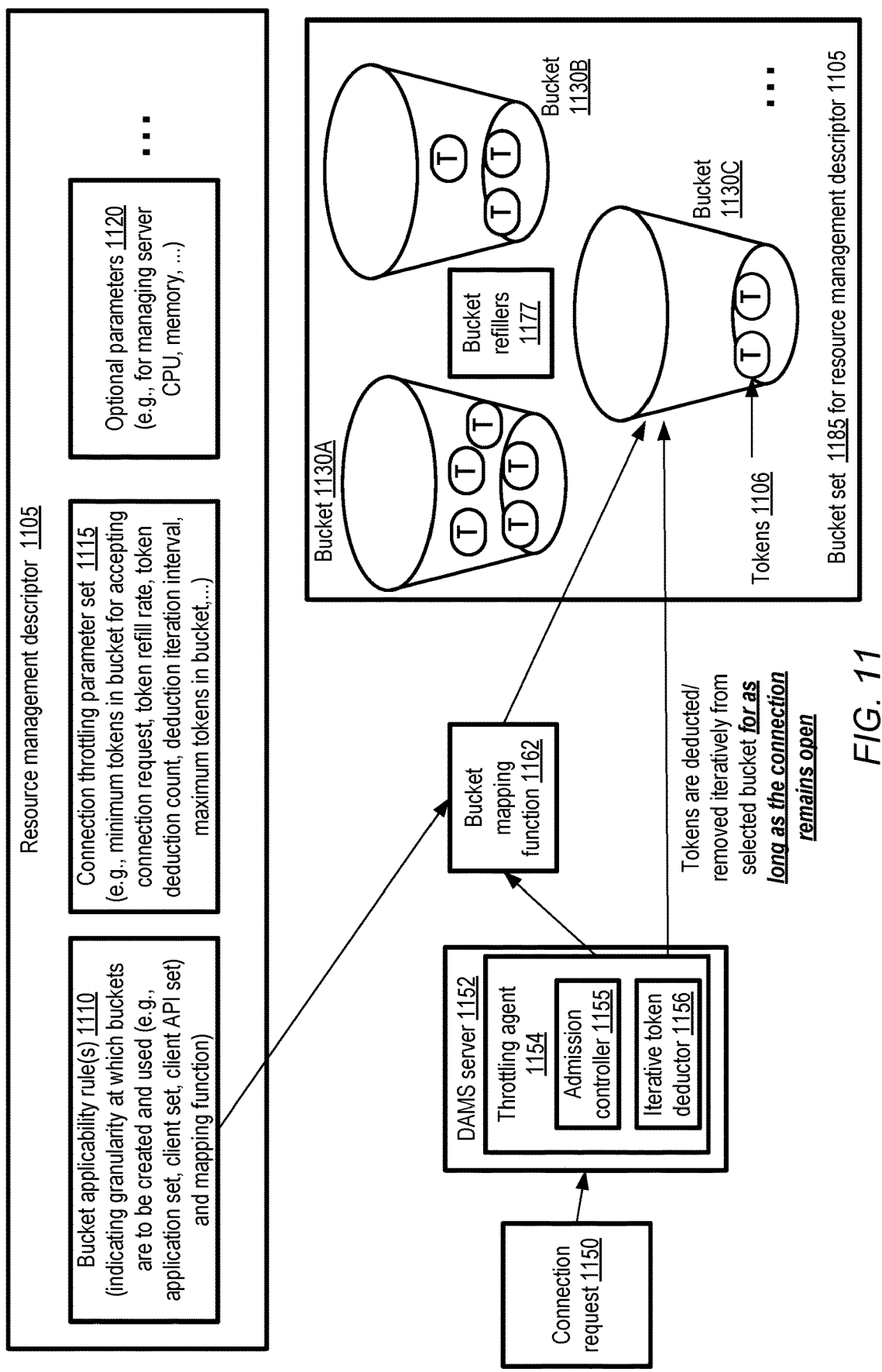
FIG. 11 illustrates aspects of an example bucket-based resource throttling technique which may be employed at a dialog-driven application management service, according to at least some embodiments.

FIG. 11 illustrates aspects of an example bucket-based resource throttling technique which may be employed at a dialog-driven application management service, according to at least some embodiments. In at least some embodiments, a resource management descriptor 1105 which provides parameters for establishing and managing connections used in the implementation of dialog-driven applications may be obtained at a DAMS similar to DAMS 1002 of FIG. 10. For example, an application owner may transmit the resource management descriptor to the DAMS via a programmatic interface, and the DAMS may store the descriptor in a repository (e.g., a repository similar to application metadata repository 116 shown in FIG. 1). In one embodiment, if an application owner does not provide a resource management descriptor for an application, the control plane of the DAMS may generate a default resource management descriptor for the application, e.g., based on heuristics or knowledge base entries.

As shown, resource management descriptor 1105 may comprise one or more bucket applicability rules 1110, a connection throttling parameter set 1115 and zero or more optional parameters 1120 which may be used for resources other than network connections in the depicted embodiment. A bucket applicability rule 1110 may indicate the granularity at which token buckets 1130 (such as buckets 1130A, 1130B or 1130C) are to be created for managing resources such as network connections—e.g., whether a single bucket is to be used for all connection associated with a given set of one or more dialog-driven applications, whether separate buckets are to be created for individual DAMS clients or end users or groups of clients, whether separate buckets are to be created for specific groups of APIs supported by the DAMS or by the applications, and so on. In addition, a bucket applicability rule may specify a mapping function which is to be applied to one or more parameters of a connection request (e.g., the identifier of the application for which the connection is being requested, the identity of the client or end user on whose behalf the connection is being requested, an API for which the connection is being requested, and so on) to select a particular bucket 1130 from a bucket set 1185 created for the descriptor 1105.

Connection throttling parameter set 1115 may indicate, for example, the minimum threshold token bucket population required in a bucket to which a connection request is mapped in order for the connection request to be accepted, the rate at which tokens are to be added or refilled in a bucket, the number of tokens to be deducted from a bucket in each deduction iteration, the interval between successive token deduction iterations, the maximum number of buckets allowed in a bucket, whether token bucket populations are allowed to become negative, and so on. In some embodiments, instead of using a static value or constant for a parameter, a function or algorithm to adjust the parameter values based on various factors may be specified. For example, instead of a static parameter setting of "1" for the number of tokens to be deducted from a bucket in each deduction iteration, a function "getDeductionCount( )" may be provided or indicated in the connection throttling parameter set. The getDeductionCount( ) function may, for example, take as parameters (a) the total amount of time the connection for which tokens are to be deducted has been open and active, (b) the data transfer rates of the connection over some recent time interval, (c) CPU utilization metrics of one or more DAMS server(s) at which the bucket from which tokens are to be deducted is being used, and or other factors, and provide an indication of how many tokens should be deducted based on such factors. For example, the number of tokens deducted may be increased as the total duration of the connection grows, as the data transfer rate increases, and/or as resource utilization levels such as CPU utilization increase. In some embodiments, the types of requests which are submitted on behalf of the clients or end users for whom a given bucket is used may be monitored, and some parameters (such as the maximum count of tokens in the bucket) may be selected based on the analysis of the request types. For example, responding to an API API-A may typically require more resources (and more time) to be consumed at the DAMS than responding to an API API-B, so the maximum number of tokens permitted in a bucket for clients who tend to submit more API-A requests than API-B requests may be set to a different value (e.g., higher) than the maximum number of tokens permitted in a bucket for clients who tend to submit more API-B requests than API-A requests. A function to be used to decide the maximum token population based on such user-specific or client-specific metrics may be included in the throttling parameter set 1115.

In at least some embodiments, resources other than network connections may also be managed using buckets. Optional parameters 1120 may indicate which, if any, other resources (such as DAMS server CPUs, memory, etc.) are to be throttled using buckets, and if so, values/functions to be used for creating and managing the buckets whose tokens represent the available capacities of those resources.

In the embodiment depicted on FIG. 11, a DAMS server 1152 may include a local throttling agent 1154. The throttling agent 1154 in turn may comprise an admission controller 1155 and an iterative token deductor 1156. The throttling agent 1154 may access a repository of the DAMS to obtain the resource management descriptors 1105 associated with a set of dialog-driven applications for which connection requests are to be handled by the DAMS server 1152 in the depicted embodiment. When a connection request 1150 associated with a dialog-driven application is obtained/received at the DAMS server 1152 (e.g., based on the selection of the DAMS server by workload distributor of the DAMS), a bucket mapping function 1162 indicated in a resource management descriptor 1105 associated with the application may be applied to one or more attributes of the connection request to identify the particular bucket of bucket set 1185 to be used.

Each bucket 1130 may comprise zero or more tokens 1106 at a given point in time in the depicted embodiment (in some embodiments, negative token counts may also be permitted), with each token in effect representing a unit of available resource capacity for connections. Depending on the bucket refilling parameters indicated in the connection throttling parameter set 1115, one or more bucket refillers 1177 may periodically add some number of tokens to each set (as long adding tokens does not result in exceeding the bucket's maximum permitted token population). Each bucket may have an associated key or identifier in various embodiments. The output of the bucket mapping function 1162 (e.g., a bucket key obtained by hashing the values of the attributes of the connection request) may indicate that bucket 1130C is to be used for connection request 1150.

If bucket 1150C has a threshold number of tokens indicated in the connection throttling parameter set 1115, the connection request 1150 may be accepted by the admission controller 1155; otherwise, the connection request may be rejected. If the request is accepted, a connection (e.g., a bidirectional streaming connection of the kind discussed earlier) may be established between the DAMS server 1152 and a client-side component of the DAMS from which the connection request 1150 was received. Then, tokens may be deducted/removed iteratively from the bucket 1130C in accordance with the parameter set 1115 by the iterative token deductor 1156 in the depicted embodiment, for as long as the connection remains open. If/when a subsequent connection request is also mapped to the bucket 1130C, the duration for which the connection corresponding to request 1150 may potentially cause the subsequent connection request to be rejected in the depicted embodiment. This approach, in which the longevity or duration of a given connection (and hence the accumulated consumption of resources for the connection) can impact the acceptance/rejection decisions for other connections, differs from some other token-based resource management schemes in which tokens are deducted only at the time of the initial acceptance of resource requests.

Example Sequence of Throttling-Related Operations

Figure 12:
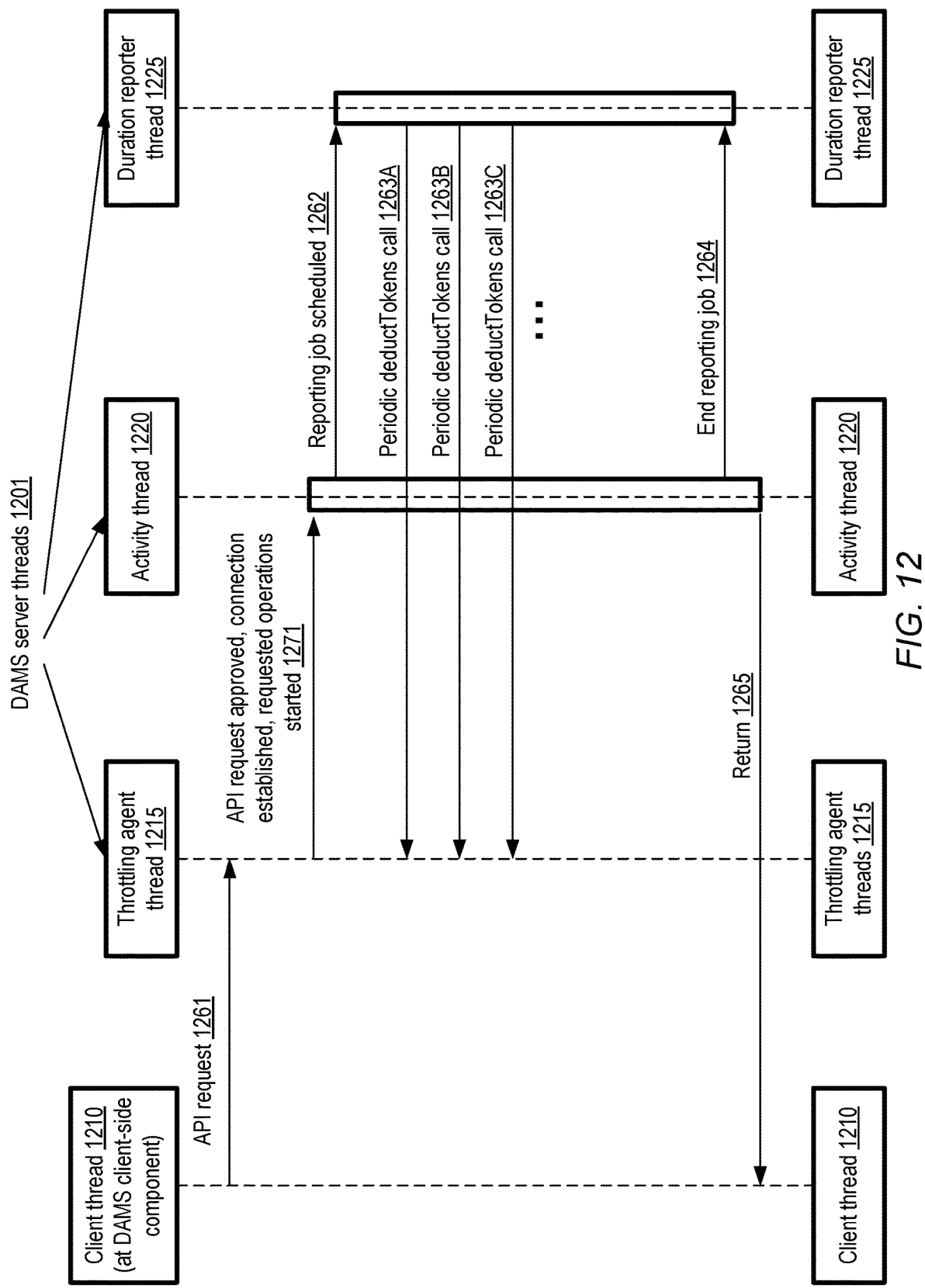
FIG. 12 illustrates an example sequence of resource throttling related operations which may be performed in response to a request from a client of a dialog-driven application, according to at least some embodiments.

FIG. 12 illustrates an example sequence of resource throttling related operations which may be performed in response to a request from a client of a dialog-driven application, according to at least some embodiments. In the depicted embodiment, a client thread 1210 running at a DAMS client-side component submits an API request 1261 to a DAMS server. The API request 1261, if accepted at the DAMS server, results in the establishment of a connection to the client-side component, and thus represents a connection establishment request in the depicted embodiment. The DAMS server comprises a plurality of threads 1201, including (bit not limited to) a throttling agent thread 1215, an activity thread 1220 responsible for implementing the logic of a dialog-driven application, and a duration reported thread 1225.

When the API request 1261 is received, an admission control decision is made by the throttling agent thread 1215 in the depicted embodiment. Based on attributes of the API request 1261, a particular bucket is selected, and the token population of the bucket is checked to determine whether there are enough tokens present in the bucket to accept the API request and establish the connection with the client-side component. In the example scenario shown in FIG. 12, the API request is approved, the connection is established, and the requested operations of the API are started at the activity thread 1220, as indicated by arrow 1271.

The activity thread 1220 schedules a periodic reporting job to be performed by a duration reporter thread 1225 in the depicted embodiment, as indicated by arrow 1262. The duration reporter thread 1225 calls 1263 (e.g., 1263A, 1263B or 1263C) a deductTokens function implemented by the throttling agent thread periodically, e.g., once every S seconds or milliseconds, with the interval between the calls being selected based on the applicable connection throttling parameters. In some implementations, the throttling agent thread 1215 may provide the parameters to the duration reporter thread 1225, e.g., directly or via the activity thread; in other implementations, the duration reporter thread 1225 may obtain the parameters from a DAMS repository. Each deductTokens call 1263 results in a reduction in the population of the token bucket which was used to approve the API request 1261. When the operations needed for fulfilling the API request (e.g., the interpretation/analysis of the user-generated input provided via the connection, and any actions which result from the interpretation/analysis) are completed, the activity thread requests the duration reporter thread to end the reporting job as indicated by arrow 1264. A return message 1265, indicating the results or completion status of the API call 1261, may be provided to the client thread 1210 and the connection established for the API may be terminated in at least some embodiments.

Note that while only a single API request is shown in FIG. 12, in some embodiments multiple API requests may be sent over the same connection from a client-side component—e.g., after the return message 1265 is received, a second API request may be sent from the client thread to the DAMS server. In at least one embodiment, after the connection is established and a first API request is processed, a new acceptance/rejection decision may not be required for each new API request which uses the same connection. However, token deduction iterations may continue to be performed as long as the connection remains open. In other embodiments, e.g., based on the throttling parameters, new admission control decisions may be made on a per-API basis.

Example Propagation of Throttling Data Structures

Figure 13:
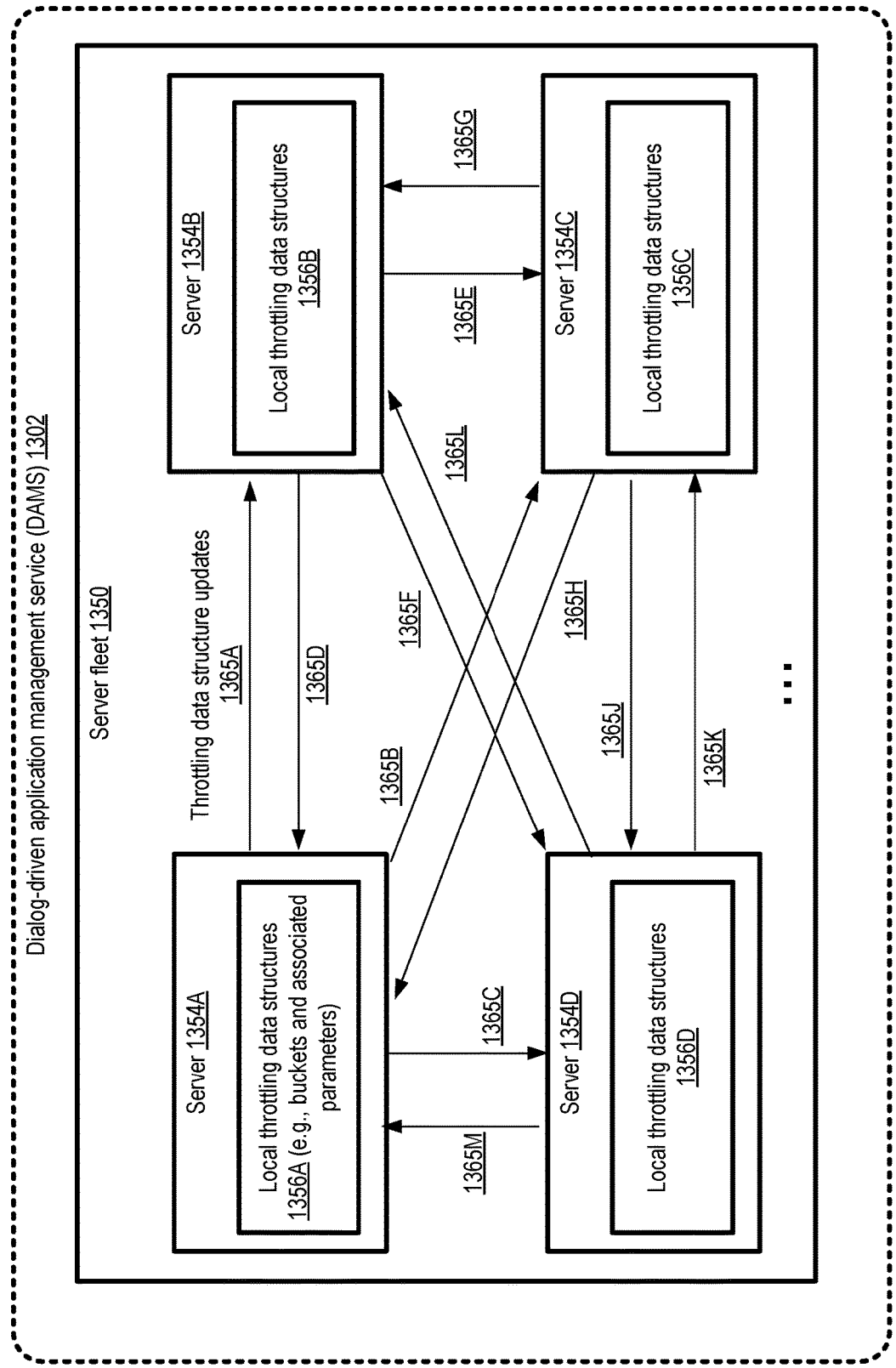
FIG. 13 illustrates an example technique for propagating throttling-related updates among a fleet of servers of a dialog-driven application management service, according to at least some embodiments.

FIG. 13 illustrates an example technique for propagating throttling-related updates among a fleet of servers of a dialog-driven application management service, according to at least some embodiments. In the depicted embodiment, a server fleet 1350 of a DAMS 1302 (similar in features and functionality to DAMS 1002 of FIG. 10) comprises servers 1354A, 1354B 1354C and 1354D. Each of the servers 1354 maintains a respective set of local throttling data structures 1356, such as data structures 1356A, 1356B, 1356C and 1356D in the depicted embodiment, and uses its local data structures to manage the acceptance and rejections of connection establishment requests or API requests directed to one or more dialog-driven applications.

In at least some embodiments, the connection establishment requests for which acceptance/rejection decisions are to be made using a given token bucket may not all be sent to the same server 1354. For example, workload distributors of the DAMS 1302 may select a particular server 1354 for a given connection request based on a variety of factors, or even using random selection, and as a result many different servers may have to handle connection requests which map to the same bucket identifier or bucket key. In order to handle such a distribution of connection requests among servers, the servers 1354 may transmit representations of updates 1365 (e.g., 1365A-1365M) which have been applied to their local throttling data structures 1356 to each other in the depicted embodiment. In some embodiments, such updates may be sent directly, e.g., using respective network messages for each batch of updates. In other embodiments, the updates may be sent indirectly—e.g., each server 1354 may update a shared database of the throttling data structures, and other servers may access the shared database to obtain the updates. In at least one embodiment, it may be the case that the respective local throttling data structures 1356 at two or more servers 1354 may conflict with one another at some points in time—e.g., if one or more requests are mapped to the same bucket at each of the servers very shortly after one another, the population of the local version of the bucket may differ at the different servers. In such embodiments, a reconciliation algorithm may be used to resolve the conflicts. In such a reconciliation algorithm, one of the servers may be chosen (e.g., by mutual agreement among the relevant servers, or using a consensus-based protocol) as a reconciler, and the authoritative token population the bucket may be determined by the reconciler. Other conflict resolution techniques may be used in other embodiments for the distributed bucket-based throttling algorithm used at the DAMS. Note that the token populations of different local versions of a given bucket need not necessarily be closely synchronized in at least some embodiments; an occasional acceptance or rejection of a connection request based on slightly inaccurate token populations may be acceptable.

Examples of Token Population Changes

FIG. 14 and FIG. 15 illustrate respective examples of changes in token populations of buckets used for connection throttling, and corresponding connection acceptance/rejection decisions made at a dialog-driven application management service, according to at least some embodiments. In the respective scenarios 1451 and 1551 depicted in FIG. 14 and FIG. 15, the population of a single bucket set up at a particular AMS server to manage connections established for a particular client of a DAMS is shown over a few seconds of time. Other servers are not included in the example scenarios. In both scenarios, the minimum number of tokens needed to be in the bucket to accept a new connection request is one; that is, one token is deducted as soon as a connection request is accepted. In addition, to take connection duration into account, for any given open connection, one token is deducted every second from the bucket. When a connection is closed, one token is added back to the bucket; thus, the bucket is only refilled when connections terminate. To simplify the presentation, connection requests are assumed to arrive at the beginnings of seconds, and connections are closed at the ends of seconds (which of course also correspond to the beginnings of subsequent seconds). The notation "T1 (start)" in the column headings of tables 1401 and 1501 indicates the beginning of a $1^{st}$ second, "T1 (end)" indicates the end of the $1^{st}$ second, "T2 (start)" indicates the start of the $2^{nd}$ second, "T2 (end)" indicates the end of the $2^{nd}$ second, and so on.

In scenario 1451 of FIG. 14, a client makes 5 connection requests per second, and the rate at which the connection requests are made remains fixed for the time interval covered in table 1401. The processing of each request is assumed to take 2 seconds, and the client is allowed a maximum of 8 concurrent connections (so the maximum token population in the bucket used for the client's connections is 8). At T1(start), the bucket is populated to the maximum of 8 allowed tokens, as indicated in the row labeled "Tokens in bucket". 5 new incoming requests arrive at T1(start), so 5 of the 8 tokens are immediately deducted (as indicated in the "Tokens consumed" row), leaving 3 tokens (as indicated in the "Tokens left" row). The total number of open connections as soon as the 5 incoming connections are established is 5 (as shown in the "Total open connections with server") row. As shown in the "Outcome" row, all 5 requests received at T1(start) are allowed/accepted.

At the beginning of the $2^{nd}$ second (T2(start)) of scenario 1451, 5 new incoming connection requests are received. However, there are only 3 tokens in the bucket, so 3 of the new requests are allowed, and 2 requests are rejected or throttled. The number of tokens left in the bucket is zero, and the total number of open connections reaches the maximum limit of 8.

At the end of the $2^{nd}$ second (T2(end)) of scenario 1451, the work required for the 5 connections established at T1(start) completes, and all 5 of the connections are ended/terminated. As a result, 5 tokens are added to the bucket. The remaining 3 connections remain open.

At the start of the $3^{rd}$ second (T3(start)), 5 new requests arrive, and all 5 tokens that were in the bucket are consumed, leaving 0 tokens. All 5 new requests are accepted, and the total number of open connections again reaches 8. At the end of the $3^{rd}$ second, 3 connections (the ones that were accepted at T2(start) and have hence completed their processing) are closed, and 3 tokens are therefore added to the bucket. At T4(start), these t3 tokens are used to allow 3 of the 5 incoming connections, and 2 connection requests are again rejected. As shown in the "Outcome" row, the iterative deduction of tokens during the lifetimes of accepted connections results in the rejection of several other connections mapped to the same bucket, such as the 2 rejections at T2(start), the 2 rejections at T4(start), and so on.

In example throttling scenario 1551 of FIG. 15, the client starts with 5 requests per second, but the rate of incoming connection requests drops by one per second during the time period covered by table 1501. The maximum number of concurrent connections allowed for the client is 7. Other parameters remain the same as in scenario 1451. The initial population of the bucket is 7 at T1(start), and all 5 incoming requests are accepted at T1(start), leaving 2 tokens in the bucket. At T2(start), the number of new incoming requests has dropped to 4; of these, 2 are accepted and 2 are rejected, leaving 0 tokens in the bucket.

At T2(end), the 5 connections which were accepted at T1(start) all end, so 5 tokens are added to the bucket. Three new requests arrive at T3(start), and all 3 are allowed, leaving 2 tokens in the bucket. Two more tokens are added at T3(end) as the 2 connections allowed at T2(start) are terminated. As a result, there are 4 token in the bucket when the 2 new requests at T4(start) arrive; both these requests are accepted, leaving 2 tokens in the bucket.

Example Programmatic Interactions for Resource Throttling

Figure 16:
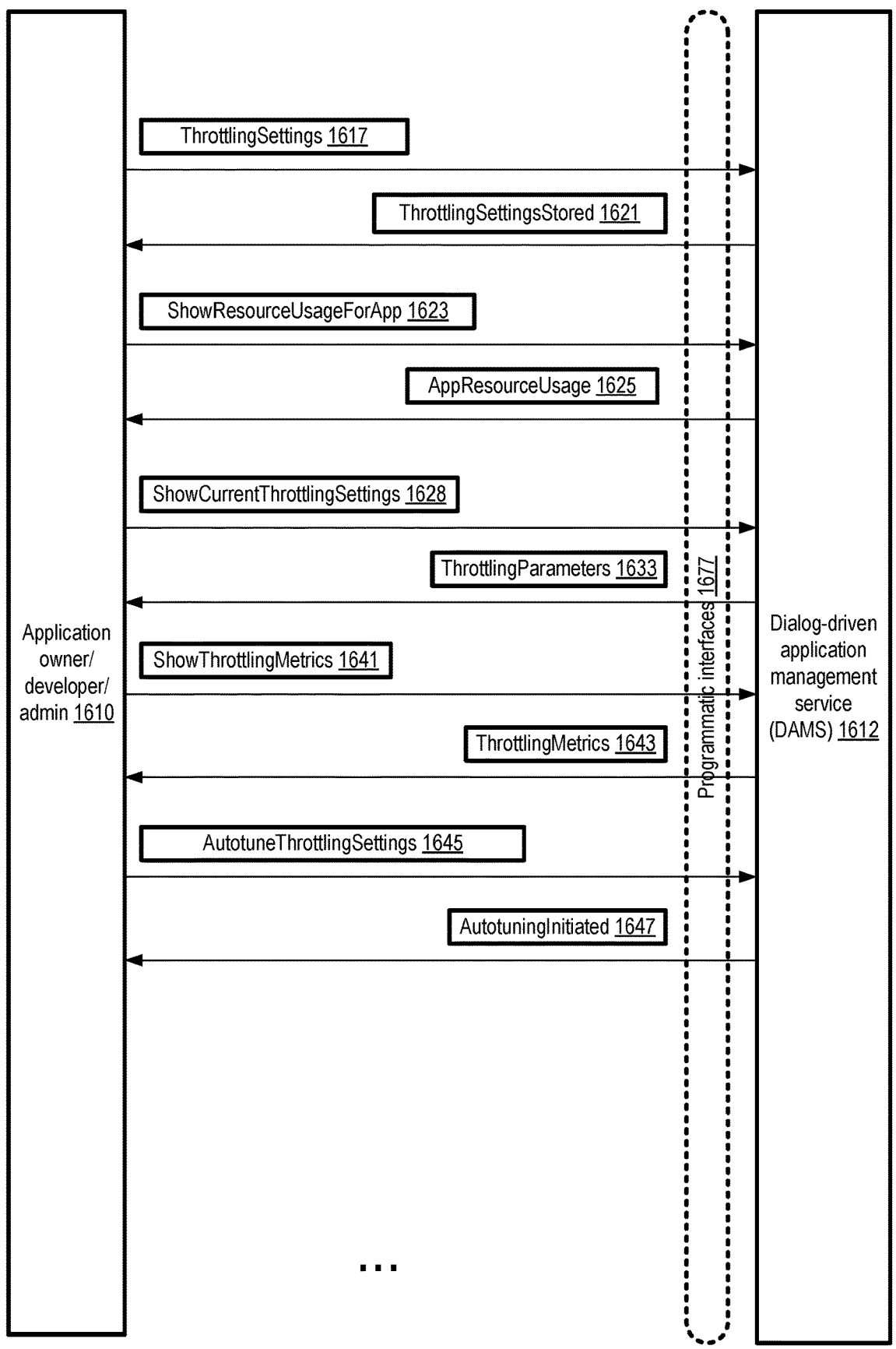
FIG. 16 illustrates example programmatic interactions associated with resource throttling at a dialog-driven application management service, according to at least some embodiments.

FIG. 16 illustrates example programmatic interactions associated with resource throttling at a dialog-driven application management service, according to at least some embodiments. A DAMS 1612, similar in features and functionality to DAMS 1002 of FIG. 10, may implement a set of programmatic interfaces 1677 to be used by application owners (e.g., developers or administrators of dialog-driven applications) to submit requests, provide configuration settings and the like, and to receive corresponding responses from the DAMS 1612. The programmatic interfaces 1677 may, for example, include one or more web-based consoles, command-line tool, APIs, graphical user interfaces and the like.

Note that the programmatic interactions shown by way of example in FIG. 16 may be implemented in addition to at least some of the kinds of interactions shown in FIG. 8 in some embodiments. For example, an application owner 1610 may cause a descriptor or representation of a particular dialog-driven application to be registered and stored at the DAMS 1612 using a RegisterAndStoreApp request similar to request 814 of FIG. 8, configure interruptibility modes and timing parameters, and so on.

In the embodiment depicted in FIG. 16, an application owner may submit a ThrottlingSettings request 1617, e.g., including some or all of the contents of a resource management descriptor of the kind shown in FIG. 11 for one or more dialog-driven applications. After storing the provided information, the DAMS may send a ThrottlingSettingsStored response 1621 to the application owner.

In some embodiments, an application owner 1610 may obtain information about the resources being used for a particular dialog-driven application, such as the number of concurrent connections in use, utilizations of CPUs, memory and the like at the DAMS servers and/or the resources at which machine learning models are being run for the application, and so on, by submitting a ShowResourceUsageForApp request 1623. The requested types of information may be provided by the DAMS 1612 in an AppResourceUsage message 1625.

An application owner may submit a ShowCurrentThrottlingSettings request 1628 to view the current throttling parameters applicable to one or more applications in some embodiments. Values of the requested parameters may be indicated in one or more ThrottlingParameters response messages 1633.

A ShowThrottlingMetrics request 1641 may be submitted by an application owner to view metrics such as the number of connection establishment requests accepted and rejected during various time intervals, the types of APIs whose requests were rejected, and so on. The requested metrics may be provided in one or more ThrottlingMetrics messages 1643.

In at least one embodiment, the DAMS may enable throttling parameters to be tuned automatically, e.g., using one or more machine learning based parameter tuning models similar to models 178 of FIG. 1. Such models may, for example, analyze resource utilization data, connection duration statistics, accepted and rejected connection request data, and so on, and provide recommendations to modify throttling parameters (such as how frequently token deduction iterations should be conducted, whether different throttling parameters should be used for different users/clients, and so on). An AutotuneThrottlingSettings request 1645 may be submitted by an application owner to utilize such functionality for one or more applications in some embodiments. The DAMS 1612 may initiate the automated tuning of throttling parameters, and send an AutotuningInitiated response message 1647 to the application owner in at least some embodiments.

Methods for Resource Management of Dialog-Driven Applications

Figure 17:
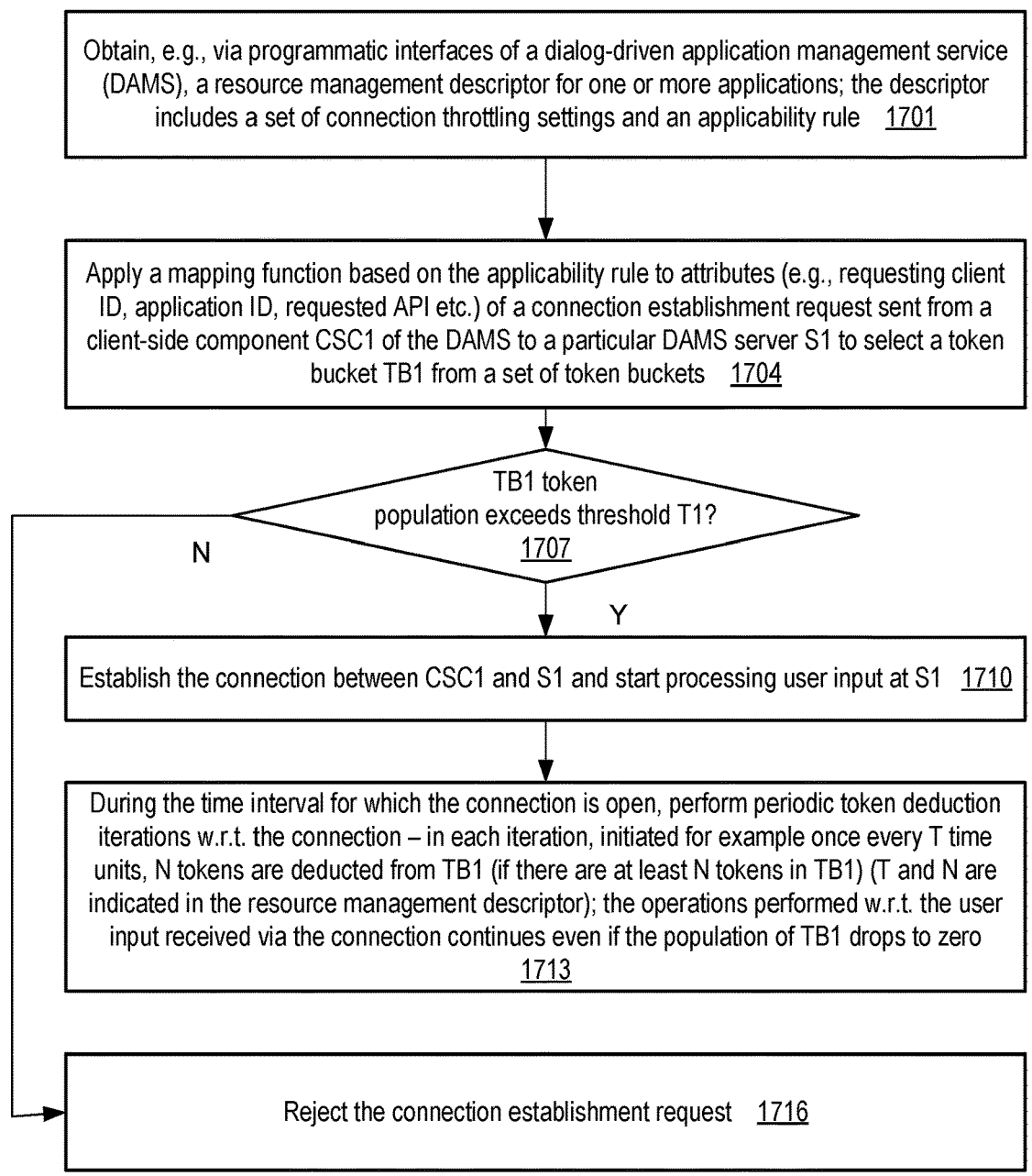
FIG. 17 is a flow diagram illustrating aspects of operations which may be performed to throttle connections at a dialog-driven application management service, according to at least some embodiments.

FIG. 17 is a flow diagram illustrating aspects of operations which may be performed to throttle connections at a dialog-driven application management service, according to at least some embodiments. As shown in element 1701, a resource management descriptor pertaining to one or more applications may be obtained and/or generated at a DAMS similar in features to DAMS 1002 of FIG. 10. In some embodiments, the resource management descriptor may be provided by an owner of the one or more applications via programmatic interfaces of the DAMS. In other embodiments, the resource management descriptor may be automatically generated by the DAMS itself, e.g., based on analysis of request processing times, connection lifetimes and the like. The descriptor may include a set of connection throttling settings in some embodiments. In at least one embodiment, the descriptor may also include an applicability rule, e.g., indicating how to determine which token bucket of a set of token buckets created for resource throttling is to be used for a given customer API request or connection establishment request. Any of wide variety of throttling parameters may be indicated in the descriptor, such as the number of tokens required to be in a bucket to accept a connection request, the maximum and/or minimum number of tokens a bucket is allowed to contain, the number of tokens to be deducted from a bucket in each deduction iteration, the inter-iteration time for the deduction iterations, the rate at which tokens are to be refilled (or the circumstances under which new tokens are to be added into buckets, e.g., when connections are ended/terminated) and so on.

A connection establishment request (e.g., in the form of an invocation of a particular streaming API supported by the DAMS) associated with one of the application for which the resource management descriptor was obtained may be received from a client-side component CSC1 of the DAMS at a particular server S1 of the DAMS in the depicted embodiment. Based at least in part on the applicability rule, a mapping function may be applied to one or more attributes of the request to select a particular token bucket TB1 from a set of token buckets associated with the application (element 1704). The attributes used as input for the mapping function may include, for example, identifiers of the application, the requester (or a client account associated with the requester), the call signatures of one or more APIs for which the connection is to be established, and so on. In some cases (e.g., in a scenario in which a particular client has not submitted any connection establishment requests earlier, and respective buckets are set up for respective clients), a new bucket may be created and populated based on the maximum population limit settings indicated in the throttling parameters. In other cases, a pre-existing bucket may be selected. Individual buckets may be implemented using respective data structures at the servers of the DAMS in various embodiments. In some implementations, respective local versions of one or more buckets may be maintained at each of several servers.

If TB1 has sufficient tokens (e.g., if TB's token population exceeds a threshold T1 which is indicated in the throttling parameters), as detected in operations corresponding to element 1707, a connection may be established between S1 and CSC1, and processing of user-generated input sent via the connection may begin at S1 in the depicted embodiment (element 1710). In various embodiments, machine learning models and/or computing services of a provider network may be used to process the user-generated input and/or initiate actions of the dialog-driven application based on the results of the processing of the user-generated input. A multi-modal bidirectional streaming connection of the kind discussed earlier may be established in at least some embodiments. If TN1 does not have a sufficient number of tokens, the connection request may be rejected (element 1716).

If the connection is established, one or more token deduction iterations associated with the connection may be performed during the time interval for which the connection remains open in various embodiment (element 1713). In a scenario in which multiple connections (e.g., all the connections established for a given client, depending on the details of the mapping function being used) are managed using the same bucket TB1, respective sets of token deduction iterations may be performed with respect to each of the connections, and the total number of tokens deducted per connection may depend on the respective durations for which each of the connections remains in use. In a given token deduction iteration for a given connection, initiated for example once every T time units, N tokens are deducted from TB1 (if TB1 happens to contain at least N tokens). The throttling parameter set of the resource management descriptor may indicate the values of N and T, or functions to be used to dynamically compute the number of tokens to be deducted in the next iteration and the time at which the next iteration should be scheduled, in the depicted embodiment. In some embodiments, the number of tokens deducted and/or the inter-iteration interval may be determined based on factors such as data transfer rates of the connections associated with the bucket. In at least some embodiments, once a connection is established, all the work associated with the API(s) invoked via the connection may be completed, even if the number of tokens in the bucket which was examined to accept the connection falls below the threshold needed to accept new connections. In at least some embodiments, the DAMS servers may share information about their local throttling data structures with each other, so that in effect respective updated copies or versions of each bucket can be accessed and used at multiple servers. In at least one embodiment, existing connections may be terminated based on analysis of resource consumption metrics by one or more of the DAMS servers. In some embodiments, token-based throttling techniques which take the longevity or duration of connections or requests into account may also or instead be applied to resource other than network connections, such as CPU, memory and the like.

Example Transient Errors During Interactions with Clients of a Dialog-Driven Application As mentioned earlier, network connections established between client-side components and DAMS server may sometimes be used for transmitting contents numerous end-user utterances and receiving corresponding responses from the DAMS server. As such, a given connection may remain in use for relatively long periods of time. A transient network error may occur at any point during the lifetime of the connection. FIG. 18 illustrates an example occurrence of a connectivity disruption during one of several user utterances transmitted via a long-running connection to a dialog-driven application, according to at least some embodiments. A multi-modal bidirectional streaming network connection 1817 may be established between a DAMS server 1810 and a client-side component (CSC) 1805 of a DAMS in the depicted embodiment. The CSC 1805 may temporarily store input of various utterances generated by a client 1801 in a set of buffers 1807, and transfer the input to the DAMS server in a sequence of input events, such as utterance 1815A's input event 1811A, utterance 1815A's input event 1811B, and so on. A given utterance may comprise a group of user-generated input for which a response is provided to the client 1801 by the DAMS as part of the conversational exchanges associated with one or more intents of a given dialog-driven application. A given input event 1811 (such as 1811A or 1811B) may represent a portion of an utterance which can be conveyed to a DAMS server in a message comprising (for example) a few hundred bytes. Input events 1811 may also be referred to as input blocks in various embodiments. In some embodiments, even though the processing of individual input events or input blocks of a given utterance such as utterance 1815 may be initiated by a DAMS server 1810 as soon as the event is received, a response to the client may not be transmitted until all the events of the utterance have been received at the server 1810 and processed. A response to a given utterance may also be transmitted to the CSC 1805 (where it may be presented to the client 1801) in sub-units called response events 1819, such as response event 1819A and 1819B in the depicted embodiment. As new input blocks are received, the DAMS server 1810 may update application state information 1830. After some number of input blocks/events have been processed, e.g., after the needed parameters of an intent of the dialog-driven application have been populated, one or more fulfillment resources 1852 (such as other computing services of a provider network at which the DAMS is implemented) may be used to perform one or more actions in the depicted embodiment.

Once established (e.g., after using a token-based resource management algorithm of the kind discussed above), connection 1817 may continue to be used for multiple utterances and corresponding responses, e.g., for several tens of seconds or even for several minutes in the embodiment depicted in FIG. 18. In some embodiments, even a single utterance may take several tens of seconds, depending on the amount of information being conveyed. At a point in time depicted in the lower half of FIG. 18, contents of utterance 1815B and 1815C of client 1801 have also been transferred to the DAMS server 1810 from CSC 1805, and a fourth utterance 1815D is in progress. The application state information 1830 may, by this point, include results of analysis by language models 1850 of utterances 1815A-1815C.

Utterance 1815D comprises input events 1811J and 1811K. At some point during the transmission of utterance 1815D's input event sequence to the DAMS server 1810, a network error 1890 occurs. The network error may be transient in some cases, in that a replacement connection may be established fairly quickly between the CSC 1805 and a DAMS server (either the same server which processed earlier utterances 1815A-1815C, or a different server depending on the workload distribution algorithm in use at the DAMS). The DAMS may have to determine how to resume the conversation or dialog with the client using the replacement collection—e.g., how much of the earlier portion of the dialog and associated processing has to be repeated in various embodiments. A customizable checkpointing technique may be employed at the DAMS to respond efficiently to transient errors of this type in at least some embodiments, as discussed below.

Figure 19:
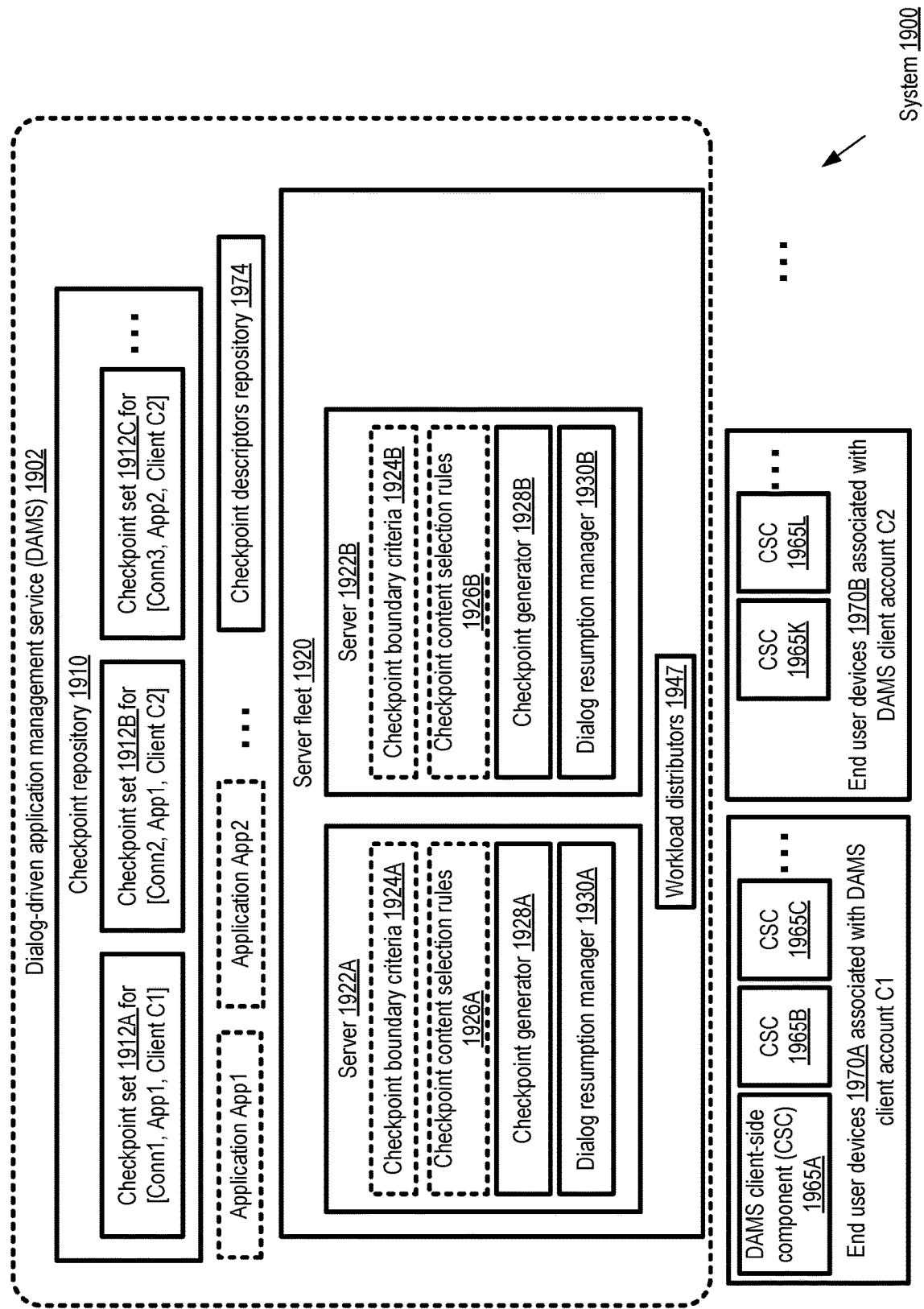
FIG. 19 illustrates an example system environment in which configurable checkpoints may be generated and stored for respective connections at a dialog-driven application management service, according to at least some embodiments.

Example System Environment with Checkpointing of Dialog-Driven Application State FIG. 19 illustrates an example system environment in which configurable checkpoints may be generated and stored for respective connections at a dialog-driven application management service, according to at least some embodiments. As shown, system 1900 comprises resources and artifacts of a DAMS 1902, with various features and functions similar to those of DAMS 102 of FIG. 1 and DAMS 1002 of FIG. 10, as well as checkpointing capabilities for saving application state information of dialog-driven applications such as App1 and App2. The DAMS 1902 may comprise a server fleet 1920 with a plurality of servers such as server 1922A and 1922B and one or more workload distributors. Representations of various dialog-driven applications such as App1 and App2 may be obtained at the DAMS 1902 from application owners, e.g., via easy-to-use application development tools similar to tools 120 shown in FIG. 1. A given application representation may indicate one or more actions to be initiated in response to processing of user-generated input directed at the application from DAMS client-side components (CSCs) such as CSCs 1965A, 1965B and 19865C running at end-user devices 1970A associated with a DAMS client account C1, and CSCs 1965K and 1965L running at end-user devices 1970B associated with another DAMS client account C2. The user-generated input of a given client may comprise one or more utterances for which respective responses are to be prepared and transmitted from the DAMS; a given utterance may comprise input in one or more formats such as audio, text, DTMF and the like in the depicted embodiment. A representation of an utterance sent to the DAMS from a CSC may comprise one or more input events or blocks in the depicted embodiment. A respective identifier may be assigned to each input event, e.g., by the CSC which transmits the event to the DAMS.

At the DAMS 1902, one or more checkpoint descriptors for saving state information of a given application such as App1 or App2 (or a set of applications) may be obtained, e.g., via programmatic interfaces implemented by the DAMS in some embodiments. The checkpoint descriptors may be stored in checkpoint descriptors repository 1974, accessible from various servers 1922 of the server fleet 1920 in the depicted embodiment. Individual ones of the servers 1922 may store local copies of checkpoint descriptors in various embodiments. A given checkpoint descriptor may, for example, include a rule for determining contents to be included in a checkpoint pertaining to at least some utterances expected for an application. Examples of the contents to be included in a checkpoint may include input event identifiers, payloads of input events, results of machine learning analysis of the input events, results of external functions/services invoked based on application logic with respect to various input events, and so on.

In the embodiment shown in FIG. 19, server 1922A stores checkpoint content selection rules 1926A applicable to a set of applications being handled by server 1922A, while server 1922B stores checkpoint content selection rules 1926B applicable to a set of applications being handled by server 1922B. There may be overlaps between the set of applications handled by different servers 1922 in at least some embodiments, and hence there may be corresponding overlaps in the checkpoint descriptor contents stored at the servers. In at least some embodiments, a checkpoint descriptor may include one or more checkpoint boundary criteria (i.e., rules or logic to be used to determine when the next checkpoint is to be generated), and such checkpoint boundary criteria 1924 (such as 1924A and 1924B) may also be stored at the servers 1922. A given checkpoint boundary criterion may, for example indicate that checkpoints should be generated after each utterance (and not in the middle of utterances) of a given application. A given server 1922 may comprise a respective checkpoint generator (e.g., checkpoint generators 1928A or 1928B) and a respective dialog resumption manager (e.g., dialog resumption managers 1930A and 1930B) in some embodiments. When a connection establishment request is received from a CSC 1965, one or more workload distributors 1947 may select a particular server 1922 to process the connection establishment request (e.g., using token-based techniques similar to those discussed earlier) in the depicted embodiment.

After a connection (e.g., a multi-modal streaming connection of the kind discussed above) is established between a CSC 1965 and a server 1922, the contents of client utterances may be transmitted over the connection to the server 1922 by the CSC 1965. The server 1922 may utilize one or more machine learning models and/or other resources (such as resources of a dynamically provisioned event driven computing service) to process the contents of the utterances, generate responses to be sent to the CSC and/or initiate actions indicated in the logic of the application to which the utterances are directed in the depicted embodiment. A given connection may remain in use for some time, and may be used for several different utterances, each comprising a sequence of input events, in some cases as discussed above.

A checkpoint generator at a given server 1922 may create one or more checkpoints associated with a given connection and a given client in various embodiments. Such a checkpoint may, for example, be generated based at least in part on detecting that a checkpoint boundary criterion 1924 has been met with respect to the application for which the connection is being used. In at least some embodiments, based on a checkpoint content selection rule 1926, a checkpoint may comprise one or more event identifiers for respective events associated with one or more input events or blocks transmitted to the server 1922 from a CSC 1965 via the connection. The checkpoints may be stored at a shared checkpoint repository 1910 in the depicted embodiment, which may be accessible from multiple servers of server fleet 1920. The example sets of checkpoints are shown in repository 1910 in FIG. 19: checkpoint set 1912A comprising one or more checkpoints generated for a connection Conn1 being used for App1 on behalf of client C1, checkpoint set 1912B comprising one or more checkpoints generated for a connection Conn2 being used for App1 on behalf of client C2, and checkpoint set 1912C comprising one or more checkpoints generated for a connection Conn3 being used for App2 on behalf of client C2. In various embodiments, a checkpoint may comprise sufficient information to enable a server 1922 to resume a dialog with a client (e.g., after a connection is disrupted and a new connection is established between a CSC and a DAMS) without having to re-process all the earlier utterances which have already been processed with respect to the connection which was disrupted.

In the rare event of connectivity loss or failure associated with a connection, the CSC 1965 which was using a connection may quickly establish a new connection by sending a request to the DAMS 1902 in the depicted embodiment. In some cases, a different server may happen to be selected by the workload distributors 1947 than was being used for the earlier connection; in other cases, the same server may happen to be re-selected for the CSC after connectivity is re-established between the DAMS 1902 and the CSC 1965. After the new connection is established, the CSC 1965 may send some number of buffered input events (along with their event identifiers) to the server 1922 selected for the new connection, e.g., in an attempt to smoothly resume the dialog which was interrupted by the failure. Depending on when the connectivity was lost, at least some of the buffered input events may be re-transmitted events from the perspective of the DAMS (i.e., input events that were also sent earlier and have already been processed at the DAMS server fleet). Other input events sent after the re-establishment of connectivity may not yet have been received or processed at the DAMS.

The server which receives the buffered input events may obtain access to one or more checkpoints which were created and stored earlier for the same application and the same client in the depicted embodiment. The server may then use the one or more checkpoints to classify the input events sent by the CSC after the reestablishment if connectivity into two classes: (a) events (if any) for which further processing is not required because they have already been processed earlier and (b) new events (if any) for which processing is to be initiated. If there are such new events which require processing, their processing may be initiated by the server 1922 in the depicted embodiment.

Example Factors Influencing Checkpointing

Figure 20:
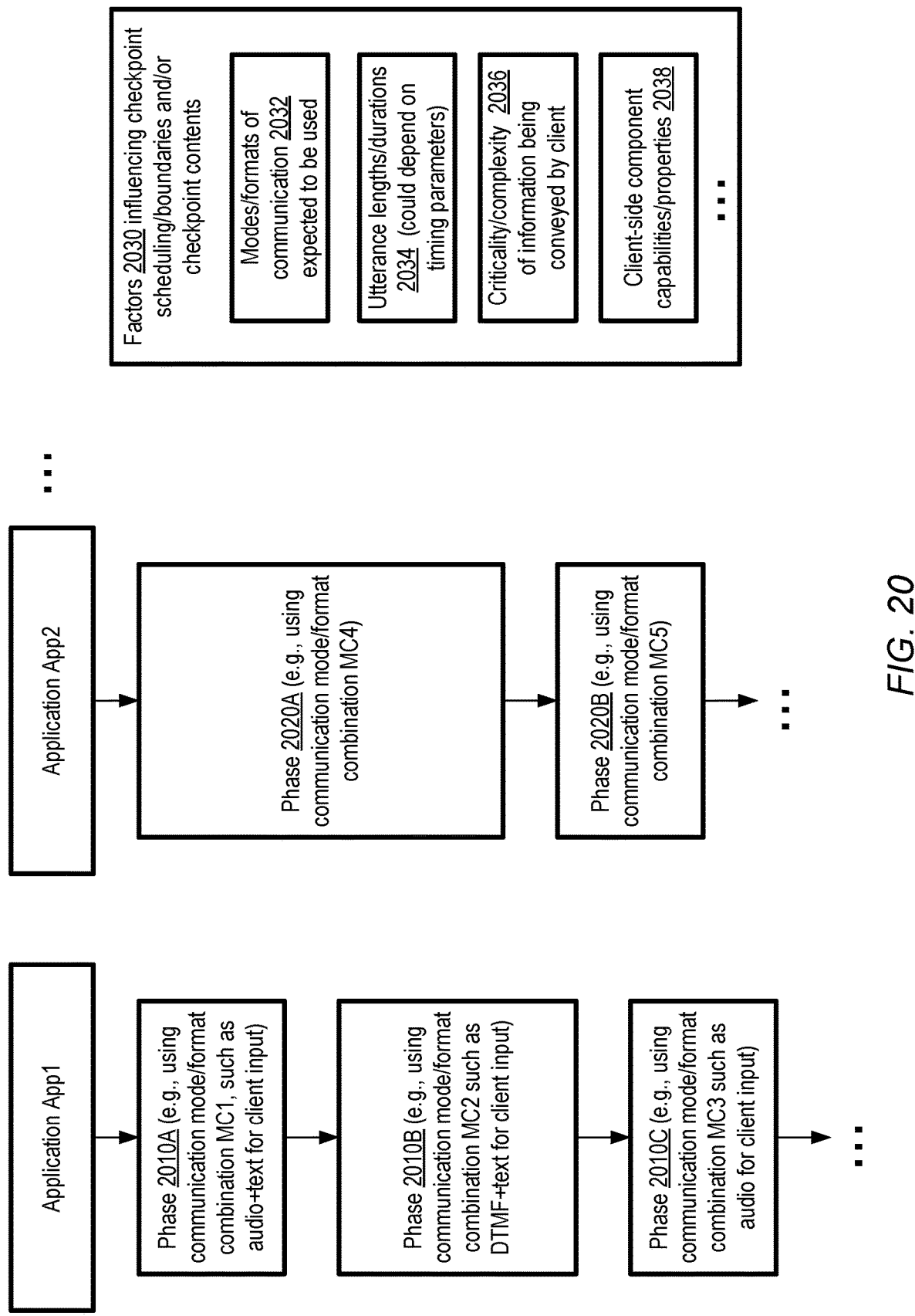
FIG. 20 illustrates example factors which may be used to select checkpointing parameters for dialog-driven applications, according to at least some embodiments.

FIG. 20 illustrates example factors which may be used to select checkpointing parameters for dialog-driven applications, according to at least some embodiments. In the depicted embodiment, example applications App1 and App2 each comprise a number of phases, which differ from one another along dimensions such as their typical durations, the modes or formats of data transferred between the end user and the DAMS, and so on. In some cases, a given intent of the application (such as obtaining bank balance information) may involve several phases; in other cases, different intents may correspond to each phase. A given phase may comprise one or more user utterances and corresponding responses from the DAMS.

Factors 2030 influencing checkpoint boundaries or scheduling, and/or checkpoint contents, at least some of which may differ for respective phases may include, for example, the modes/formats of communication 2032 expected to be used during a particular phase of an application, the utterance lengths/durations 2034, and the criticality and complexity 2036 of information being conveyed by a client during a given phase from the perspective of the application owner in the depicted embodiment. The capabilities or properties 2038 of the particular client-side components being used by a client may also be used to determine checkpointing parameters in at least some embodiments.

As discussed earlier, the network connections established between client-side components and the DAMS may enable bidirectional streaming of data in various formats or modes, including voice/audio, text, DTMF, or video. The DAMS server may listen for streaming input in any of the formats, even while simultaneously transmitting responses to earlier user input. An end user may use several different formats for a given utterance, or may decide to use different formats for different utterances. In phase 2010A of an interaction with App1, a communication mode/format combination MC1 (such as a combination of audio and text) may be used for client input in the depicted example. In phase 2010B, a different combination MC2 may be used (such as DTMF and text), while in phase 2010C, combination MC3 (such as audio alone) may be used. A given session of interaction between a client and application App1 may include a long phase 2020A in which a communication mode combination MC4 may be used, followed by a shorter phase 2020B in which combination MC5 is used.

In at least some embodiments, the amount of information conveyed per unit time to the DAMS from a client-side component may tend to differ based on the format in which the user provided the input. As a result, the criteria used for deciding when to generate the next checkpoint may also differ based on the combination of one or more formats/modes used during a given phase of an application. For example, checkpoints may be scheduled more frequently for user input sequences involving the use of DTMF than for user input sequences involving the use of text, and so on.

In at least some embodiments, a DAMS may be configured to generate and store checkpoints after all the input events of a given utterance (or some selected number of consecutive utterances) have been received. As discussed earlier, the determination by a DAMS server that an utterance is to be considered ended may be based on timing parameters such as those discussed in the context of FIG. 7 (e.g., the maximum client input duration and the maximum final silence duration) in various embodiments. As such, timing parameters provided by application owners may influence the scheduling of checkpoints in some embodiments.

In some embodiments, the categories of state information stored in a checkpoint may vary from one application to another, or even from one phase of an application to another, based on checkpoint content selection rules. The categories of state information saved in a checkpoint may include, for example, some combination of (a) input event identifiers of a selected set of input events (e.g., input events of the most-recently-received utterance whose entire set of input events has been received, or all input events of U successive utterances where the value of U is determined from a checkpoint descriptor), (b) payloads of the selected input events, comprising the digitized versions of the user-generated input, (c) results of analysis initiated by the DAMS server on the selected input event payloads, e.g., using one or more machine learning models, (d) results of analysis performed at one or more other services, such as a dynamically provisioned event driven computing service, on the selected event payloads, and/or (e) a representation of one or more response events prepared at the DAMS to selected input events. Recall that after connectivity is re-established between a client-side component and the DAMS, a checkpoint may be used by a different server than was used prior to the connectivity interruption to resume the dialog with a client. As such, enough state information may be stored within a checkpoint (using some combination of the various categories indicated above) to enable the post-reconnection DAMS server to make the resumption of the dialog smooth, without requiring a lot of resubmission of information by the client. If the criticality or complexity 2036 of the information conveyed during a particular phase of an application is high, and the effort required from the client to re-convey the information is high, more details about the input events (including the results of machine learning or other processing) may be stored within a checkpoint for the particular phase than for other phases in some embodiments.

The DAMS may be able to determine the type of device at which a client-side component is running in at least some embodiments. As mentioned earlier, a wide variety of devices may be used for the client-side components in different embodiments, such as an automated personal assistant device, a smart phone, a mobile device, a game device, a laptop, a tablet, a desktop computer, or a compute instance of a provider network. The buffering capabilities (e.g., amounts of memory available) may therefore vary from one client-side component to another, based on the resources available at the devices at which the client-side components are run. Because the resumption of the dialog between a client and the DAMS involves the transmission of buffered events from the client-side component to the DAMS, the properties of the client-side component may be used to determine the boundary conditions for creating checkpoints in at least some embodiments. For example, if the client-side component has a very small amount of memory available, checkpoints may be created more frequently than if the client-side component has more memory available.

Example Checkpointing-Related Programmatic Interactions

Figure 21:
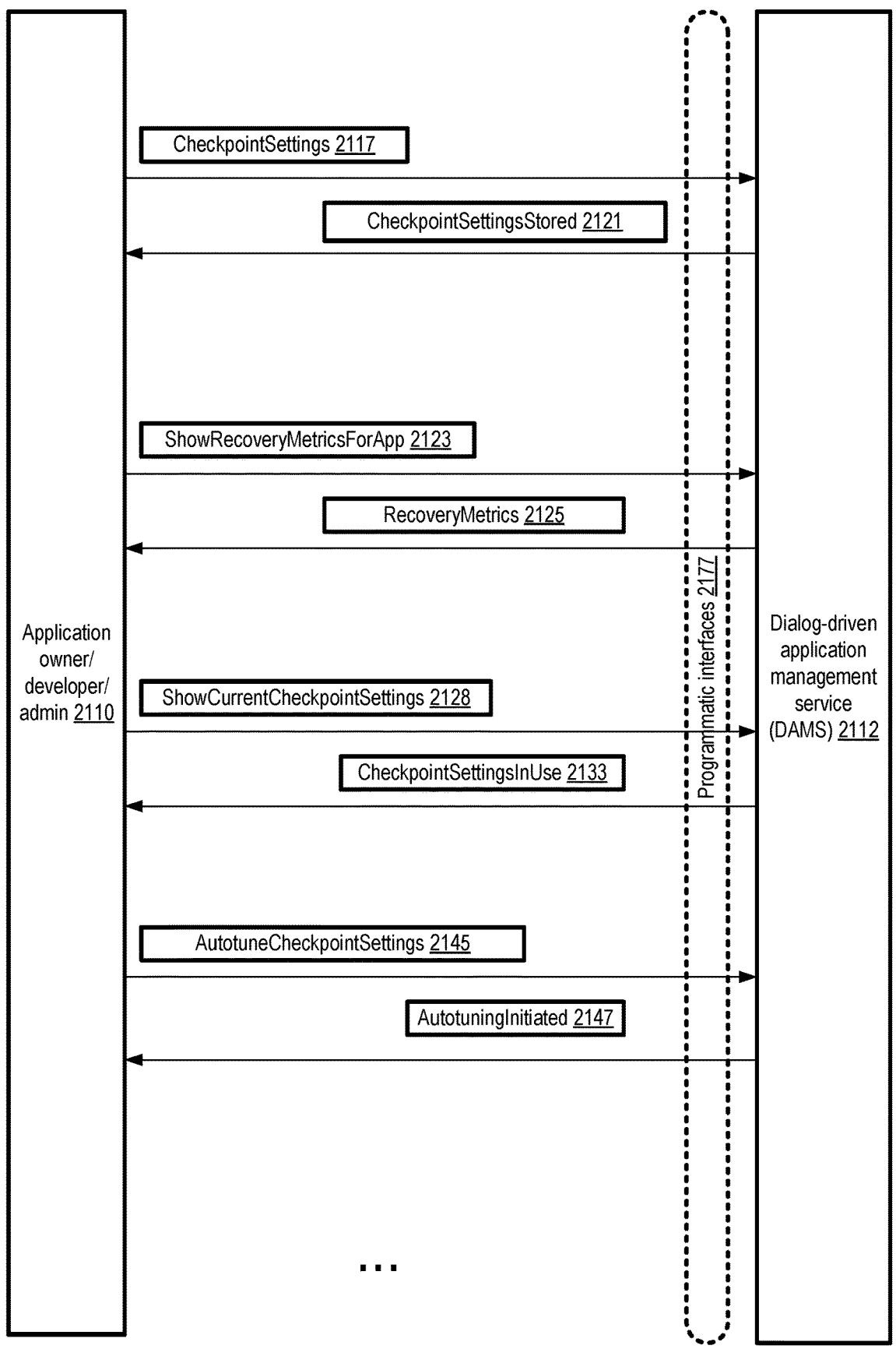
FIG. 21 illustrates example programmatic interactions associated with checkpointing at a dialog-driven application management service, according to at least some embodiments.

FIG. 21 illustrates example programmatic interactions associated with checkpointing at a dialog-driven application management service, according to at least some embodiments. A DAMS 2112, similar in functionality to DAMS 1902 of FIG. 19, may implement a set of programmatic interfaces 2177 in the depicted embodiment, enabling owners, developers and administrators of dialog-driven application to indicate preferences and submit requests related to fault tolerance of their applications. The programmatic interfaces may include, for example, one or more web-based consoles, command-line tools, graphical user interfaces, APIs, and the like. Note that the programmatic interactions shown by way of example in FIG. 21 may be implemented in addition to at least some of the kinds of interactions shown in FIG. 8 and/or FIG. 16 in some embodiments. For example, an application owner 2110 may cause a descriptor or representation of a particular dialog-driven application to be registered and stored at the DAMS 2112 using a RegisterAndStoreApp request similar to request 814 of FIG. 8, configure interruptibility modes, timing parameters, bucket-based resource management settings, and so on.

Using the programmatic interfaces 2177, an application owner 2110 may submit a CheckpointSettings message 2117. The CheckpointSettings message 2117 may include one or more checkpoint descriptors for one or more dialog-driven applications. A given checkpoint descriptor may include one or more rules for selecting/identifying/determining the content to be included within checkpoints created for an application (e.g., a combination of one or more categories of state information of the kind discussed above) in at least some embodiments. In some embodiments, a checkpoint descriptor may also include criteria or rules for determining checkpoint boundaries, e.g., whether checkpoints are to be generated after every utterance for a given format combination of user-generated input, after N utterances, and the like. In one embodiment, the checkpoint settings provided by the application owner may be expressed in the form of conditional rules. For example, the equivalent of "if an utterance received during phase P1 of application App1 uses audio only, then create a checkpoint containing state information categories c1, c2 and c3" or "if the client-side component is running on a device of type T, then create a checkpoint once for every E input events, containing state information categories c1 and c2" may be specified in the checkpoint descriptor. The specified checkpoint settings may be stored in a metadata repository of the DAMS 2112, and a CheckpointSettingsStored response 2121 may be sent to the application owner. Checkpoint settings may be provided or changed at any time during the lifetime of an application, e.g., as part of the registration of the application or after the application has been deployed and brought online. In at least some embodiments, if an application owner does not provide custom checkpoint settings for an application, the DAMS 2112 may utilize a default set of checkpoint settings (e.g., based on contents of a knowledge base of checkpoint-related data collected for other applications) to implement fault tolerance for the application.

An application owner may submit a ShowRecoveryMetricsForApp request 2123 in some embodiments via programmatic interfaces 2177 to obtain failure and recovery related metrics pertaining to a specified dialog-driven application. In response, one or more RecoveryMetrics messages 2125 containing values of metrics such as the number of times that connections being used for the application have been dropped during a time interval, the times taken to reestablish connectivity with the DAMS after such interruptions, the number of checkpoints created but not used, the amount of storage used for checkpoints of the application, and so on may be provided to the application owner.

To view the current checkpointing-related settings of an application, an application owner may submit a ShowCurrentCheckpointSettings request 2128 in the depicted embodiment. The settings currently in effect may be indicated in one or more CheckpointSettingsInUse messages 2133.

In at least one embodiment, the DAMS 2112 may enable checkpointing parameters to be tuned automatically, e.g., using one or more machine learning based parameter tuning models similar to models 178 of FIG. 1. Such models may, for example, analyze data regarding the amount of resources (e.g., computing and storage) being used for creating checkpoints for a given application, the number of times connections have been dropped/interrupted with the application, and so on, and provide recommendations to modify checkpointing parameters (such as how frequently checkpoints should be created, what types of state information should be included, etc.). An AutotuneCheckpointSettings request 2145 may be submitted by an application owner to utilize such functionality for one or more applications in some embodiments. The DAMS 2112 may initiate the automated tuning of checkpoint parameters, and send an AutotuningInitiated response message 2147 to the application owner in at least some embodiments. Note that in some embodiments, programmatic interactions other than those shown in FIG. 8, FIG. 16 and/or FIG. 21 may be supported by a DAMS.

Methods for Managing Checkpointing of Dialog-Driven Applications

Figure 22:
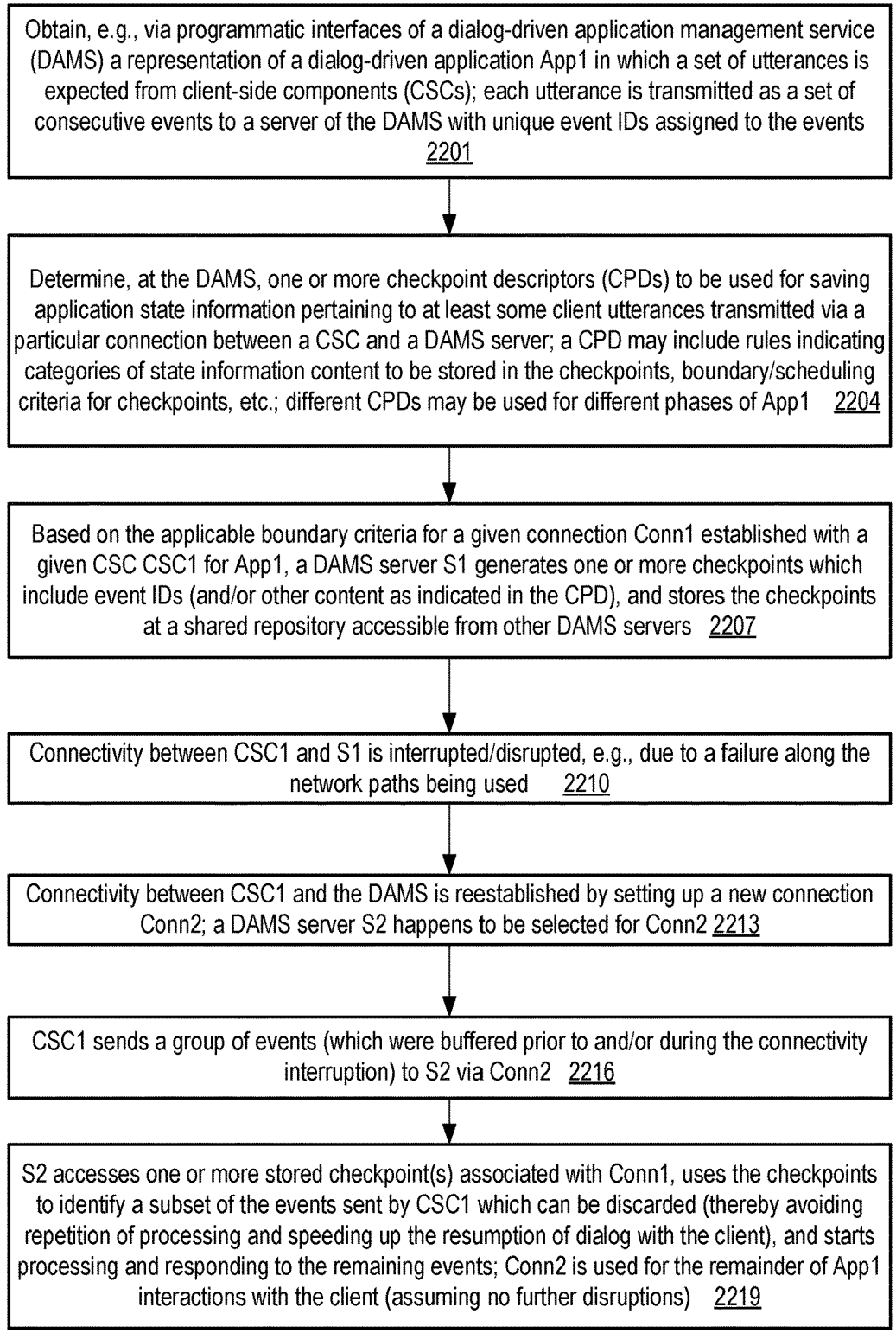
FIG. 22 is a flow diagram illustrating aspects of checkpointing related operations which may be performed at a dialog-driven application management service, according to at least some embodiments.

FIG. 22 is a flow diagram illustrating aspects of checkpointing related operations which may be performed at a dialog-driven application management service, according to at least some embodiments. As shown in element 2201, a representation of a dialog-driven application App1 may be obtained at a DAMS similar in functionality to DAMS 1902 of FIG. 19. The representation may indicate that a particular set or sequence of utterances is to be expected from client-side components of the DAMS, and analyzed or processed by the DAMS to implement the logic of the application. Based on the analysis, which may for example be performed using machine learning models and/or other services such as a dynamically provisioned computing service at which one or more functions indicated by an application owner are run, one or more actions may be initiated in response to the utterances. A digital representation of a given utterance may be divided into smaller units called input events or input blocks before being transferred to the DAMS in at least some embodiments, with each input event assigned a respective unique identifier.

At the DAMS, one or more checkpoint descriptors may be determined or obtained and used to save application state information pertaining to at least some utterances transmitted via a particular connection between a client-side component and a DAMS server (element 2204). A CPD may, for example, indicate criteria to be used for determining checkpoint boundaries (e.g., how checkpoints should be scheduled with respect to the events received from a client-side components), and/or rules for selecting the categories of state information to be included within checkpoints in various embodiments. In at least one embodiment, different CPDs may be obtained or identified for respective phases of a dialog-driven application's execution. In some embodiments, the rules for selecting content for checkpoints, and/or the boundary/scheduling criteria may be submitted via programmatic interfaces of the DAMS by an application owner of App1.

Based on the applicable checkpoint boundary criterion or criteria, a DAMS server S1 may create one or more checkpoints for the App1-related interactions associated with a given connection Conn1 established between S1 and a client-side component CSC1 in the depicted embodiment (element 2207). The checkpoints may comprise state information (e.g., input event identifiers associated with the content of a most-recently-completed utterance or some number of recently-completed utterances, payloads of the input events, etc.) selected based on the rules indicated in the CPD. The checkpoints may be stored at a repository accessible from other DAMS servers in various embodiments.

In most cases, connectivity between CSC1 and S1 via Conn1 may not be disrupted, and the full set of utterances associated with one or more intents of App1 may be obtained and processed successfully via Conn1. However, in some cases, connectivity between CSC1 and S1 may be disrupted or interrupted (element 2210), e.g., because of a transient problem somewhere along the network paths being used for Conn1. The connectivity between CSC1 and the DAMS may be re-established fairly quickly in the depicted embodiment, e.g., by setting up a new connection Conn2 (element 2213). It may be the case that a different server S2 of the DAMS is chosen to continue the dialog with the client who was using CSC1 to communicate with the DAMS.

To help resume the dialog, CSC1 may send a group of input events (which were buffered at CSC1 during and/or prior to the interruption in connectivity) to S2 via the new connection Conn2 (element 2216). Some of the input events may have already been received and processed at the DAMS earlier, and represented in checkpoints created for Conn1; others may be new in that they may not have been processed at the DAMS yet.

S2 may access one or more stored checkpoints associated with user-generated input sent via Conn1, and use the checkpoints to identify respective subsets of the input events sent from CSC1 to S2 which can be discarded or ignored (thereby avoiding repetition of processing and speeding up the resumption of the dialog with the client using CSC1), and other subsets of input events which require processing (element 2219). S2 may initiate the processing of the new events, and Conn2 may be used for the remainder of the App1-related interactions with the client (assuming no further disruptions) in the depicted embodiment.

It is noted that in various embodiments, some of the operations shown in the flow diagrams of FIG. 9, FIG. 17 and/or FIG. 22 may be implemented in a different order than that shown in the figure, or may be performed in parallel rather than sequentially. Additionally, some of the operations shown in FIG. 9 FIG. 17 and/or FIG. 22 may not be required in one or more implementations.

Example Provider Network Environment

Figure 23:
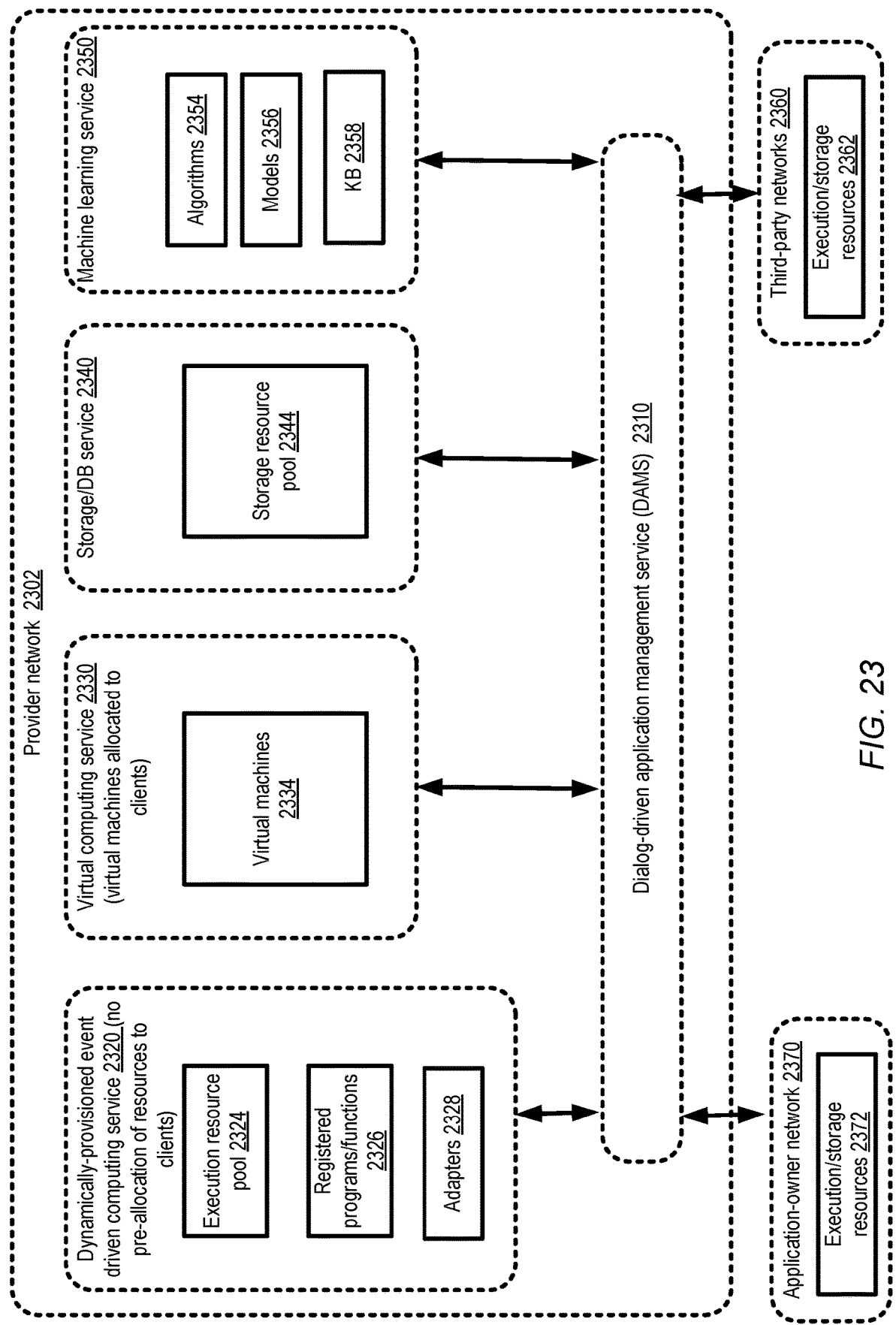
FIG. 23 illustrates an example provider network in which a dialog-driven application management service may be implemented, according to at least some embodiments.

FIG. 23 illustrates an example provider network in which a dialog-driven application management service may be implemented, according to at least some embodiments. As shown, provider network 2302 may comprise a dynamically-provisioned provisioning event-driven computing service 2320, a virtualized computing service 2330, a storage or database service 2340 and a machine learning service 2350 in addition to a DAMS 2310 similar in features and functionality to DAMS 1902 of FIG. 19. In the depicted embodiment, the DAMS 2310 may utilize one or more of the other services, for example to execute the fulfillment tasks associated with various intents, to store checkpoints, and so on.

A dynamically-provisioned event-driven computing service 2320 may enable clients to register executable programs or functions for execution without pre-allocating execution resources for the clients (and hence may sometimes be referred to as a "server-less" computing service). A program developer may submit a program at service 2320 and indicate one or more triggering conditions or events which are to cause the execution of the program. Instead of reserving or provisioning compute resources for the client in advance, the service 2320 may simply select compute resources for a registered program 2326 from a pool 2324 of execution resources whenever execution of the program is triggered. The client may not even be aware of the kind of virtual or physical machine used to execute the program, and may simply be provided with the result of the execution. As such, clients of the dynamically-provisioned event driven computing service 2320 may not have to be concerned with identifying the number or computing capacities of platforms to be used for their programs, and may only be charged for the amount of computing actually performed when their programs are executed (measured, for example, in relatively fine-grained increments of seconds or even fractions of seconds of computation) in at least some embodiments. The dynamically-provisioned event-driven computing service 2320 may in effect implement a functional programming model in some embodiments. The computing resources offered by such a service 2320 may be an ideal fit for implementing the task fulfillment programs for intents of some kinds of dialog-driven applications, especially if the workload of the application tends to change dynamically. In the depicted embodiment, the service 2320 may also make a number of adapters 2328 accessible for the registered programs, enabling the registered programs to utilize resources external to the service 2320. As a result, a program registered for execution at service 2320 may be able to access resources, for example, at other services of the provider network and/or outside the provider network.

In contrast to the dynamically-provisioning event driven computing service 2320, the virtualized computing service 2330 may pre-allocate computing resources (e.g., virtual machines 2334) to its clients in a somewhat more static fashion, e.g., for specified time intervals, and enable the clients to run programs on the allocated virtual machines. In at least some embodiments, programs running on such virtual machines may be invoked for implementing the fulfillment tasks of dialog-driven applications. Some such programs may implement web services interfaces, enabling a given program to be utilized (e.g., to fulfill a task intent) by transmitting commands to an HTTP (HyperText Transfer Protocol)-based address associated with the program. In some cases, a sophisticated distributed application (e.g., an application for making travel-related reservations, or for managing the workflow of customer support tasks associated with various products produced by an enterprise) may have originally been implemented at the virtualized computing service without including the necessary hooks or communication modules for dialog-driven interactions. Various infrastructure management capabilities supported at the virtualized computing service, such as automated scaling and load balancing, may be utilized for the service. The owner of the distributed application may wish to add the dialog-driven interaction components to such an application. In such a scenario, the DAMS 2310 may enable the dialog-related components to be generated and integrated with the pre-existing application without substantial additional investment of programming effort. Intent task fulfillment programs run at the virtualized computing service 2320 and/or the dynamically-provisioned event-driven computing service 2320 may invoke each other (or other programs at other services) in some embodiments—that is, a given task fulfillment program may not be restricted to utilizing resources of a given service of the provider network.

In various embodiments, one or more storage and/or database services 2340 may also be utilized for dialog-driven applications. For example, data sets used for task fulfillment, profile information for end users of dialog-driven applications, checkpoints may be stored at storage resource pools 2344 of such services, and so on. In at least one embodiment, an executable representation of a dialog-driven application may comprise invocations of programmatic interfaces of the storage or database service.

Some provider networks may include a machine learning service 2350 which can be utilized by various other services and/or by external clients directly. The machine learning service 2350 may provide natural language understanding (NLU) capabilities which in turn may depend on a combination of automated speech recognition (ASR) and natural language processing (NLP) components in the depicted embodiment. A wide variety of algorithms 2354 and models 2356 may be accessed from the machine learning service in such embodiments, including for example various classification and regression algorithms, artificial neural network-based algorithms (including deep learning neural network-based algorithms), and so on. In addition, a knowledge base 2358 which captures records of previous experiences with machine learning tasks, and which can therefore be utilized to select suitable parameters and hyper-parameters for various algorithms and models may also be implemented at the machine learning service 2350. In some embodiments, the ASR components of the machine learning service may comprise a number of finite state transducers (FSTs), associated general or user-specific language models and/or acoustic models. The ASR components may, for example, detect speech based on signals received at an end-user device associated with a dialog-driven application, transform the speech signals into text, and provide the text as input to the natural language processing components. The natural language processing components may implement, for example, algorithms for named entity recognition, intent classification, and result ranking (e.g., associating scores with end user utterances indicating the extent to which the utterances match expected word strings for various stages of the dialogs used for setting intent parameters). As discussed below in further detail, the machine learning service 2350 may also be used to automate the expansion or enhancement of lexicons associated with dialog-driven applications, based for example on log record analysis, cross-application lexicon analysis, and/or analysis of other language usage corpora. In some embodiments, models and algorithms of the machine learning service 2350 may be used to tune various parameters of dialog-driven applications, including timing intervals of the kind discussed earlier, bucketing-based throttling parameters, checkpointing parameters and so on.

For some intents of dialog-driven applications developed using DAMS 2310, fulfillment tasks may be implemented at resources outside the provider network, e.g., at execution or storage resources 2372 located within application-owner networks 2370 or at execution or storage resources 2362 located in third-party networks 2360 (e.g., networks owned or managed by a third party application vendor or service vendor, other than the entity which develops/owns the dialog-driven application and other than the provider network operator). Other resources or services inside or outside the provider network may be used for dialog-driven applications in various embodiments.

In some embodiments, at least some aspects of the dialog-driven application management and configuration techniques described herein may be implemented without acquiring resources of network-accessible services such as those shown in FIG. 23.

Use Cases

The techniques described above, of customizing configurations of dialog-driven applications implemented using a DAMS, may be useful in a variety of scenarios. An application management service that enables dialog-driven applications for a wide variety of problem domains to be generated without requiring application developers to provide source code for the dialog flow or the natural language interpretation may make it much easier for existing applications to be integrated into a dialog-driven execution framework. As new types of end user devices, such as voice-activated assistants, virtual reality or augmented reality devices, intelligent home appliances, automated vehicles, and the like become available, new classes of dialog-driven applications may be developed and deployed rapidly using the service. Customized configurations of such aspects as interruptibility, timing parameters usable to determine the durations of user utterances, connection throttling, and checkpointing may provide great flexibility to application owners to deploy their applications while simplifying the experience of end users, ensuring that different sets of clients are treated fairly with respect to one another, smoothing recoveries from failures while minimizing wastage of resources, and so on.

Illustrative Computer System

Figure 24:
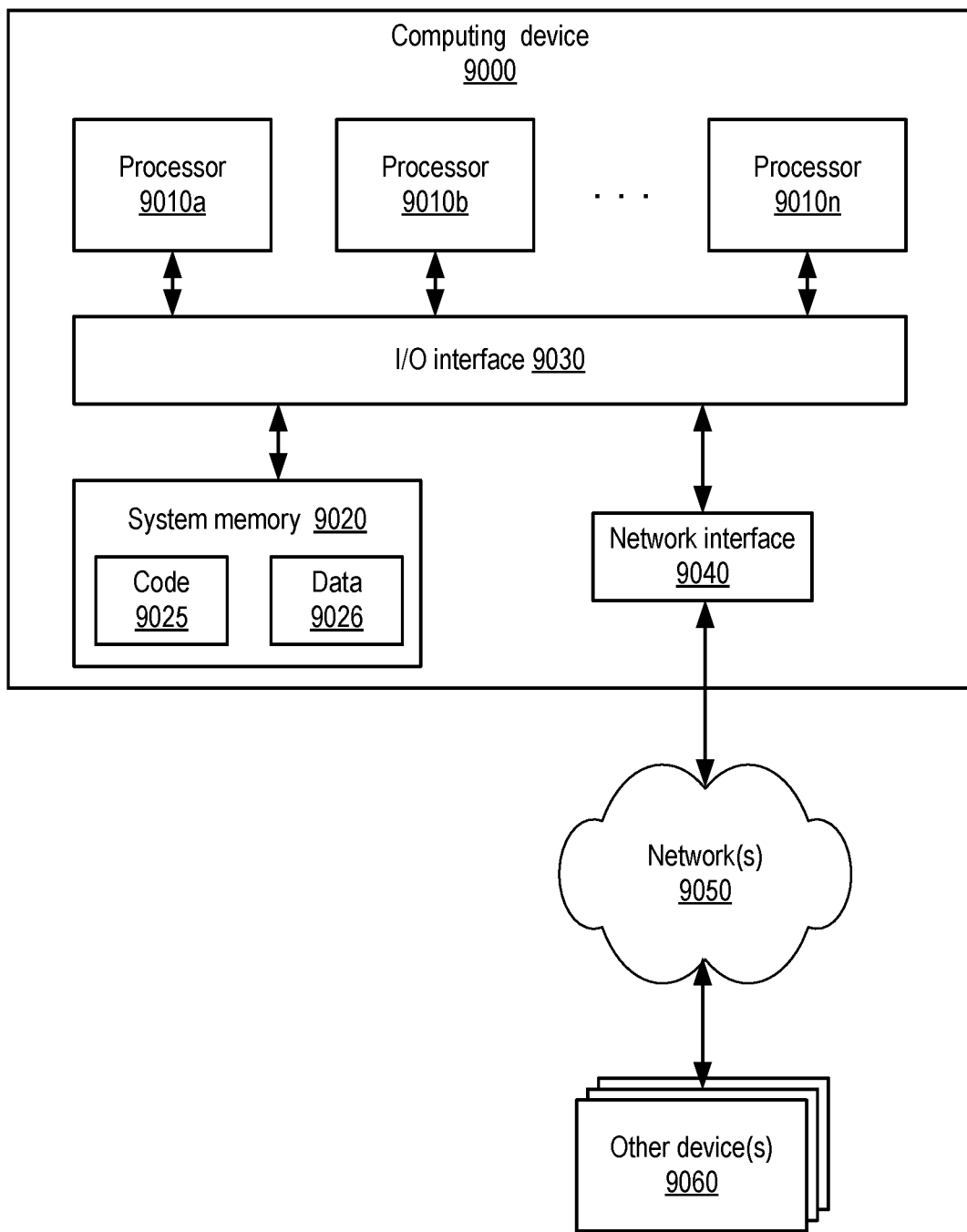
FIG. 24 is a block diagram illustrating an example computing device that may be used in at least some embodiments.

In at least some embodiments, a server that implements the types of techniques described herein (e.g., various functions of a DAMS and/or other services of a provider network), may include a general-purpose computer system that includes or is configured to access one or more computer-accessible media. FIG. 24 illustrates such a general-purpose computing device 9000. In the illustrated embodiment, computing device 9000 includes one or more processors 9010 coupled to a system memory 9020 (which may comprise both non-volatile and volatile memory modules) via an input/output (I/O) interface 9030. Computing device 9000 further includes a network interface 9040 coupled to I/O interface 9030.

In various embodiments, computing device 9000 may be a uniprocessor system including one processor 9010, or a multiprocessor system including several processors 9010 (e.g., two, four, eight, or another suitable number). Processors 9010 may be any suitable processors capable of executing instructions. For example, in various embodiments, processors 9010 may be general-purpose or embedded processors implementing any of a variety of instruction set architectures (ISAs), such as the x86, PowerPC, SPARC, ARM, or MIPS ISAs, or any other suitable ISA. In multiprocessor systems, each of processors 9010 may commonly, but not necessarily, implement the same ISA. In some implementations, graphics processing units (GPUs) and or field-programmable gate arrays (FPGAs) may be used instead of, or in addition to, conventional processors.

System memory 9020 may be configured to store instructions and data accessible by processor(s) 9010. In at least some embodiments, the system memory 9020 may comprise both volatile and non-volatile portions; in other embodiments, only volatile memory may be used. In various embodiments, the volatile portion of system memory 9020 may be implemented using any suitable memory technology, such as static random access memory (SRAM), synchronous dynamic RAM or any other type of memory. For the non-volatile portion of system memory (which may comprise one or more NVDIMMs, for example), in some embodiments flash-based memory devices, including NAND-flash devices, may be used. In at least some embodiments, the non-volatile portion of the system memory may include a power source, such as a supercapacitor or other power storage device (e.g., a battery). In various embodiments, memristor based resistive random access memory (ReRAM), three-dimensional NAND technologies, Ferroelectric RAM, magnetoresistive RAM (MRAM), or any of various types of phase change memory (PCM) may be used at least for the non-volatile portion of system memory. In the illustrated embodiment, program instructions and data implementing one or more desired functions, such as those methods, techniques, and data described above, are shown stored within system memory 9020 as code 9025 and data 9026.

In one embodiment, I/O interface 9030 may be configured to coordinate I/O traffic between processor 9010, system memory 9020, and any peripheral devices in the device, including network interface 9040 or other peripheral interfaces such as various types of persistent and/or volatile storage devices. In some embodiments, I/O interface 9030 may perform any necessary protocol, timing or other data transformations to convert data signals from one component (e.g., system memory 9020) into a format suitable for use by another component (e.g., processor 9010). In some embodiments, I/O interface 9030 may include support for devices attached through various types of peripheral buses, such as a variant of the Peripheral Component Interconnect (PCI) bus standard or the Universal Serial Bus (USB) standard, for example. In some embodiments, the function of I/O interface 9030 may be split into two or more separate components, such as a north bridge and a south bridge, for example. Also, in some embodiments some or all of the functionality of I/O interface 9030, such as an interface to system memory 9020, may be incorporated directly into processor 9010.

Network interface 9040 may be configured to allow data to be exchanged between computing device 9000 and other devices 9060 attached to a network or networks 9050, such as other computer systems or devices as illustrated in FIG. 1 through FIG. 23, for example. In various embodiments, network interface 9040 may support communication via any suitable wired or wireless general data networks, such as types of Ethernet network, for example. Additionally, network interface 9040 may support communication via telecommunications/telephony networks such as analog voice networks or digital fiber communications networks, via storage area networks such as Fibre Channel SANs, or via any other suitable type of network and/or protocol.

In some embodiments, system memory 9020 may represent one embodiment of a computer-accessible medium configured to store at least a subset of program instructions and data used for implementing the methods and apparatus discussed in the context of FIG. 1 through FIG. 23. However, in other embodiments, program instructions and/or data may be received, sent or stored upon different types of computer-accessible media. Generally speaking, a computer-accessible medium may include non-transitory storage media or memory media such as magnetic or optical media, e.g., disk or DVD/CD coupled to computing device 9000 via I/O interface 9030. A non-transitory computer-accessible storage medium may also include any volatile or non-volatile media such as RAM (e.g. SDRAM, DDR SDRAM, RDRAM, SRAM, etc.), ROM, etc., that may be included in some embodiments of computing device 9000 as system memory 9020 or another type of memory. In some embodiments, a plurality of non-transitory computer-readable storage media may collectively store program instructions that when executed on or across one or more processors implement at least a subset of the methods and techniques described above. A computer-accessible medium may further include transmission media or signals such as electrical, electromagnetic, or digital signals, conveyed via a communication medium such as a network and/or a wireless link, such as may be implemented via network interface 9040. Portions or all of multiple computing devices such as that illustrated in FIG. 24 may be used to implement the described functionality in various embodiments; for example, software components running on a variety of different devices and servers may collaborate to provide the functionality. In some embodiments, portions of the described functionality may be implemented using storage devices, network devices, or special-purpose computer systems, in addition to or instead of being implemented using general-purpose computer systems. The term "computing device", as used herein, refers to at least all these types of devices, and is not limited to these types of devices.

CONCLUSION

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g. SDRAM, DDR, RDRAM, SRAM, etc.), ROM, etc., as well as transmission media or signals such as electrical, electromagnetic, or digital signals, conveyed via a communication medium such as network and/or a wireless link.

The various methods as illustrated in the Figures and described herein represent exemplary embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended to embrace all such modifications and changes and, accordingly, the above description to be regarded in an illustrative rather than a restrictive sense.

What is claimed is:

1. A system, comprising:

one or more computing devices;

wherein the one or more computing devices include instructions that upon execution on or across the one or more computing devices cause the one or more computing devices to:

obtain, via one or more programmatic interfaces of a dialog-driven application management service, a first resource management descriptor for one or more dialog-driven applications including a first dialog-driven application, wherein the first resource management descriptor indicates (a) a first set of connection throttling parameters and (b) an applicability rule for the first set of connection throttling parameters;

apply, in accordance with the applicability rule, a mapping function to one or more attributes of a first connection establishment request directed to the first dialog-driven application from a first client-side component of the dialog-driven application management service to select, from a plurality of token buckets, a particular token bucket;

cause, based at least in part on determining that a population of tokens in the particular token bucket exceeds a threshold, a first network connection to be established between the first client-side component and a first server of the dialog-driven application management service, wherein the first server is configured to initiate one or more actions of the first dialog-driven application based at least in part on analysis of contents of user-generated input transmitted via the first network connection;

perform a plurality of token deduction iterations associated with the first network connection during a time interval for which the first network connection remains open, wherein a particular token deduction iteration of the plurality of token deduction iterations comprises deducting a particular number of tokens from the particular token bucket, wherein the particular number is determined based at least in part on the first set of connection throttling parameters, and wherein a time interval between successive token deduction iterations is determined based at least in part on the first set of connection throttling parameters; and reject a second connection establishment request directed to a dialog-driven application of the one or more dialog-driven applications based at least in part on a determination that the population of tokens of the particular token bucket is below the threshold.

2. The system as recited in claim 1, wherein the one or more computing devices include further instructions that upon execution on or across the one or more computing devices further cause the one or more computing devices to:

transmit, from the first server of the dialog-driven application management service to a second server of the dialog-driven application management service, an update pertaining to the particular token bucket, wherein the second connection establishment request is rejected by the second server.

3. The system as recited in claim 1, wherein the first network connection is established on behalf of a first client of a plurality of clients of the first dialog-driven application, and wherein the one or more computing devices include further instructions that upon execution on or across the one or more computing devices further cause the one or more computing devices to:

collect one or more client-specific metrics associated with respective clients of the plurality of clients, including a count of a particular category of application requests submitted by the respective clients during a selected time interval;

determining a first maximum permitted population of the particular token bucket based at least in part on analysis of one or more client-specific metrics associated with the first client; and determining a second maximum permitted population of another token bucket based at least in part on analysis of one or more client-specific metrics associated with a second client, wherein the second maximum permitted population differs from the first maximum permitted population.

4. The system as recited in claim 1, wherein the one or more computing devices include further instructions that upon execution on or across the one or more computing devices further cause the one or more computing devices to:

initiate, by the first server after the first network connection is established, an action of the first dialog-driven application based on input received via the first network connection, wherein the action is initiated during a time interval in which the population of the particular token bucket is below the threshold.

5. The system as recited in claim 1, wherein the one or more computing devices include further instructions that upon execution on or across the one or more computing devices further cause the one or more computing devices to:

determine a data transfer rate of the first network connection; and modifying one or more parameters of one or more token deduction iterations of the particular token bucket based at least in part on the data transfer rate.

6. A computer-implemented method, comprising:

causing, based at least in part on determining that a population of tokens in a particular token bucket exceeds a threshold, a first network connection to be established between a first client-side component of a dialog-driven application management service and a first server of the dialog-driven application management service, wherein the first server is configured to initiate one or more actions of a first dialog-driven application based at least in part on analysis of contents of user-generated input transmitted via the first network connection;

performing a plurality of token deduction iterations associated with the first network connection during a time interval for which the first network connection remains open, wherein a particular token deduction iteration of the plurality of token deduction iterations comprises deducting a particular number of tokens from the particular token bucket, wherein the particular number is determined based at least in part on a first set of connection throttling parameters associated with the first dialog-driven application, and wherein a time interval between successive token deduction iterations is determined based at least in part on the first set of connection throttling parameters; and rejecting, at the dialog-driven application management service, a second connection establishment request directed to a dialog-driven application based at least in part on an examination of the population of the particular token bucket.

7. The computer-implemented method as recited in claim 6, wherein a representation of the particular token bucket is accessible from a plurality of servers of the dialog-driven application management service including the first server and a second server, and wherein the rejecting of the second connection establishment request is performed at the second server.

8. The computer-implemented method as recited in claim 6, wherein the first network connection is established on behalf of a first user of a plurality of users of the first dialog-driven application, the computer-implemented method further comprising:
collecting one or more user-specific metrics associated with respective users of the plurality of users, including a count of a particular category of application requests submitted by the respective users during a selected time interval;
determining a first maximum permitted population of the particular token bucket based at least in part on analysis of one or more user-specific metrics associated with the first user; and
determining a second maximum permitted population of another token bucket based at least in part on analysis of one or more user-specific metrics associated with a second user, wherein the second maximum permitted population differs from the first maximum permitted population.

9. The computer-implemented method as recited in claim 6, further comprising:
obtaining, via one or more programmatic interfaces of the dialog-driven application management service, at least one connection throttling parameter of the first set of connection throttling parameters.

10. The computer-implemented method as recited in claim 6, wherein the first network connection is established on behalf of a first user of the first dialog-driven application, the computer-implemented method further comprising:
initiating, by the first server after the first network connection is established, an action of the first dialog-driven application on behalf of first user during a time interval in which the population of the particular token bucket is below the threshold.

11. The computer-implemented method as recited in claim 6, further comprising:
refilling the particular token bucket at a rate indicated in the first set of connection throttling parameters.

12. The computer-implemented method as recited in claim 6, further comprising:
determining a data transfer rate of the first network connection; and
modifying one or more parameters of one or more token deduction iterations of the particular token bucket based at least in part on the data transfer rate.

13. The computer-implemented method as recited in claim 6, further comprising:
determining one or more performance metrics of the dialog-driven application management service; and
terminating, based at least in part on the one or more performance metrics, a particular network connection whose establishment was approved after verifying that the population of the particular token bucket exceeds the threshold.

14. The computer-implemented method as recited in claim 6, wherein at least a first portion of the user-generated input is provided in an audio format, and at least a second portion of the user-generated input is provided in a non-audio format.

15. The computer-implemented method as recited in claim 6, wherein the first client-side component is implemented at least in part at one or more of: (a) an automated personal assistant device, (b) a smart phone, (c) a mobile device, (d) a game device, (e) a laptop, (f) a tablet, (g) a laptop, (h) a desktop computer, or (i) a compute instance of a provider network.

16. One or more non-transitory computer-accessible storage media storing program instructions that when executed on or across one or more processors cause the one or more processors to:
allocate, based at least in part on determining that a population of capacity indicators in a particular throttling data structure exceeds a threshold, a first resource of a dialog-driven application management service for a first set of one or more requests directed to a first dialog-driven application from a first client-side component of a dialog-driven application management service;
perform one or more capacity indicator deduction iterations associated with the first resource during a time interval for which the first resource remains allocated for the first set of one or more requests, wherein a particular capacity indicator deduction iteration of the one or more capacity indicator deduction iterations comprises deducting a particular number of capacity indicators from the particular throttling data structure, wherein the particular number is determined based at least in part on a first resource throttling setting; and
reject, at the dialog-driven application management service, a second set of one or more requests based at least in part on a determination that the population of the particular throttling data structure is below a threshold.

17. The one or more non-transitory computer-accessible storage media as recited in claim 16, storing further program instructions that when executed on or across one or more processors further cause the one or more processors to:
obtain the first resource throttling setting via one or more programmatic interfaces.

18. The one or more non-transitory computer-accessible storage media as recited in claim 16, storing further program instructions that when executed on or across one or more processors further cause the one or more processors to:
obtain, via one or more programmatic interfaces, an indication of a time interval between successive capacity indicator deduction iterations.

19. The one or more non-transitory computer-accessible storage media as recited in claim 16, wherein the first resource comprises a network connection between a first server of the dialog-driven application management service and the first client-side component.

20. The one or more non-transitory computer-accessible storage media as recited in claim 16, storing further program instructions that when executed on or across one or more processors further cause the one or more processors to:
invoke one or more machine learning models to analyze, after the first resource has been allocated, at least a subset of user-generated input pertaining to the first dialog-driven application; and
initiate one or more actions of the first dialog-driven application based at least on part on results of analysis of the subset of user-generated input.

* * * * *